United States Patent [19]
Ishizuya et al.

[11] Patent Number: 6,080,988
[45] Date of Patent: Jun. 27, 2000

[54] OPTICALLY READABLE RADIATION-DISPLACEMENT-CONVERSION DEVICES AND METHODS, AND IMAGE-RENDERING APPARATUS AND METHODS EMPLOYING SAME

[75] Inventors: Tohru Ishizuya, Tokyo; Noboru Amemiya, Chigasaki; Keiichi Akagawa, Kamakura, all of Japan

[73] Assignee: Nikon Corporation, Tokyo, Japan

[21] Appl. No.: 08/994,949

[22] Filed: Dec. 19, 1997

[30] Foreign Application Priority Data

| Dec. 20, 1996 | [JP] | Japan | ................................. | 8-354812 |
| Jan. 8, 1997 | [JP] | Japan | ................................. | 9-013089 |
| Mar. 15, 1997 | [JP] | Japan | ................................. | 9-082121 |
| Sep. 4, 1997 | [JP] | Japan | ................................. | 9-256042 |

[51] Int. Cl.$^7$ ........................................................ G02F 1/00
[52] U.S. Cl. ................................. 250/338.1; 250/370.01; 250/370.08; 250/330; 250/332; 250/352
[58] Field of Search ...................... 250/370.01, 370.08, 250/338.1, 330, 332, 352

[56] References Cited

U.S. PATENT DOCUMENTS

| 4,788,428 | 11/1988 | Metcalf et al. | ........................ | 250/332 |
| 5,021,663 | 6/1991 | Hornbeck | .............................. | 250/338.1 |
| 5,844,238 | 12/1998 | Sauer et al. | ........................... | 250/338.1 |
| 5,929,440 | 7/1999 | Fisher | ................................... | 250/338.1 |

*Primary Examiner*—Constantine Hannaher
*Assistant Examiner*—Andrew Israel
*Attorney, Agent, or Firm*—Klarquist Sparkman Campbell Leigh & Whinston, LLP

[57] ABSTRACT

Optically readable radiation-displacement conversion devices and image-rendering apparatus that incorporate same are disclosed. Also disclosed are related methods for detecting images and rendering images using such devices and apparatus. Such devices, apparatus and methods allow improved accuracy and sensitivity of radiation detection without having to use a cooler. A representative conversion device includes a substrate and a suspended portion attached to the substrate via a leg portion. The conversion device includes a radiation-absorbing film that receives and absorbs and incident invisible radiation (e.g., UV, IR, or X-rays) and generates heat from the absorbed radiation. The suspended portion includes a displaceable member that exhibits a displacement with respect to the substrate. The displacement also imparts a change to an incident readout light flux in accordance with the magnitude of the displacement. The change to the readout light is detected and used to form an image.

77 Claims, 32 Drawing Sheets

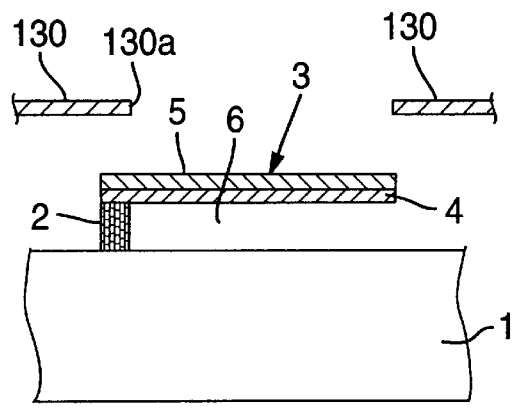
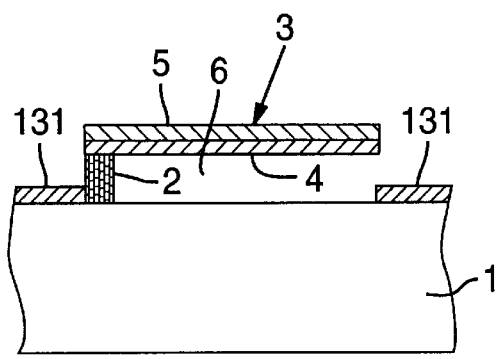
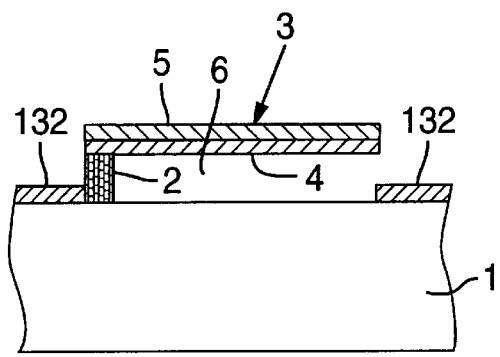
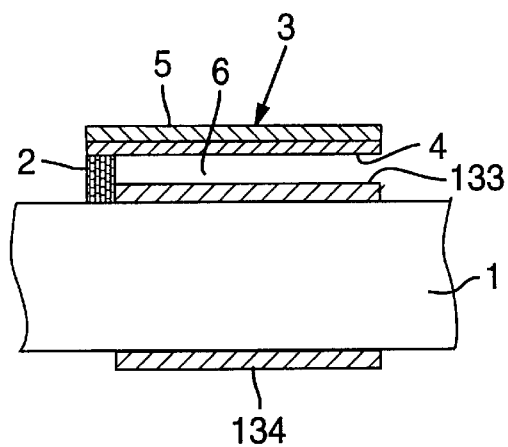
FIG. 14(a)
FIG. 14(b)
FIG. 14(c)
FIG. 14(d)

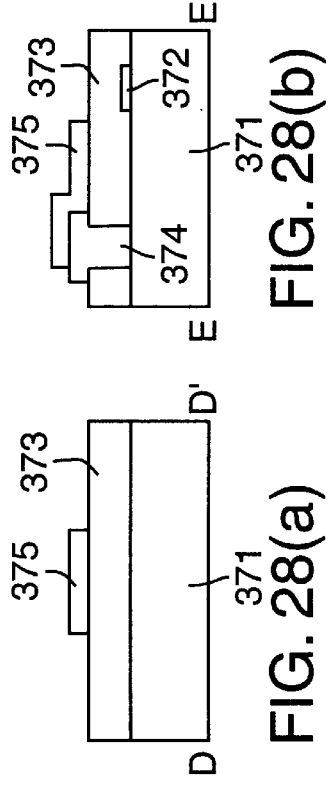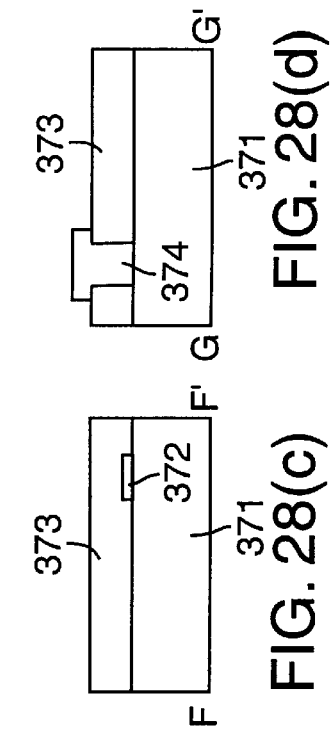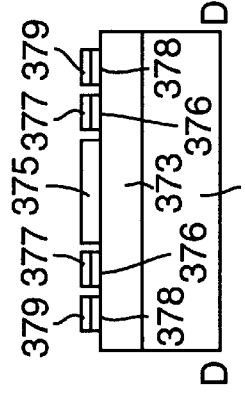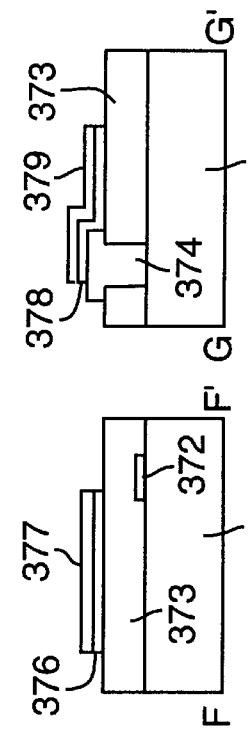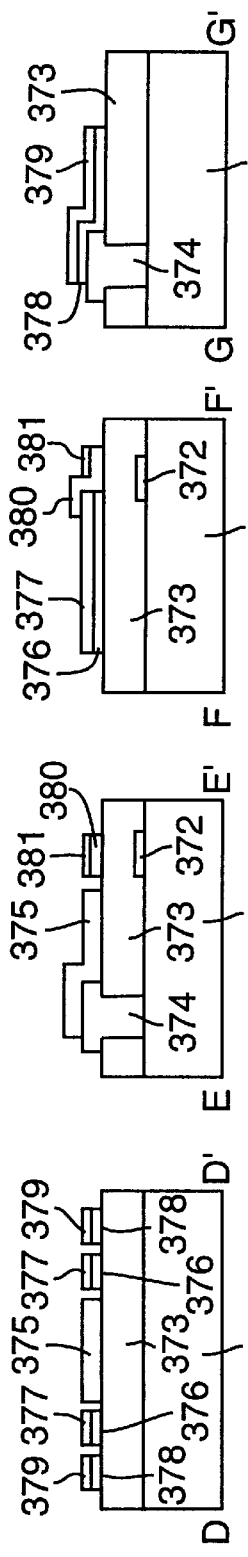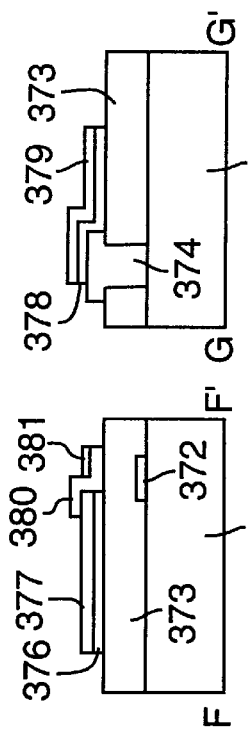

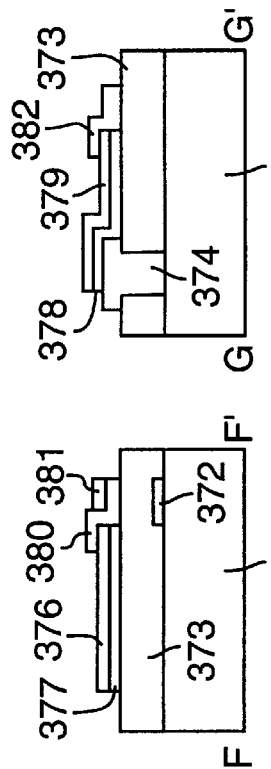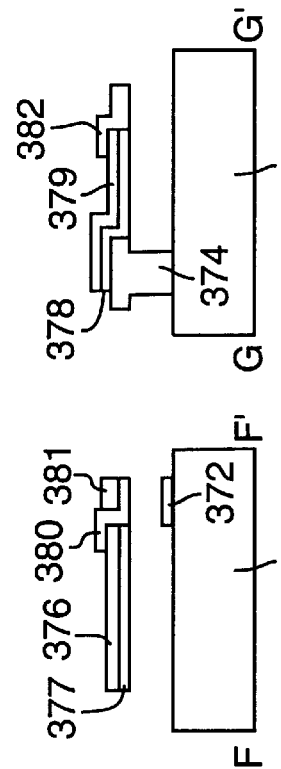

OPTICALLY READABLE RADIATION-DISPLACEMENT-CONVERSION DEVICES AND METHODS, AND IMAGE-RENDERING APPARATUS AND METHODS EMPLOYING SAME

FIELD OF THE INVENTION

The present invention relates generally to apparatus and methods for detecting any of various types of invisible radiation (such as infrared light, ultraviolet light, and X-rays) that generate heat when absorbed by certain materials. In particular, the present invention pertains to optically readable radiation-displacement-conversion devices ("conversion devices") for converting such radiation to an optically readable image, radiation-detection methods employing the principles of such devices, and image-rendering apparatus and methods employing such devices.

BACKGROUND OF THE INVENTION

Much recent research has been devoted to developing improvements in the detection of invisible light such as infrared light, ultraviolet light, or X-rays. Such research is expected to have many applications.

By way of example, detection of infrared radiation has important applications. Infrared light is a form of energy that radiates from all objects having a non-zero temperature (i.e., a temperature above zero degrees K). For example, an object having a temperature of approximately 300K gives off infrared radiation having a peak in the range of 8 to 12 $\mu$m. Such radiation can be used to detect the presence, shape, and temperature of an object, even in complete darkness. For example, infrared radiation can be used to guide a motor vehicle at night with no illumination as easily as if the vehicle were being driven in the daytime. Infrared light also can be used to detect the presence of a person illegally trespassing in a building without illumination at night.

In view of the many applications of detecting infrared light, various approaches have been developed for detecting such light since the discovery of infrared light by Herschel in about 1800. Currently, infrared detectors generally are classified into two types of detectors: quantum type infrared detectors and thermal type infrared detectors.

Despite the foregoing advances, detection of infrared light is still technically difficult, thus limiting the current scope of infrared detection technology.

A quantum type infrared detector converts photon energy (E=hv) of infrared light to electronic energy which is then detected, typically using charge-coupled devices. As indicated above, the infrared light most useful for technological applications has a wavelength range of 3 to 12 $\mu$m. Photons of such wavelength have an energy of about 0.1 to 0.4 eV, which is approximately equal to the heat energy of an electron at room temperature.

In order to convert the photon energy of incident infrared radiation to electronic energy, the influences of any thermal energy of the electrons must be eliminated (especially since the photon energy of an infrared photon is very small and nearly equal to the thermal energy of an electron at room temperature). This requires that a quantum-type infrared detector be cooled. It is normally necessary to cool the detector to about −200° C. (77K). Unfortunately, achieving such a level of cooling requires an auxiliary cooling device that occupies excessive volume, has excessive mass, generates excessive mechanical vibrations, has a short operational lifetime, and has excessively high cost. Thus, it is difficult to reduce the size and cost of an infrared camera or the like that comprises a conventional quantum-type infrared detector, which prohibits widespread use of such infrared cameras.

A conventional thermal-type infrared detector converts the energy of incident infrared radiation to thermal energy. The added thermal energy causes localized temperatures of the detector to change. Such localized temperature changes cause corresponding localized changes in a measurable parameter of the detector, such as the electrical resistance of a bolometer at the particular location experiencing a temperature change.

Although a conventional thermal-type infrared detector normally does not require a cooler, in contrast to the conventional quantum-type infrared detector, a conventional thermal-type infrared detector exhibits certain problems. For example, in order to detect a localized temperature change, it is necessary to have an electric current flow through the detector at that location. Such current flow causes localized self-heating which makes it difficult to detect a localized temperature change caused solely by the incident infrared radiation. As a result, detection accuracy is reduced.

Further with respect to conventional thermal-type infrared detectors, each location of the detector at which a localized temperature change is to be measured normally is suspended in air above the substrate in such a way that physical contact with the substrate is minimal. This provides sufficient thermal isolation of each location sufficiently to allow the localized temperature change caused by absorbed incident infrared radiation at that location to be detected.

It usually is necessary to provide each such suspended location with its own respective bolometer or the like, which complicates the making of electrical connections to the bolometer. This problem usually is solved by incorporating electrically conductive material in the fabrication of each bolometer. Unfortunately, electrically conductive materials tend to have extremely high thermal conductivities. This makes it difficult to improve the thermal insulation of each of the suspended portions relative to the substrate in a conventional thermal-type infrared detector. Inadequate thermal insulation contributes to a degradation of detection accuracy and detector sensitivity.

Conventional thermal-type infrared detectors also disadvantageously exhibit low sensitivity. For example, the bolometers in a conventional thermal-type infrared detector typically comprise a material that exhibits a resistance change of abort 2 percent for every 1° C. change in temperature of the material. The efficiency with which infrared radiation is converted to a measurable resistance change is at most about 1 percent. Hence, with every 1° C. change in temperature of an object to be measured, the resistance of the bolometers of the detector changes by 0.02 percent.

As a result, the electrical signal produced by a conventional thermal-type infrared detector is very weak. This requires that the electronic circuit used for reading out the electric signal he able to greatly reduce background noise with high amplification.

A conventional thermal-type infrared sensor also disadvantageously is affected easily by changes in external temperature. Thus, the output of the sensor easily fluctuates. If the radiation-to-heat conversion efficiency of such sensors is at most 1 percent, then temperature changes of the sensor must be less than 0.001° C. to ensure a temperature-detection precision of 0.1° C. Thus, very strict temperature control of the sensor is required.

The problems with conventional infrared detectors summarized above are generally applicable to conventional detectors for other types of electromagnetic radiation such as detectors for ultraviolet light and X-rays.

SUMMARY OF THE INVENTION

In view of the shortcomings of the prior art summarized above, objects of the present invention are to provide radiation detection methods and apparatus having high detection accuracy and high sensitivity without having to include a cooler, to provide optically readable radiation-displacement-conversion devices used in such apparatus and methods, and to provide image-rendering methods and apparatus employing the same.

According to a first aspect of the invention, optically readable radiation-displacement-conversion devices ("conversion devices") are provided that generally comprise a substrate, a suspended portion, and an optically effecting portion. The suspended portion is attached to the substrate so as to extend over a region of the substrate. The suspended portion comprises a radiation-absorbing region situated so as to receive an incident radiation and provide provides a radiation-absorbing material that absorbs the incident radiation and converts absorbed radiation into heat. The suspended portion also comprises a displaceable member that exhibits a displacement relative to the substrate whenever the radiation-absorbing material absorbs an amount of the incident radiation. The displacement has a magnitude that is a function of the amount of heating experienced by the radiation-absorbing region. The optically effecting portion receives a readout light flux and imparts a change to a characteristic of the readout light flux in accordance with the magnitude of the displacement of the displaceable member.

Hence, the invisible radiation incident to the radiation-absorbing material is converted to a measurable change in the readout light flux. The incident radiation is detected with high sensitivity. Also, since the incident radiation imparts a change to the readout light flux beam via heat and displacement, rather than imparting a change in electrical resistance, flow of electrical current through the suspended portion is unnecessary, self-heating of the suspended portion is eliminated, and only the heat caused by the incident radiation is detected, thereby improving detection accuracy. In addition, the readout signal is stronger and requires less amplification than required with conventional devices. Furthermore, no cooler is required.

The radiation-absorbing region can be oriented so as to receive the incident radiation from a first direction while the optically effecting portion receives the readout light flux from a second (opposite) direction. Alternatively, the radiation-absorbing region can be oriented so as to receive the incident radiation from the same direction as the optically effecting portion receives the readout light flux.

The conversion device can comprise one or more "pixels" on the same substrate, wherein each pixel comprises a separate suspended portion, and a respective optically effecting portion. Multiple pixels can be arranged in a one- or two-dimensional array. This allows one- or two-dimension images borne by the incident radiation to be picked up. Alternatively, the conversion device can comprise a single pixel which can be used merely to detect the incident radiation.

The suspended portion can have any of various attributes. For example, the suspended portion can be insulated electrically from the substrate because electrical connection of the suspended portion to the substrate is unnecessary. Electrical insulation in this manner allows a greater degree of thermal insulation of the suspended portion from the substrate. Alternatively, if desired, the suspended portion and the substrate can be connected electrically to each other, if necessary.

The radiation-absorbing material is absorptive for an incident radiation (usually invisible radiation) capable of generating heat when absorbed by the radiation-absorbing material. Preferably, the incident radiation is infrared light, ultraviolet light, and/or X-rays, most preferably infrared light. The radiation-absorbing region can be fixed relative to the substrate independently of any displacement of the displaceable member; in such an instance, the radiation-absorbing region and the displaceable member are connected thermally together.

The displaceable member can be, e.g., a cantilever or analogous structure, or a diaphragm or analogous structure, relative to the substrate. (A cantilever configuration, for example, is useful for ensuring efficient conversion of heat to displacement.) The displaceable member can comprise at least two superposed layers formed of different materials having different coefficients of thermal expansion (thus forming a "thermal-bimorph" configuration).

The displaceable member also or alternatively can comprise the radiation-absorbing region, which simplifies the structure of the device and reduces the number of steps required to fabricate the device, thereby reducing cost. The displaceable member can have a limited range of possible displacement.

Alternatively, the radiation-absorbing region can be located on the substrate, which allows the radiation-absorbing region to be made relatively thick for increased radiation-absorption capacity without adversely affecting displacement of the displaceable member.

The conversion device according to the first aspect also can comprise a mask for blocking portions of the readout light flux other than a portion to which the optically effecting portion imparts a change to the characteristic of the readout light flux. The portion of the readout light flux that is changed by the optically effecting portion and exits from the optically effecting portion constitutes the "signal light". The mask prevents admixture of the signal light with "noise light" (readout light reflected from other locations) and thus improves the signal-to-noise (S/N) ratio.

The conversion device also (or alternatively) can comprise an antireflection film for preventing reflection of portions of the readout light flux other than a portion to which the optically effecting portion imparts a change to the characteristic. The antireflection film prevents reflection of readout light from locations other than the optically effecting portion, thereby improving the S/N ratio of the device.

The conversion device also (or alternatively) can comprise a reflector for reflecting the incident radiation. Such a reflector preferably is separated from the radiation-absorbing region by a gap of $n\lambda_0/4$, wherein n is an odd number and $\lambda_0$ is a center wavelength of the incident radiation.

The optically effecting portion can comprise a reflector for reflecting the received readout light flux. In such an instance, the reflector forms a part of the suspended portion, is displaced in accordance with displacement of the displaceable member, and reflects the readout light flux. (Indeed, the reflector can form a portion of the displaceable member, in which instance the reflector forms at least a part of the displaceable member and thus simplifies the device.) The reflector helps define an optical cavity that increases the radiation-absorbing efficiency of the radiation-absorbing material and the efficiency with which the incident radiation is converted to heat.

The optically effecting portion can comprise "interference means" for receiving the readout light flux and changing the readout light flux to an interference light flux exhibiting an interference state that varies in accordance with the displacement of the displaceable member.

By way of example, the interference means can comprise a half-mirror portion and a reflector. The half-mirror portion preferably comprises a portion of the suspended portion and exhibits a displacement in accordance with the displacement of the displaceable member. With such a configuration, the half-mirror portion reflects a portion of the received readout light flux. The reflector preferably is fixed with respect to the substrate and preferably is situated so as to be opposite the half-mirror portion.

The displaceable member can be provided with a limited range of displacement, the range being such that a change in the interference state of the interference light flux is monotonic. Inversion phenomena can arise in which interference intensity is inverted whenever the invisible radiation to be detected has an excessive intensity. (Interference intensity can be alternately strong or weak whenever the optical path difference equals half the wavelength of the readout light.) By limiting the displacement range of the displaceable member, an inversion phenomenon caused by excessive radiation can be prevented.

When the optically effecting portion comprises interference means, the readout light flux can be obtained by, for example, splitting a light flux from a light source into multiple beams. The reflectors are irradiated with one of the split bears (serving as the actual readout light beam) causing interference between readout light reflected from the reflectors and "reference light" (readout light that is another of the split beams). Thus, interference light can be obtained outside the conversion device by using the reflected light from the reflectors.

If the optically effecting portion itself serves as the interference means, the interference light beam can be obtained inside the conversion device for each pixel independently of any of the other pixels, thereby improving the possible uniformity of output signals from the pixels under appropriate conditions. With such a configuration, having to provide an interference optical system outside of the conversion device is unnecessary; this simplifies the readout optical system.

The interference means can comprise the half-mirror portion (on the suspended portion) for reflecting a portion of the received readout light flux and a reflector that is fixed relative to the substrate and situated opposite the half-mirror portion.

According to a second aspect of the invention, a method is provided for detecting an incident radiation. The method comprises a first step in which a member is provided comprising a first material that is absorptive for the incident radiation and that converts absorbed radiation to heat sufficient to cause the member to exhibit a displacement. In a second step, radiation is directed to be incident on the first material so as to cause the first material to convert the incident radiation to heat sufficient to cause the member to exhibit a displacement. In a third step, a readout light flux is directed to the member such that the readout light flux exhibits a change in a characteristic in accordance with the displacement, so as to detect the displacement. Thus, the incident radiation is converted to heat, the heat is converted to a corresponding displacement, the displacement causes a corresponding change in a readout light flux, and change is detected.

Displacement detection using light can be performed with high sensitivity. Because the incident radiation is converted to a displacement via heat rather than by a change in electrical resistance, self-heating is avoided. Consequently, only heat generated by the incident radiation is detected, yielding improved detection accuracy. Also, a cooler and circuitry for amplifying a weak electrical signal are unnecessary.

According to a third aspect of the invention, an image-rendering method is provided. In a first step of the method, multiple separate members are provided on a substrate. Each member comprises a first material that is absorptive for an incident radiation and that converts absorbed radiation to heat sufficient to cause the respective member to exhibit a displacement relative to the substrate. In a second step, the radiation is directed so as to be incident on the members so as to cause, in each member, the first material to convert the radiation incident on the respective member to heat and thus cause the respective member to exhibit a corresponding displacement relative to the substrate. In a third step, a readout light flux is directed to the members such that, at each member, the readout light flux exhibits a change in a characteristic in accordance with the displacement of the respective member, so as to form an optical image from the collective displacements of the members. If a visible light flux is used as the readout light, then the optical image can be observed by the human eye without any need to employ an intervening electric signal or image data. Alternatively, the optical image can be "picked up" using an image-pickup device such as a change-coupled-devices array (CCD array).

According to a fourth aspect of the invention, a radiation-detection apparatus is provided that comprises a conversion device as summarized, for example, above, and a displacement detector that irradiates the optically effecting portion with the readout light flux and detects the displacement of the displaceable member based on the respective changed characteristic of the readout light flux. Since the displacement of the displaceable member corresponds to the amount of absorbed radiation, a displacement-detection signal from the displacement detector is ultimately a radiation-detection signal According to a fifth aspect of the invention, an image-rendering apparatus is provided. The apparatus comprises a conversion device, as summarized above, comprising multiple pixels. The apparatus also comprises a readout optical system that comprises (1) means for irradiating the optically effecting portion of each of the pixels with the readout light flux; (2) means for receiving readout light flux having the changed characteristic from the pixels; and (3) means for forming an optical image, from the received readout light flux having the changed characteristic, in accordance with the collective displacements of the displaceable members of the pixels. Such an apparatus allows an image of the incident irradiation to be formed with higher accuracy and with greater sensitivity than obtained with conventional apparatus. If the readout light is visible light, then the optical image can be observed directly by the human eye. Alternatively, the image can be picked up using an image-pickup device.

According to a sixth aspect of the invention, an image-rendering apparatus is provided that comprises a conversion device as summarized above having multiple pixels each including a reflector. The apparatus also comprises a readout optical system. The readout optical system comprises a beamsplitter for receiving a readout light flux and splitting the readout light flux into first and second readout beams, irradiating the reflector of the optically effecting portion of each of the pixels with the first readout beam, and causing readout light reflected from the reflectors to interfere with readout light from the second beam so as to generate interference light from each of the pixels. The readout optical system also comprises a lens for forming an optical image from the interference light. Thus, this apparatus, by way of example, produces an interference light flux outside the conversion device and forms an optical image using the interference light.

In this apparatus, the range of displacement of the displaceable member can be limited so that any change in the interference state caused by displacement of the displaceable portion is monotonic. This helps prevent an inversion phenomenon from occurring.

According to a seventh aspect of the invention, an image-rendering apparatus is provided that comprises multiple pixels each having a reflector. The apparatus also comprises a readout optical system for irradiating the reflector of each pixel with the readout light, and for forming an optical image from the collected images from each pixel formed by readout light reflected from the respective reflectors. The amount of light from each reflector varies with the inclination of the respective reflector. This apparatus further can comprise a pupil for blocking the readout light reflected from the reflector of each pixel by an amount corresponding to the inclination of the reflector. The apparatus also can comprise an image-pickup device.

According to an eighth aspect of the invention, an image-rendering apparatus is provided that comprises a conversion device as summarized above comprising multiple pixels each comprising a reflector. The apparatus also comprises a readout optical system. The readout optical system comprises means for receiving the readout light flux and for irradiating the reflectors of the pixels with the readout light flux such that, with respect to each pixel, the readout light is focused at a predetermined focus location relative to the respective reflector. The readout optical system also comprises means for passing the readout light reflected from each pixel through a corresponding aperture defined by a diaphragm plate situated conjugate with the focus locations, wherein each aperture is located at a position corresponding to the respective focus position. The readout optical system also comprises means for forming an optical image from the readout light collectively reflected from the reflectors of the pixels and passed through the apertures, respectively. This apparatus also can include an image-pickup device.

According to a ninth aspect of the invention, an image-rendering apparatus is provided. The apparatus comprises a conversion device as summarized above and comprising multiple pixels each including a reflector. The apparatus also comprises a readout optical system. The readout optical system comprises means for irradiating the reflector of each pixel with the readout light. The readout optical system also comprises means for directing the readout light reflected from the reflector of each pixel to a predetermined plane, and means for forming an optical image from the aggregate reflected readout light from the pixels at a location at which the readout light reflected from each pixel reaches the predetermined plane while exhibiting a characteristic that varies in accordance with the inclination of the respective reflector. This apparatus also can comprise an image-pickup device.

According to a tenth aspect of the invention, an image-rendering apparatus is provided that comprises a conversion device as summarized above comprising multiple pixels each comprising a reflector. The apparatus also comprises a readout optical system that comprises means for irradiating the reflector of each of the pixels with a flux of polarized readout light. The readout optical system also comprises means for receiving readout light from each of the reflectors and for focusing the reflected readout light in an image-forming way. The readout optical system also comprises means for collectively receiving the focused images from the reflectors, and means for analyzing the received collected images so as to form an aggregate optical image from the readout light reflected from the reflectors. This apparatus can include an image-pickup device.

According to an eleventh aspect of the invention, an image-rendering apparatus is provided that comprises a conversion device as summarized above comprising multiple pixels each including a reflector. The apparatus also comprises a readout optical system comprising means for irradiating the reflector of each of the pixels with the readout light flux. The readout optical system also comprises means for receiving readout light reflected from the reflectors of the pixels. The readout light flux also comprises means for forming, by phase difference, an optical image from the received readout light. The optical image is formed in accordance with the collective displacements of the displaceable members of the pixels. This apparatus also can include an image-pickup device.

According to a twelfth aspect of the invention, an image-rendering apparatus is provided that comprises a conversion device as summarized above comprising multiple pixels each comprising a reflector. The apparatus also comprises a readout optical system that comprises means for irradiating the reflector of each of the pixels with the readout light. The readout optical system also comprises means for receiving readout light reflected from the reflectors of the pixels, and means for forming, by differential interference, an optical image from the received readout light. The optical image is formed in accordance with the collective displacements of the displaceable members of the pixels.

This apparatus also can include an image-pickup device. The image-pickup device can comprise multiple pixels in a one-to-one correspondence with the optically effecting portions of the pixels of the conversion device. In such a configuration, the readout optical system forms the optical image such that each of the pixels of the image-pickup device receives only the changed readout light flux exiting from the corresponding optically effecting portion of the pixels. This configuration provides for an improved S/N ratio without the need to include a mask or an antireflection film. The image formed by the readout optical system of each optically effecting portion of the conversion device can be of a size that is the same as or larger than the size of the effective light-receiving area of the respective pixel of the image-pickup device.

The conversion devices and image-rendering apparatus summarized herein operate on a principle that is different from the operational principle exploited by conventional devices and apparatus. Specifically, conversion devices (and image-rendering apparatus comprising such conversion devices) according to the invention do not require that the energy of the incident radiation be converted into electrical energy. Rather, each pixel in a conversion device according to the invention receives radiation, generates heat, produces a displacement corresponding to the heat, changes a received readout light by an amount corresponding to the displacement, and emits the changed readout light. The readout optical system illuminates each pixel with the readout light and forms an optical image from the readout light collectively emitted from the pixels.

According to a thirteenth aspect of the invention, a method is provided for fabricating a conversion device such as any of the devices summarized above. In a first step of the method, with respect to each pixel, a sacrificial layer is formed on a substrate. Also formed on the substrate is a leg portion for supporting a displaceable member such that the sacrificial layer is disposed at least around the leg portion and an upper part of the leg portion is left exposed. In a second step, first and second films are formed. The first and second films are formed on the leg portion and extend into the sacrificial layer to define a desired profile of the displaceable member. The second film is superposed on the first film, and these films have different coefficients of thermal expansion relative to each other. In a third step, the sacrificial layer is removed. Thus, the displaceable member is formed by adroitly using the sacrificial layer. I.e., during fabrication, the displaceable member is supported by and affixed to the sacrificial layer until the sacrificial layer is removed. This avoids defects such as deformation or breakage of the displaceable member during fabrication.

In the foregoing method, one of the first and second films can serve as a film in the conversion device that absorbs the incident radiation, e.g., an IR-absorbing film. However, formation of an, e.g., IR-absorbing film that is separate from the first and second films (which constitute the displaceable member) permits an optimum film to be selected for each of the three films according to their desired function.

In the foregoing method, a step can be included either before or after forming the first and second films, in which step a radiation-absorbing (e.g., IR-absorbing) film is formed for each pixel. The radiation-absorbing film underlaps or overlaps, respectively, the first and second film.

Another step can be included that is performed either before or after forming the first and second layers, in which step a readout-light-reflective film is formed for each pixel. The readout-light-reflective film underlaps or overlaps, respectively, the first and second films. If the readout-light-reflective film is used as the optically effecting portion, one of the first and second films can be used as the readout-light-reflective film. However, by forming the readout-light-reflective film separately of the first and second films, a conversion device can be fabricated having increased reflectivity for the readout light and thus greater sensitivity. This is because forming the readout-light-reflective film separately from the first and second films permits an optimum material to be selected for each of these films according to the anticipated respective function of the films.

The sacrificial layer may be removed by, for example, wet-etching, dry-etching, ox plasma etching. In plasma etching, a subsequent dry process is unnecessary. In wet-etching, a subsequent drying step can be performed by freeze-drying, solidification-sublimation, or the like, after the etchant is rinsed off. Solidification-sublimation typically involves immersion in a naphthalene solution, withdrawal from the solution, and solidification of residual naphthalene. Solidified naphthalene can be sublimated merely by leaving it as it is. However, solidification-sublimation is not limited to use of naphthalene.

The method also can comprise the step of forming a film, antireflective for the incident radiation, on a surface of the substrate facing a predetermined direction of incidence of the radiation.

The method further can comprise the steps of forming, for each pixel: (1) a readout-light total-reflection mirror patterned into a desired shape between the substrate and the sacrificial layer; and (2) a readout-light half mirror on the sacrificial layer and connected to the first and second films opposite the readout-light total-reflection mirror.

According to the foregoing method, multiple conversion devices can be formed on a single substrate. In such an instance, before removing the sacrificial layer, the substrate is divided into individual chips each comprising a single conversion device.

Another object of the invention is to provide conversion devices (and image-rendering apparatus comprising such devices) that can produce an image of the incident radiation with high detection accuracy and high sensitivity without using a cooler, and that can produce a stable image of the incident radiation regardless of any changes in the temperature of the surrounding environment.

Thus, according to a fourteenth aspect of the invention, image-rendering apparatus are provided that comprise a conversion device, a readout optical system, a sealable container for housing the conversion device, a temperature stabilizer, a temperature sensor, and a temperature controller. The conversion device preferably comprises multiple pixels arranged on a substrate, and can be any of the conversion devices summarized above. Each of the pixels comprises (1) a radiation-absorbing material for receiving and absorbing an incident invisible radiation and for generating an amount of heat in the radiation-absorbing material that is a function of the amount of absorbed radiation; (2) a displaceable member that exhibits a displacement responsive to the heat generated in the radiation-absorbing material, the displacement having a magnitude that is a function of the amount of generated heat; and (3) an optically effecting portion that receives a readout light flux, imparts a change in a characteristic of the received readout light flux (the change having a magnitude that corresponds to the magnitude of the displacement), and emits the changed readout light. The readout optical system comprises (1) a first lens for receiving a directing a readout light flux to illuminate the pixels with the readout light, and (2) a second lens for receiving the changed readout light from the pixels and for forming an optical image corresponding to the collective displacements of the optically effecting portions of the pixels. The sealable container houses the conversion device in an environment suitably isolated from the external environment. The container comprises a window for transmitting the radiation. The temperature stabilizer (preferably located inside the container) maintains the conversion device at a desired temperature (as detected by the temperature sensor) in the container. The temperature controller is connected to the temperature sensor and to the temperature stabilizer and is operable to control the temperature stabilizer to maintain constancy of the temperature of the conversion device based on a temperature-detection signal from the temperature sensor. The environment inside the container is preferably at a subatmospheric pressure. To such end, the container also preferably comprises a gas scavenger. The apparatus also can comprise a thermal shield for reducing transfer of unwanted thermal energy to the conversion device. The thermal shield is coupled thermally to the temperature stabilizer inside the container.

Further with respect to the conversion device, the displaceable member can be insulated electrically from the substrate. The displaceable member can be configured as, e.g., a cantilever or diaphragm, and preferably comprises at least two superposed layers each made of a substance having a different coefficient of thermal expansion. The radiation-absorbing material can be a portion of the displaceable member, or can be affixed to the substrate and thermally coupled to the displaceable member.

The optically effecting portion is preferably a portion of the displaceable member and preferably comprises a reflector that becomes displaced relative to the substrate with any displacement of the displaceable member. With the displaceable member including a reflector, the optically effecting portion can function as an interference means that (1) splits readout light from a light source into multiple fluxes; (2) illuminates the reflector of each of the pixels with a first flux; (3) produces an interference light flux by superposing readout light reflected from the reflectors with a second flux; and (4) forms an optical image using the interference light flux.

The interference means can include a half-mirror that, in each pixel, constitutes a portion of the suspended portion, is displaced with the displaceable member, and reflects a portion of the received readout light. In such an instance, a reflector is mounted to the substrate so as to face the half-mirror.

According to a fifteenth aspect of the invention, conversion devices are provided that are particularly adapted for use with the image-rendering apparatus summarized above. The conversion device comprises a substrate on which are arranged one or more pixels. Each pixel comprises a first suspended portion, a second suspended portion, and an optically effecting portion. The first suspended portion is mounted via a first leg portion to the substrate such that the first suspended portion extends over a region of the substrate. The first suspended portion preferably comprises a radiation absorber that absorbs an invisible radiation and converts the absorbed radiation into heat. The first displaceable member exhibits a deflection relative to the substrate in response to the heat generated by the radiation absorber. The second suspended portion is mounted via a second leg portion to the substrate such that the second suspended portion extends over a region of the substrate. The second suspended portion comprises a second displaceable member that exhibits a deflection relative to the substrate. The deflection has a magnitude that is a function of the temperature of the substrate. The optically effecting portion receives a readout light flux, modifies the readout light flux, and produces a modified output light. The output light modification has a magnitude relative to the readout light flux, the magnitude corresponding to a displacement of the first and second displaceable member relative to each other. The first displaceable member exhibits a direction of displacement due to generated heat that is similar to a direction of any displacement of the second displaceable member.

Each of the first and second displaceable members preferably comprises at least two layers each made of a material having a different coefficient of thermal expansion.

The optically effecting portion can comprise interference means that receives the readout light flux, provides a path difference to the readout light flux, and outputs the readout light flux as a coherent output light. The coherency of the output light corresponds in such an instance to the displacement of the first and second displaceable members relative to each other.

The interference means can comprise a half-mirror portion and a total-reflection mirror positioned so as to face each other. The half-mirror portion and the total-reflection mirror thus are mounted respectively mounted on opposing displaceable members. The half-mirror portion changes its position according to the displacement of the respective displaceable member on which it is mounted, and the total-reelection mirror changes its position according to the displacement of the respective displaceable member on which it is mounted.

The first displaceable member can exhibit a deflection in response to the temperature of the substrate. Thus, the magnitude of the displacement of the first displaceable member and the magnitude of the displacement of the second displaceable member, resulting from a particular substrate temperature, are substantially equal. The first and second displaceable members also can have equal thermal-related time constants.

According to a sixteenth aspect of the invention, conversion devices are provided that comprise a substrate, a first suspended portion, a second suspended portion, and an optically effecting portion. The first suspended portion is mounted to the substrate so as to extend over a region of the substrate. The first suspended portion comprises (1) a radiation absorber that receives and absorbs an invisible radiation and generates heat from the absorbed radiation, and (2) a first displaceable member that exhibits a deformation in response to the heat generated by the radiation absorber. The deformation causes a deflection of the first displaceable member in a direction relative to the substrate. The second suspended portion is mounted to the substrate so as to extend over a region of the substrate. The second suspended portion comprises a second displaceable member that exhibits a deflection relative to the substrate in response to substrate temperature. The displacement of the second displaceable member has a direction that is opposite to the direction of the first displaceable member so as to effectively cancel any influence by substrate temperature on net deflection. The optically effecting portion receives a readout light flux, modifies the readout light flux, and outputs the modified readout light. The modification is of an amount corresponding to the displacement of the first and second displaceable members relative to each other.

Displacement of the second displaceable member in a direction opposite to the displacement direction of the first displaceable member can be effected by use of a displacement suppressor. The second displaceable member can be coupled mechanically to the first displaceable member by a connector having a large thermal resistivity.

Each of the first and second displaceable members preferably comprises at least two layers each made of a material having a different coefficient of thermal expansion.

The optically effecting portion can comprise a reflector for reflecting the readout light flux. The reflector can be a portion of the first suspended portion, wherein the reflector changes its position relative to the substrate according to the displacement of the first displaceable member. The optically effecting means can comprise interference means for receiving the readout light flux, providing a path difference to the readout light, and producing an output light exhibiting a coherency corresponding to the displacement of the first displaceable member. The interference means can comprise a half-mirror portion for reflecting a portion of the readout light flux, and a total-reflection mirror mounted to the substrate and facing the half-mirror portion. The half-mirror portion in such a configuration is a portion of the first suspended portion and exhibits a change in position according to the displacement of the first displaceable member.

The first displaceable member can exhibit a deflection in response to substrate temperature. Such deflection has a magnitude that is substantially equal to the magnitude of displacement of the second displaceable member due to substrate temperature. The first and second displaceable members can exhibit substantially equal thermal-related time constants.

The apparatus also can comprise an image-pickup device for picking up the optical image of the incident radiation. Alternatively, the image can be viewed using the unaided eye.

The temperature of the conversion device (more specifically of the substrate) preferably is maintained constant by enclosing the conversion device in a sealable container equipped with a temperature sensor for sensing the temperature of the conversion device, a temperature stabilizer (preferably located inside the container), and a temperature controller for controlling the temperature stabilizer based on a detection signal from the temperature sensor. The inside of the container preferably is maintained under a subatmospheric pressure. The container also preferably encloses a gas scavenger and a thermal shield thermally coupled with the temperature stabilizer. Thus, a stable image of the radiation can be obtained regardless of changes in the temperature of the surrounding environment.

According to a seventeenth aspect of the invention, radiation-detecting apparatus are provided. The apparatus comprises a conversion device and a displacement sensor. The conversion device has, for each pixel of the device, a two-level structure comprising a first suspended portion and a second suspended portion mounted to a substrate. The first suspended portion is situated above the second suspended portion. The first suspended portion comprises a radiation absorber for receiving an incident radiation and converting the received radiation into heat, and a first displaceable member that exhibits a deformation in response to the heat generated in the radiation absorber so as to cause the first displaceable member to exhibit a displacement relative to the substrate. The second suspended portion comprises a second displaceable member that exhibits a displacement relative to the substrate depending upon the substrate temperature. The conversion device also comprises an optically effecting portion that receives a readout light flux, modifies the readout light, and outputs the modified readout light. The readout light is modified by an amount that is a function of the deflections of the first and second displaceable members relative to each other. The direction of displacement of the first displaceable member is preferably the same as the direction of displacement of the second displaceable member.

Preferably, the incident radiation is directed to one surface of the radiation absorber, while the readout light is directed to the other surface of the radiation absorber. Alternatively, the radiation and the readout light can be directed to the same surface of the radiation absorber.

The first displaceable member is supported above the substrate by a first leg portion. The second displaceable member is used to cancel any significant effect of substrate temperature on displacement of the first displaceable member. The second displaceable member exhibits a deflection in response to substrate temperature. Because the direction of displacement of the second displaceable member is the same as the direction of displacement of the first displaceable member, the relative displacement between the first and second displaceable members is a function only of the heat generated by the incident radiation.

Preferably, each of the first and second displaceable members comprises two or more layers each made of a different material having different coefficient of thermal expansion, thus forming a thermal bimorph structure.

The optically effecting portion can comprise, e.g., interference means that provides a path difference to the readout light and outputs coherent light produced as a result of interference based on the path difference. In such an instance, the coherency of the output light represents the displacement of the first and second displaceable members relative to each other because the path difference (preferably twice the distance between the first and second suspended portions) defines the coherency of the output light. In conversion devices comprising multiple pixels, coherent light can be obtained independently from each of the pixels without causing interference fringes or offset signals.

The interference means preferably comprises, for each pixel, a half-mirror portion and a total-reflection mirror facing the half-mirror portion. The half-mirror portion can be part of either the first or the second displaceable member so as to experience a displacement along with any displacement of the first or second displaceable member, respectively. In such an instance, the total-reflection is a part of the other displaceable member and experiences a displacement along with any displacement of the respective displaceable member.

If the optically effecting portion comprises a reflector, then readout light preferably is split into two components before the readout light enters the conversion device. One light component is directed to the reflectors of the pixels, and the other component is used as reference light. The readout light reflected by the reflectors interferes with the reference light and a coherent light is produced outside the conversion device. If the heights of the reflectors vary among the pixels of the conversion device, or if the alignment of the mirror for reflecting the reference light is slightly offset, then interference fringes could arise (even without any incident radiation), and offset signals produced. Configuring the optically effecting portion itself as the interference means allows coherent light to be produced inside the conversion device, thereby preventing the generation of offset signals, and allowing use of a simple readout optical system utilizing interference of light.

According to yet another aspect of the invention, radiation-detecting apparatus are provided. Such an apparatus comprises a conversion device as summarized above and a displacement sensor. The displacement sensor comprises a lens for directing the readout light flux toward the optically effecting portion of the conversion device, and a detector for detecting the displacement at least of the first displaceable member by detecting the modification in the output light relative to the readout light. Since a change in the readout light corresponds to the amount of absorbed radiation, a displacement signal generated by the detector is a function of the amount of absorbed radiation.

If visible light is used as the readout light, then the optical image formed can be observed by the unaided eye. This is a great advantage because, in a conventional infrared sensor, an optical image of the detected infrared light cannot be observed until the light is converted to electric signals or image data and displayed on a screen. Of course, optical images formed by visible readout light according to the invention can be converted further to electric signals by use of an appropriate image-pickup device.

The foregoing and additional features and advantages of the present invention will be more readily apparent from the following detailed description, which proceeds with reference to the accompanying drawings by way of non-limiting example embodiments of the present invention.

BRIEF DESCRIPTION OF THE DRAWINGS

FIGS. 1(a) and 1(b) are elevational sectional views and FIG. 1(c) is a plan view (along the line A–A' in FIG. 1(a)) of a single pixel of the conversion device, and FIG. 1(d) is a plan view of multiple pixels.

FIGS. 12(a)–12(b) schematically depict a sealable container enclosing a conversion device, according to Example Embodiment 9, wherein FIG. 12(a) is a sectional view and FIG. 12(b) is a plan view from the perspective of line B–B' in FIG. 12(a).

FIGS. 14(a)–14(d) are schematic elevational sectional views of various features of a single pixel of a conversion device according to Example Embodiment 10.

FIGS. 15(a)–15(c) are schematic depictions of various features of a single pixel of a conversion device according to Example Embodiment 11, wherein FIGS. 15(a)–15(b) are elevational sectional views and FIG. 15(c) is a plan view from the perspective of line C–C' of FIG. 15(a).

FIGS. 16(a)–16(b) are schematic depictions of various features of a conversion device according to Example Embodiment 12, wherein FIG. 16(a) is a partial cutaway plan view of four pixels, and FIG. 16(b) is an elevational sectional view of two pixels along the line D–D' of FIG. 16(a), showing certain operational principles.

FIGS. 21(a)–21(b) are schematic elevational sectional views of two pixels of the conversion device of Example Embodiment 14, wherein FIG. 21(a) is a section along the line E–E' of FIG. 20, and FIG. 21(b) is a section along the line F–F' of FIG. 20.

FIGS. 22(a)–22(j) schematically illustrate, in elevational sectional views of a single pixel, the results of certain steps in a method for fabricating the conversion device of Example Embodiment 14, wherein FIGS. 22(a), 22(c), 22(e), 22(g), and 22(i) represent sections along the line E–E' in FIG. 20; and FIGS. 22(b), 22(d), 22(f), 22(h), and 22(i) represent sections along the line F–F' of FIG. 20.

FIGS. 24(a)–24(d) schematically depict various aspects of a single pixel of a two-level conversion device according to Example Embodiment 16, wherein FIG. 24(a) is a schematic plan view of an upper level, FIG. 24(b) is a schematic plan view of a lower level (i.e., a level closer to the substrate than the upper level), FIG. 24(c) is an elevational sectional view along the line C–C' of FIG. 24(a), and FIG. 24(d) is an elevational sectional view along the line D–D' of FIG. 24(a).

FIGS. 26(a)–26(f) depict, in schematic elevational views of a single pixel, the results of certain steps of a process for fabricating the conversion device of Example Embodiment 16, wherein FIGS. 26(a), 26(c), and 26(e) represent sections along the line D–D' of FIG. 24(a); and FIGS. 26(b), 26(d), and 26(f) represent sections along the line C–C' of FIG. 24(a).

FIGS. 27(a)–27(e) schematically depict various aspects of a single pixel of a conversion device according to Example Embodiment 17, wherein FIG. 27(a) is a plan view, FIG. 27(b) is an elevational sectional view along the line H–H' in FIG. 27(a), FIG. 27(c) is an elevational sectional view along the line E–E' of FIG. 27(a), FIG. 27(d) is an elevational sectional view along the line F–F' of FIG. 27(a), and FIG. 27(e) is an elevational sectional view along the line G–G' of FIG. 27(a).

FIGS. 28(a)–28(t) schematically depict, in elevational sectional views of a single pixel, the results of certain steps of a process for fabricating the conversion device of Example Embodiment 17, wherein FIGS. 28(a), 28(e), 28(i), 28(m), and 28(q) represent sections along the line D–D' of FIG. 27(a); FIGS. 28(b), 28(f), 28(j), 28(n), and 28(r) represent sections along the line E–E' of FIG. 27(a); FIGS. 28(c), 28(g), 28(k), 28(o), and 28(s) represent sections along the line F–F' of FIG. 27(a); and FIGS. 28(d), 28(h), 28(l), 28(p), and 28(t) represent sections along the line G–G' of FIG. 27(a).

FIGS. 29(a)–29(d) schematically depict various aspects of a single pixel of a conversion device according to Example Embodiment 18. wherein FIG. 29(a) is a plan view, FIG. 29(b) is an elevational sectional view along the line H–H' in FIG. 29(a), FIG. 29(c) is an elevational sectional view along the line J–J' of FIG. 29(a), and FIG. 29(d) is an elevational sectional view along the line K–K' of FIG. 29(a).

FIGS. 30(a)–30(j) schematically depict, in elevational sectional views of a single pixel, the results of certain steps in a process for fabricating the conversion device of Example Embodiment 18, wherein FIGS. 30(a), 30(c), 30(e), 30(g), and 30(i) represent sections along the line J–J' of FIG. 29(a); and FIGS. 30(b), 30(d), 30(f), 30(h), and 30(j) represent sections along the line K–K' of FIG. 29(a).

FIGS. 31(a)–31(d) schematically depict various aspects of a single pixel of a conversion device according to Example Embodiment 19, wherein FIG. 31(a) is a plan view, FIG. 31(b) is an elevational sectional view along the line L–L' of FIG. 31(a), FIG. 31(c) is an elevational sectional view along the line M–M' of FIG. 31(a), and FIG. 31(d) is an elevational sectional view along the line N–N' of FIG. 31(a).

FIGS. 32(a)–32(h) schematically depict, in elevational sectional views of a single pixel, the results of certain steps in a process for fabricating the conversion device of Example Embodiment 19, wherein FIGS. 32(a), 32(c), 32(e), and 32(g) represent sections along the line M–M' of FIG. 31(a), and FIGS. 32(b), 32(d), 32(f), and 32(h) represent sections along the line N–N' of FIG. 31(a).

DETAILED DESCRIPTION

In the following description, examples are provided in which the detected radiation comprises infrared rays and the readout light comprises a beam of visible light. However, it will be understood that various other kinds of electromagnetic radiation can be detected other than infrared light, such as ultraviolet light or X-rays; it will also be understood that the readout light can be other than visible light.

Example Embodiment 1

Figure 1A:
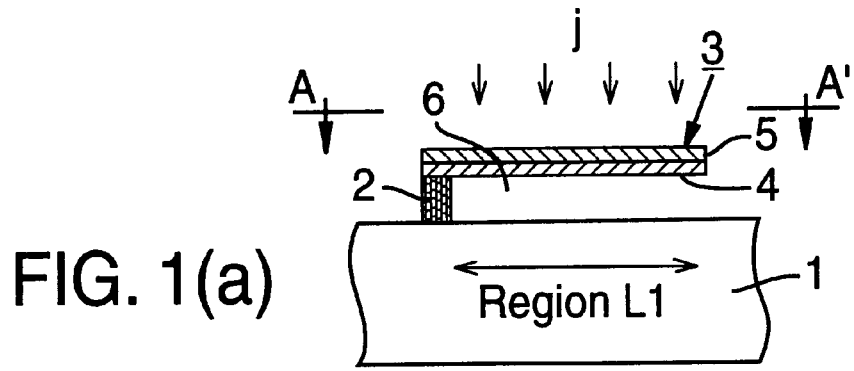
FIGS. 1(a)–1(d) schematically illustrate various aspects of an optically readable radiation-displacement-conversion device ("conversion device") according to Example Embodiment 1.
Figure 1B:
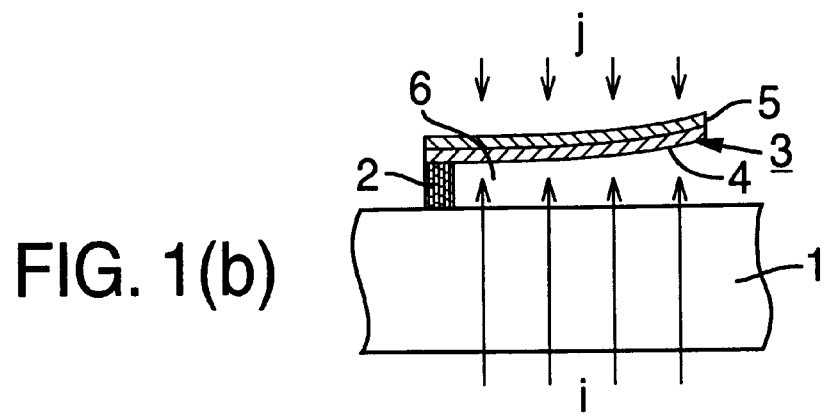
Figure 1C:
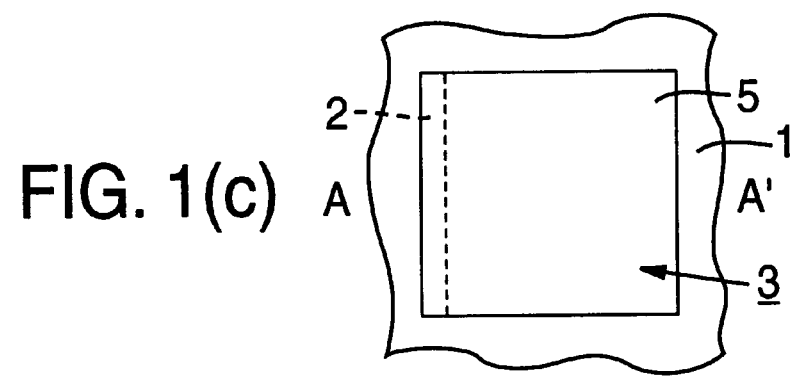
Figure 1D:
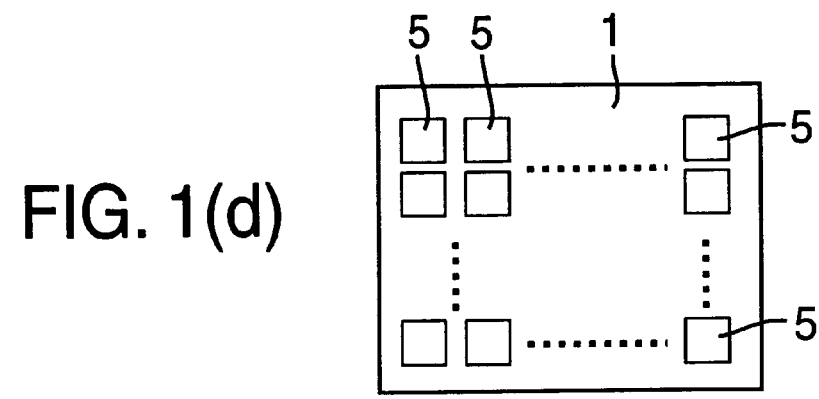

An optically readable radiation displacement-conversion device ("conversion device") according to this example embodiment is described with reference to FIGS. 1(a)–1(d). FIG. 1(a) is a sectional view schematically showing a single pixel (unit element) of the device before irradiating the pixel with infrared rays i (as an example of the various types of electromagnetic radiation that could be used). FIG. 1(b) is a sectional view schematically showing the pixel of FIG. 1(a) as irradiated with infrared rays i. FIG. 1(c) is a plan view of the pixel of FIG. 1(a) seen from the direction represented by the arrows A–A' in FIG. 1(a). FIG. 1(d) is a plan view showing a representative array of pixels of the device.

The conversion device comprises a substrate 1 serving as a base, a suspended portion 3 that is attached to the substrate 1 by a leg portion 2. Thus, the suspended portion 3 extends over a region of the substrate 1 with an air gap between the suspended portion 3 and the substrate 1.

The substrate 1 preferably is formed of a material that is transmissive to infrared light to allow the infrared light i to pass through the substrate 1 from below and strike the underside of the suspended portion 3 while readout light j (e.g., visible light) is allowed to strike the upper side of the suspended portion 3. For example, the substrate 1 can be made of germanium or silicon.

As an alternative, the device can be configured such that the readout light j passes through the substrate 1 and strikes the underside of the suspended portion 3, and the infrared light i strikes the upper side of the suspended portion 3. In this alternative configuration, the substrate 1 preferably is formed of a material that can transmit the readout light.

The material used for the substrate 1 need not be limited as described above if the substrate is provided with suitable openings therethrough (e.g., region L1 in FIG. 1(a)) to allow either the infrared light or the readout light to pass through the substrate to the underside of the suspended portions 3.

Each suspended portion 3 comprises first and second superposed films 4, 5, respectively. In the configuration shown in FIGS. 1(a)–1(d), the first film 4 serves as an infrared-absorber for receiving incident infrared rays i and converting the rays to heat. The second film 5 serves as a readout-light reflector. The first and second films 4, 5 are formed of different materials having different coefficients of thermal expansion, thus forming a so-called "thermal bimorph" structure. Hence, in this example embodiment, the first and second films 4, 5 collectively form a "displaceable member" that exhibits a deflection relative to the substrate 1 by an amount corresponding to the amount of heat generated in the first film 4 by absorption of infrared light.

The first and second films 4, 5 are cantilevered in this example embodiment over a region of the substrate 1. If the coefficient of thermal expansion of the first film 4 is greater than the coefficient of thermal expansion of he second film 5, absorption of infrared light by the first film 4 causes the first film to heat relative to the second film 5. This causes the first film 4 to expand relative to the second film 5 which causes the suspended portion 3 to bend upward relative to the substrate 1, as shown in FIG. 1(b). Deflection of the suspended portion 3 is downward if the coefficient of thermal expansion of the first film 4 is smaller than that of the second film 5. In either instance, absorption of infrared radiation by the first film 4 causes the suspended portion 3 to be inclined relative to the substrate 1. If the first film 4 is the "radiation absorber," then the second film 5 serves as a reflector for reflecting the readout light j, thus forming an "optically effecting portion" of the device. The direction in which the readout light j is reflected depends on the amount of deflection of the suspended portion 3. The readout light exits the device as a reflected light beam.

As can be readily ascertained from the foregoing, the conversion device according to this example embodiment has a simple and inexpensive structure.

As an infrared absorber, the first film 4 can be made of any of various suitable materials such as gold oxide, ceramics (e.g., sintered mixtures of two or more of the following: $ZrO_2$, $MnO_2$, $FeO_3$, CoO, CuO, $Al_2O_3$, MgO, $SiO_2$), positive resists, negative resists, graphite (carbon), or SiN. As a readout-light reflector, the second film 5 can be made of any of the materials listed in Table 1, below, or of materials such as Al, Ag, MgO, or the like.

Further alternative configurations are as follows: (a) The suspended portion 3 may be formed by laminating three films in which a lowermost film is formed of the same material as the first film 4, an uppermost film is formed of the same material as the second film 5, and with an intermediate film therebetween formed of a material having a coefficient of thermal expansion that is different from that of the lowermost film. (b) The suspended portion 3 may be formed by laminating three films in which a lowermost film is formed of the same material as the first film 4, an uppermost film is formed of the same material as the second film 5, and with an intermediate film therebetween formed of a material having a coefficient of thermal expansion different from that of the uppermost film. (c) The supported portion 3 may be formed by laminating four films in which a lowermost film is formed of the same material as the first film 4, an uppermost film is formed of the same material as the second film 5, and with two intermediate films therebetween that are formed of any two different materials having different coefficients of expansion. Materials for making the intermediate films can selected from any of the known thermal bimorph materials such as those listed Table 1. The intermediate films alternatively can be made of a combination of a metal film (e.g., Zn, Cd, Pb, Mg, Al, Ni, W, Pt, or the like) and an insulating film ($SiO_2$, SiN, polyimide, or the like), or a combination of an insulating film and another insulating film. A semiconductor film (e.g., polycrystalline silicon, amorphous silicon (α-Si), InSb, HgCdTe, or the like) may be used in place of the metal film.

TABLE 1

Material for bimetal

| Metal with small coefficient of expansion | Metal with large coefficient of expansion | Specific deflection a | Specific curvature K | Maximum available temperature |
|---|---|---|---|---|
| 36% Ni + Fe | 20% Ni + 6% Mn + Fe | 0.156 | $3.12 \times 10^{-4}$ | 250° C. |
| 38% Ni + Fe | 20% Ni + 6% Mn + Fe | 0.140 | $2.80 \times 10^{-4}$ | 300° C. |
| 42% Ni + Fe | 20% Ni + 6% Mn + Fe | 0.110 | $2.20 \times 10^{-4}$ | 400° C. |

Further with respect to FIGS. 1(a)–1(d), one end of the suspended portion 3 is attached to the substrate 1 via the leg portion 2 to define a gap 6 between the suspended portion 3 and the substrate 1. Thus, the displaceable member formed by the first and second films 4, 5 defines a cantilever. This configuration increases the thermal resistance between the suspended portion 3 and the substrate 1. The leg portion can be made of an insulating material such as $SiO_2$ so as to electrically insulate the suspended portion 3 from the substrate 1. (A material such as $SiO_2$ desirably has a low thermal conductivity and a high thermal resistance to further increase the thermal resistance between the suspended portion 3 and the substrate 1.) As a result, it is difficult for heat energy to escape by conduction from the supported portion 3; this allows the temperature of the first film 4 to experience a substantial increase with a small amount of incident infrared radiation, resulting in improved infrared detection sensitivity.

Each of the units shown in FIGS. 1(a)–1(c) constitutes one "pixel" (image element) of the device of this example embodiment. As shown in FIG. 1(d), the pixels in a device according to this example embodiment having multiple pixels can be arranged in a two-dimensional array on the substrate 1. Alternatively, the pixels may be arranged one-dimensionally on the substrate 1, if desired. Further alternatively, the device can comprise only one pixel of the substrate 1 if the device is to be used only for detecting the intensity of an incident radiation.

Figure 2A:
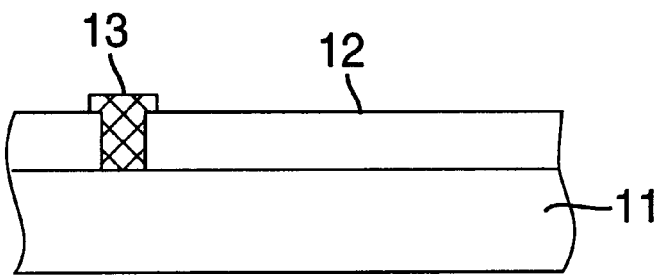
FIGS. 2(a)–2(c) schematically depict, in elevational sectional views of a single pixel, the results of certain steps of a first representative method for fabricating the conversion device of Example Embodiment 1.
Figure 2B:
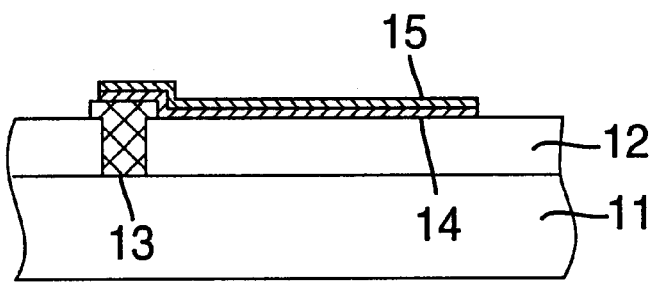
Figure 2C:
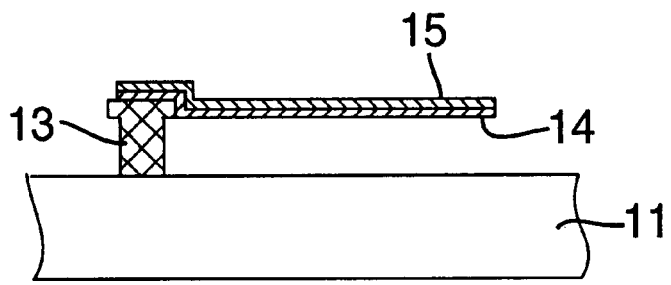

The conversion device of this example embodiment can be fabricated using a method that utilizes certain steps used in conventional semiconductor fabrication processes, for example. A representative fabrication method is shown in FIGS. 2(a)–2(c). FIGS. 2(a)–2(c) are sectional views schematically showing certain steps of the fabrication method.

In the depicted method, a polyimide film 12 (such as used to form a resist, for example) having a thickness of, e.g., 1 μm is formed as a sacrificial layer on the entire surface of a silicon substrate 11 (corresponding to the substrate 1) by spin-coating or the like. A portion of the polyimide film 12 is removed (by photolithography and etching) at each location at which the leg portion 2 is to be formed. A silicon oxide film 13 (having a thickness of, for example, 5000 Å and destined to form the leg portion 2), is deposited on the entire surface of the polyimide film 12 by a low-temperature process such as plasma (VD to fill in the openings in the polyimide film 12. The silicon oxide film 13 is patterned by photolithography and etching to define the leg portion 2 (FIG. 2(a)). In the resulting structure, the polyimide film 12 is situated, as the sacrificial layer, around the remaining portions of the silicon oxide film 13, with upper portions of the silicon oxide film 13 being exposed.

Next, a film 14 of gold oxide (having a thickness of, e.g., 2000 Å and destined to form the first film 4) and a film 15 of aluminum (having a thickness of, e.g., 2000 Å and destined to form the second film 5) are formed successively on the polyimide film 12 and the silicon oxide film 13 by sputtering. The films 14, 15 are patterned according to the desired shapes of the first and second films 4, 5 by photolithography and etching (FIG. 2(b)).

The polyimide film 12 is removed by elution with a suitable organic solvent, or by plasma etching, for example (FIG. 2(c)). This completes formation of the conversion device.

The steps of the fabrication method described above are derived from known semiconductor process techniques. Thus, the conversion device of FIGS. 1(a)–1(d) can be fabricated easily. During fabrication, the displaceable member (the films 14 and 15) is supported by the sacrificial layer (film 12) until the sacrificial layer is removed. Such support minimizes defects such as deformation or breakage of the displaceable portion during fabrication.

Normally, multiple units of the conversion device of this example embodiment are fabricated at the same time on a single substrate 11 using the fabrication method described above. Afterward, the substrate 11 is cut into individual "chips". Separating the individual chips from each other preferably is performed before removing the polyimide film 12 (the sacrificial layer), i.e., after the step shown in FIG. 2(b). Cutting the chips before removing the sacrificial layer minimizes deformation or breakage of the displaceable member, thereby increasing the yield of the process.

An alternative method for fabricating the conversion device of FIGS. 1(a)–1(d) is shown in FIGS. 3(a)–3(f), depicting schematic sectional views of certain steps in the alternative method. The sections are in the same orientation as that of FIG. 1(a).

In a first step of the method, a polyimide film 312 (e.g., a resist layer; having a thickness of 1 μm, for example; and destined to serve as a sacrificial layer) is formed on the entire surface of a silicon substrate 311 (corresponding to the substrate 1) by spin-coating or the like. An aperture 312a is formed at each location on the polyimide film 312 corresponding to the desired location of a leg portion 2. The aperture 312a is formed by photolithography and etching (FIG. 3(a)).

Next, a silicon nitride film 313 (having a thickness of, e.g., 1 μm; destined to be the leg portion 2) is deposited on the entire surface of the polyimide film 312 so as to fill in the apertures 312a. The silicon nitride film is formed by a low-temperature process such as plasma CVD or the like (FIG. 3(b)).

In the next step, portions of the silicon nitride film 313 and the polyimide film 312 are removed in such a manner that the upper surface of the polyimide film 312 is exposed in regions other than the anticipated location of the leg portion 2. Such removal is performed by CMP, entire etchback, or the like. Afterward, the remaining surfaces of the films 313 and 312 are planarized (FIG. 3(c)). The result is a structure including the substrate 311, the remaining polyimide film 312 formed on the substrate 311, and the leg portion 2 (formed from the silicon nitride film 313). The polyimide film 312 is in regions around the leg portion 2. The upper part of the leg portions 2 is exposed.

Figure 3A:
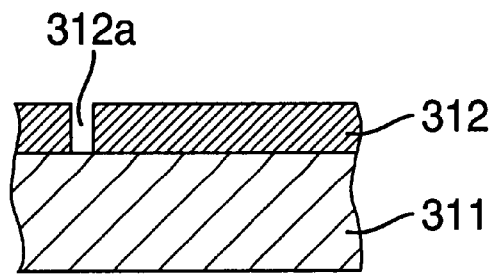
FIGS. 3(a)–3(f) schematically depict, in elevational sectional views of a single pixel, the results of certain steps of a second representative method for fabricating the conversion device of Example Embodiment 1.
Figure 3B:
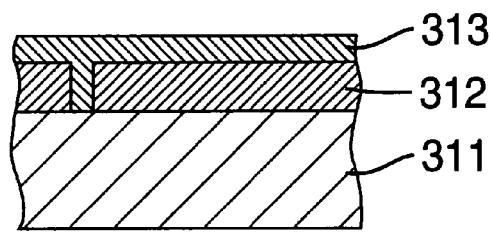
Figure 3C:
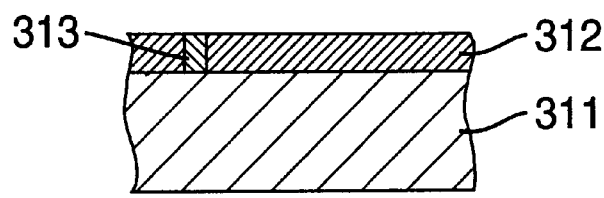
Figure 3D:
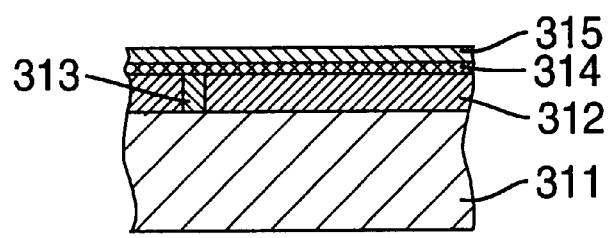

In the next step, a silicon oxide film 314 (having a thickness of, e.g., 2000 Å; destined to become the first film 4) and an aluminum film 315 (having a thickness of, e.g., 2000 Å; destined to become the second film 5) are formed successively on the polyimide film 312 (and exposed portions of the silicon nitride film 313) by sputtering, evaporation, or CVD (FIG. 3(d)). The silicon oxide film 314 and aluminum film 315 are patterned according to the anticipated shape and dimensions of the suspended portion 3 by photolithography and etching (FIG. 3(e)).

Figure 3E:
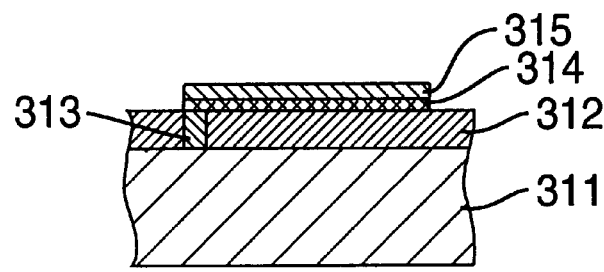

Next, although not shown in the drawings, the substrate in the state shown in FIG. 3(e) is cut as required into individual chips. During such cutting, forces are applied to the chips by sprayed water. But, since the films 314, 315 are supported during such cutting by the silicon nitride film 313 and by the polyimide film 312, the probability of deforming or fracturing the films 314, 315 is greatly reduced.

Figure 3F:
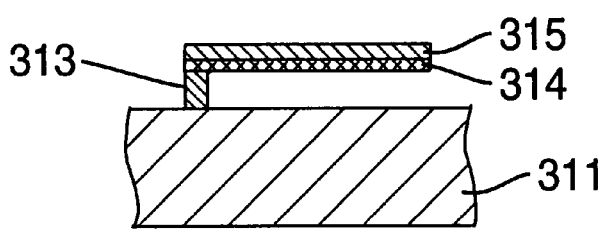

Finally, the polyimide film 312 (sacrificial layer) is removed (FIG. 3(f)) to complete fabrication of the conversion device of FIGS. 1(a)–1(d). Removal of the polyimide film 312 may be performed by wet-etching, dry-etching, or the like. If wet-etching is employed, the chips are dried by a solidification-sublimation method or the like after the etchant is rinsed off. A solidification-sublimation method is preferred because it prevents capillary action from urging contact of the film 314 with the substrate 311.

Either of the fabrication methods described above permit the conversion device of FIGS. 1(a)–1(d) to be fabricated easily. During fabrication, the displaceable member (i.e., the silicon oxide film 314 and the aluminum film 315) is supported by and fixed to the sacrificial layer (the polyimide film 312) until the sacrificial layer is removed. As a result, deformation or breakage of the displaceable member does not occur.

In the fabrication step shown in FIG. 3(c), only the portion of the silicon nitride film 313 corresponding to the leg portion 2 remains. However, if the leg portion 2 and the first film 4 are formed of the same silicon nitride film, the leg portion 2 and the first film 4 can be formed simultaneously by patterning the silicon nitride film 313 (FIG. 3(b)) by photolithography and etching (to define the anticipated shapes and dimensions of the leg portion 2 and first film 4) rather than the planarizing step shown in FIG. 3(c). In such an instance, only the aluminum film 315 (corresponding to the second film 5) is patterned in the step shown in FIG. 3(d).

Another alternative method for fabricating the conversion device of FIGS. 1(a)–1(d) is shown in FIGS. 4(a)–4(e). FIGS. 4(a)–4(e) are schematic sectional views from a perspective as used in FIG. 1(a).

Figure 4A:
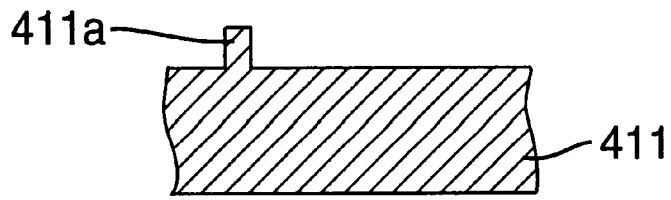
FIGS. 4(a)–4(e) schematically depict, in elevational sectional views of a single pixel, the results of certain steps of a third representative method for fabricating the conversion device of Example Embodiment 1.

In a first step of the method, an upper portion of a silicon substrate 411 (corresponding to the substrate 1) is removed by photolithography and etching, leaving a portion 411a (having a height of, e.g., 1 µm) destined to become the leg portion 2 (FIG. 4(a)). Although not shown in the drawings, the leg portion 2 alternatively can be formed by forming a silicon nitride film on the entire surface of the substrate 411 and subjecting the silicon nitride film to photolithography and etching sufficient to leave the leg portion 2 as the sole remaining portion of the silicon nitride film.

Figure 4B:
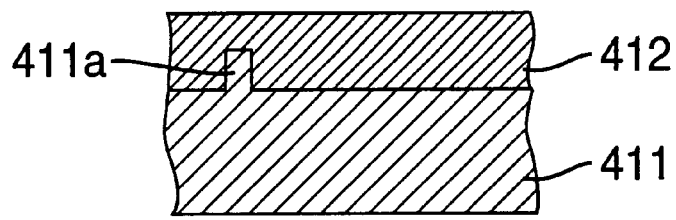
Figure 4C:
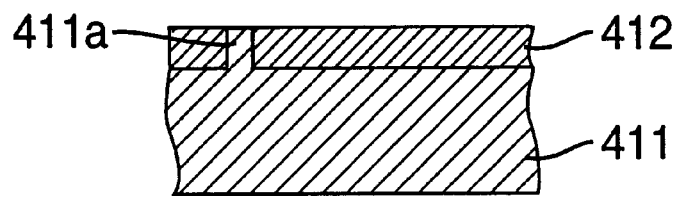

In the next step, a polyimide film 412 (e.g., a resist, having a thickness of, e.g., 2 µm) is formed on the substrate of FIG. 4(a) by spin-coating or the like (FIG. 4(b)).

In the next step, portions of the polyimide film 412 and of the portion 411a of the substrate 411 destined to be the leg portion are removed so that the upper surface of the polyimide film 412 is exposed in regions other than the leg portion 2. This removal is performed by CMP, entire etchback, or the like. The surfaces of the portion 411a and the polyimide film 412 are then planarized (FIG. 4(c)) to form a structure including the substrate 411, the polyimide film 412, and the portion 411a. The polyimide film 412 serves as a sacrificial layer around the portion 411a, with the top of the portion 411a being exposed.

A silicon oxide film 414 having a thickness of, e.g., 2000 Å; and destined to become the first film 4) and an aluminum layer 415 (having a thickness of, e.g., 2000 Å; and destined to become the second film 5) are formed successively on the polyimide film 412 and the portion 411a. The films 414, 415 are applied by sputtering, evaporation, CVD, or other suitable technique. The films 414, 415 are patterned according to the intended shape and dimension of the suspended portion 3 by photolithography and etching (FIG. 4(d)).

Figure 4D:
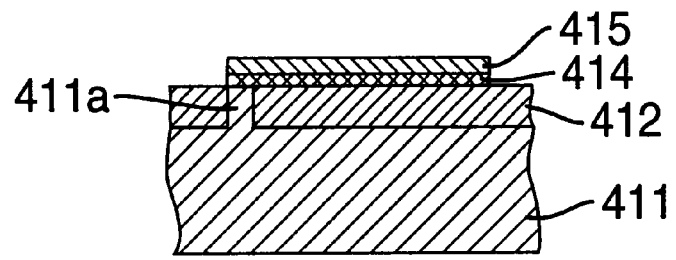

Although not shown in the drawings, the substrate as shown in FIG. 4(d) is cut into individual chips. Such cutting involves application of sprayed water. However, since the films 414, 415 are supported by not only the portion 411a but also the polyimide film 412. Consequently, no deformation or breakage of the films 414, 415 occurs during cutting.

Figure 4E:
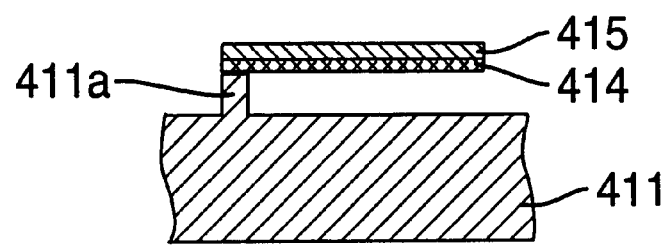

Finally, the polyimide film 412 (i.e., the sacrificial layer) is removed (FIG. 4(e)) to complete fabrication of the conversion device shown in FIGS. 1(a)–1(d). Removal of the polyimide film 412 can be performed by wet-etching, dry-etching, or the like. If the polyimide film 412 is removed by wet-etching, drying is performed preferably by freeze-drying, by solidification-sublimation, or other analogous method after the etchant is rinsed off.

The steps shown in FIGS. 4(a)–4(e) allow the conversion device of FIGS. 1(a)–1(d) to be fabricated easily. Because the suspended portion 3 (silicon oxide film 414 and aluminum film 415) is supported by and fixed to the sacrificial layer (the polyimide film 412) until the sacrificial layer is removed, deformation or breakage of the displaceable portion during fabrication is avoided.

As described above, in the conversion device of FIGS. 1(a)–1(d), the first film 4 serves as both a part of the displaceable portion and the radiation absorber and the second film 5 serves as both another part of the displaceable portion and the readout-light reflector, wherein the readout-light reflector serves as the optically effecting portion. However, one or both of the readout-light reflector and the radiation absorber can be formed independently of the films 4, 5. Also, the conversion device of this example embodiment can be fabricated by a fabrication method such as shown in FIGS. 2(a)–2(c), FIGS. 3(a)–3(f), or FIGS. 4(a)–4(e) to include a step of forming one or both of the readout-light-reflecting film and the IR-absorbing film in a manner similar to the formation of films 4 and 5.

In this example embodiment (FIGS. 1(a)–1(d)), infrared light i enters from below (FIG. 1(b)). The infrared light i is transmitted through the substrate 1, absorbed by the first film 4, and converted to heat. As shown in FIG. 1(b), heating of the first film 4 causes the suspended portion to bend upward. The amount of upward displacement of the films 4, 5 corresponds to the amount of incident infrared radiation absorbed by the first film 4. The readout light beam j enters from above (FIGS. 1(a)–1(b)) to illuminate the second film 5. The second film 5 reflects the readout light beam j and thus changes the propagation direction of the readout light beam j. The amount of change in direction of the readout light beam j is proportional to the displacement of the suspended portion 3. Thus, an amount of infrared radiation absorbed by the first film 4 is converted to a corresponding change in propagation direction of reflected readout light.

Detecting the amount of displacement of the suspended portion 3 using reading light in the manner described above can be performed with high sensitivity. Since incident infrared radiation is converted to a corresponding change in the readout light beam via heating-caused displacement rather than a change in electrical resistance of a bolometer, flowing an electric current through the supported portion 3 is unnecessary. This avoids the self-heating that otherwise would occur in the suspended portion 3. Hence, this example embodiment measures only heating caused by the incident infrared radiation and consequently has an improved signal-to-noise (S/N) ratio and improved detection accuracy. Also, the cooler required in quantum-type infrared detectors is not required in the present example. Since infrared rays are not "read out" as an electric signal in this example embodiment, a readout circuit for reading weak electric signals from thermal-type infrared detectors is unnecessary.

Example Embodiment 2

Figure 5:
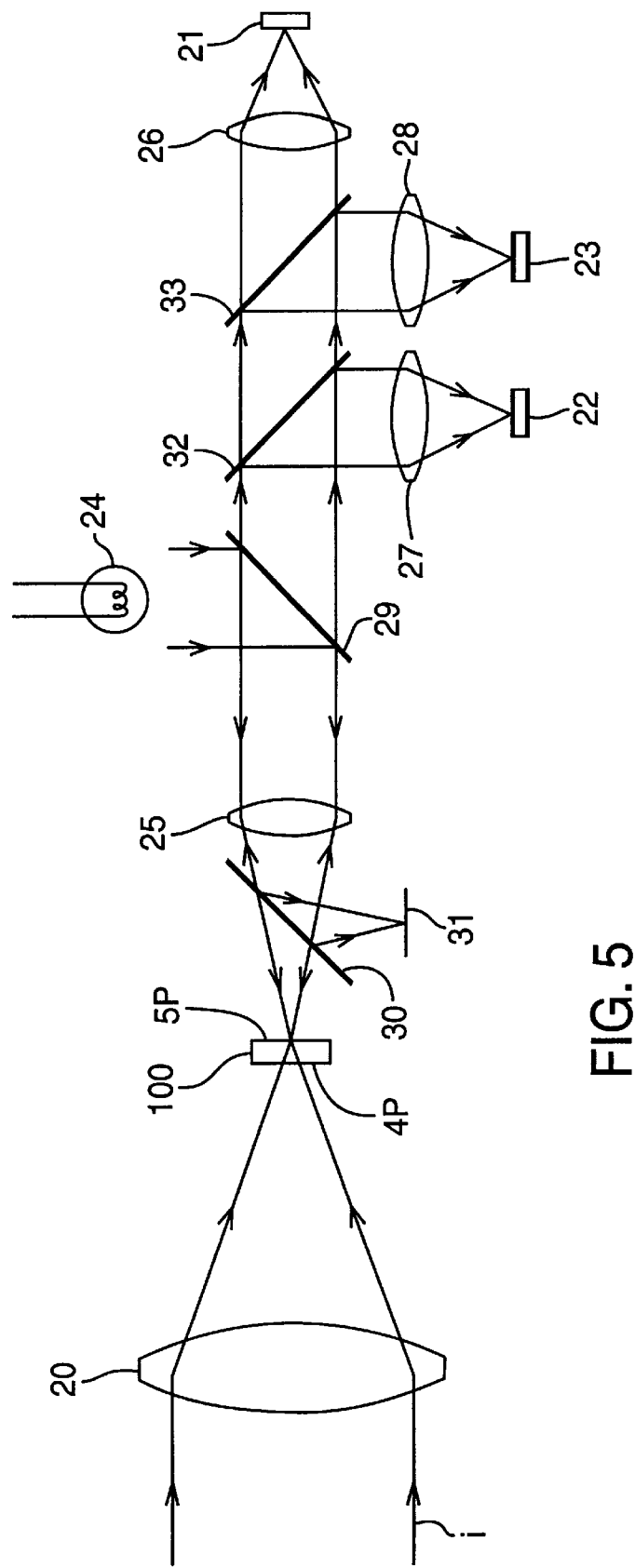
FIG. 5 is an optical diagram of an image-rendering apparatus according to Example Embodiment 2.

This example embodiment, shown in FIG. 5, is directed to an image-rendering apparatus comprising the optically readable radiation displacement-conversion device ("conversion device") of Example Embodiment 1 (denoted as item 100 in FIG. 5). In FIG. 5, right and left directions correspond to upward and downward directions, respectively, in FIG. 1(*a*). The FIG. 5 apparatus comprises an imaging lens 20 transmissive to infrared light. The imaging lens 20 converges a flux i of infrared light to form an infrared image on a plane 4P defined by the first films 4 (FIG. 1(*a*)) of all the pixels of the conversion device 100. The first films 4 absorb the infrared light and convert the absorbed light into heat. The image-rendering apparatus also comprises a readout optical system that irradiates a readout light flux on a plane 5P defined by the second films 5 (FIG. 1(*a*)) of all the pixels of the conversion device 100. The second films 5 reflect the readout light flux. The pixels of the conversion device 100 collectively form an optical image according to the aggregate of the individual displacements of the suspended portions 3 of the pixels. In other words, each pixel has a suspended portion 3 that undergoes a respective amount of displacement and, thus, exhibits a respective amount of deflection of light from the readout light flux. The image-rendering apparatus of FIG. 5 also comprises two-dimensional charge-coupled devices (CCDs) 21, 22, 23 that serve to pick up the optical image from the conversion device 100.

The image-rendering apparatus of FIG. 5 also comprises a source 24 of white readout light (such as a white lamp); lenses 25, 26, 27, 28; beamsplitters 29, 30; a total-reflection mirror 31; a dichroic mirror 32 for reflecting red (R) light; and a dichroic mirror 33 for reflecting blue (B) light. The readout optical system is configured so as to form an optical image by exploiting interference.

The lenses 25–28 place the plane 5P in a conjugate relationship with the planes defined by each of the light-receiving surfaces of the CCDs 21, 22, 23. Thus, the CCDs 21–23, the lenses 26–28, and the dichroic mirrors 32, 33 form a three-plate-type CCD camera for visible light. If required, an illumination lens can be placed between the white light source 24 and the beamsplitter 29.

The infrared light flux i is converged by the imaging lens 20 so as to form an infrared image on the plane 4P. Absorption of infrared light by the first films 4 of the pixels causes a corresponding displacement of each such pixel according to the amount of infrared radiation absorbed by the respective first film 4, as described in Example Embodiment 1.

A light flux produced by the white light source 24 is reflected by the beamsplitter 29 and propagates to the beamsplitter 30 via the lens 25. The white light flux is split by the beamsplitter 30 into a "readout light flux" that passes through the beamsplitter 30 so as to be incident on the first films 5 of the conversion device 100. Light of the white light flux reflected by the beamsplitter 30 is directed to the total-reflection mirror 31 to become a "reference light flux." Readout light flux incident on the first films 5 is reflected from the first films 5 and passes back through the beamsplitter 30 and through the lens 25. The reference light flux reflected from the total-reflection mirror 31 is reflected by the beamsplitter 30 to pass through the lens 25. In such a manner, the readout light flux and the reference light flux are combined with each other by the beamsplitter 30.

The combined light fluxes interfere with each other to form an "interference light flux." The interference light flux has an intensity profile exhibiting a shift in spectral distribution relative to the white light flux from the white light source 24. The magnitude of the shift is proportional to the magnitude of displacements exhibited by the second films 5 of the pixels of the conversion device 100 (i.e., the interference light flux exhibits a distribution of interference color corresponding to the displacement amounts of the films 5 of the pixels).

The interference light flux is transmitted by the beamsplitter 30 and the lens 25 in the rightward direction in FIG. 5, and is also transmitted by the beamsplitter 29. The interference light flux then undergoes color separation by the dichroic mirrors 32, 33. The R-light component of the interference light flux forms an optical image on the CCD 22 via the lens 27, the B-light component forms an optical image on the CCD 23 via the lens 28, and the green-light (G-light) component forms an optical image on the CCD 21 via the lens 26. The R, B, G optical images are picked up by the CCDs 21, 22, 23, respectively. Thus, the incident infrared image is converted to a visible image which is detected and "read out."

Although, in this example embodiment, the visible image is picked up by the CCDs 21, 22, 23, the visible image can be viewed by the human eye. To accomplish this, the dichroic mirrors 32, 33, the lenses 27, 28, and the CCDs 21–23 are omitted from the FIG. 5 configuration to allow a visible image formed at the plane of the CCD 21 to be observed by an unaided eye.

As an alternative to the white light source 24, a monochromatic light source such as a laser can be used. In such an instance, the interference image that is obtained has an intensity distribution corresponding to the displacement amounts of the second films 5 of the respective pixels of the conversion device 100 at the wavelength of the monochromatic light source. Consequently, a monochromatic CCD camera can be used. More specifically, the dichroic mirrors 32, 33, the lenses 27, 28, and the CCDs 22, 23 can be omitted from the FIG. 5 configuration. The CCD 21 also can be omitted to allow a monochromatic visible image, formed at the position of the CCD 21, to be viewed by the human eye.

If a light source that emits two monochromatic light fluxes having different wavelengths is used in place of the white light source 24, infrared images can be picked up over a wider dynamic range compared to when a single monochromatic light source is used. The wider dynamic range is realized because optical path differences can be observed even in a case of interference in which the phase difference is one wavelength or more, which could not be observed if a single monochromatic light flux were used.

Unless the range of displacement of the films 4, 5 of the conversion device 100 is restricted, an inversion phenomenon can occur (in which the intensity of the interference is inverted) whenever infrared radiation having an intensity exceeding a certain intensity limit is incident on the first films 4. This is because the intensity of the interference is alternately strong or weak whenever the optical path difference is equal to half the wavelength of the readout light flux. Thus, it is preferable to restrict the range of displacement of the films 4, 5 to a range equal to or less than one-fourth of the wavelength of the readout light flux so that changes in interference intensity due to the displacement of the films 4, 5 is monotonic. For example, if the films 4, 5 are configured so as to deflect downward in FIG. 1A with a increase in temperature, and if the distance between the first film 4 and the upper surface of the substrate 1 is ¼ or less of the wavelength of the readout light flux, then movement of the films 4, 5 is stopped whenever the distal edge of the first film 4 contacts the upper surface of the substrate 1 even if an excess amount of infrared radiation is incident on the first films.

The total-reflection mirror 31 should be aligned positionally with an appropriate position, especially whenever a monochromatic light source is used as the light source 24. If a white light source is used as the light source 24, the range of displacement of the films 4, 5 may be restricted so that a change in interference color caused by displacement of the films 4, 5 is monotonic. A specific restricting member as used for limiting the range of possible displacement of the films 4, 5 can be provided if required.

The lens 25 and the total-reflection mirror 31 can be replaced with a commercially available interference objective lens.

Example Embodiment 3

Figure 6A:
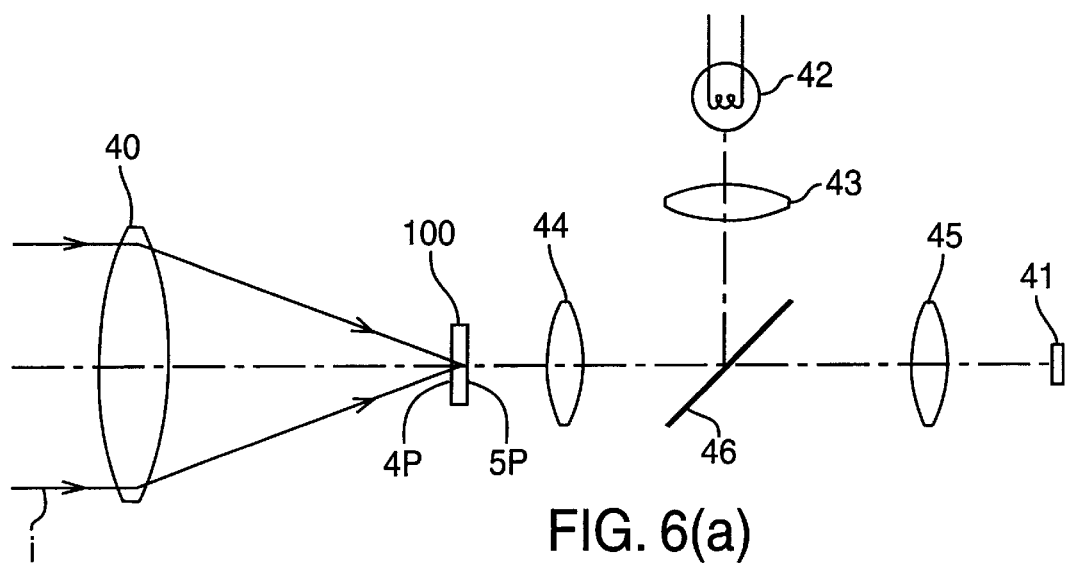
FIGS. 6(a)–6(c) are optical diagrams of an image-rendering apparatus according to Example Embodiment 3, wherein the apparatus is shown in FIG. 6(a) and certain operating principles of the apparatus are shown in FIGS. 6(b)–6(c).
Figure 6B:
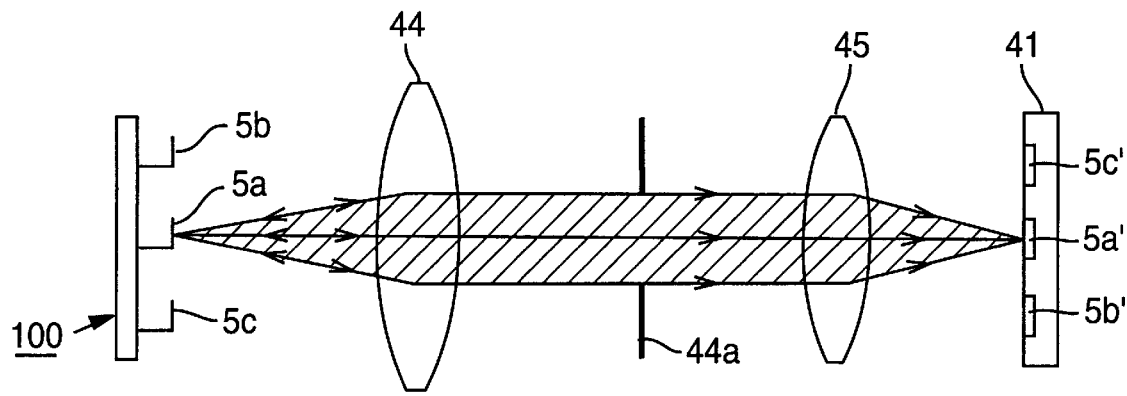
Figure 6C:
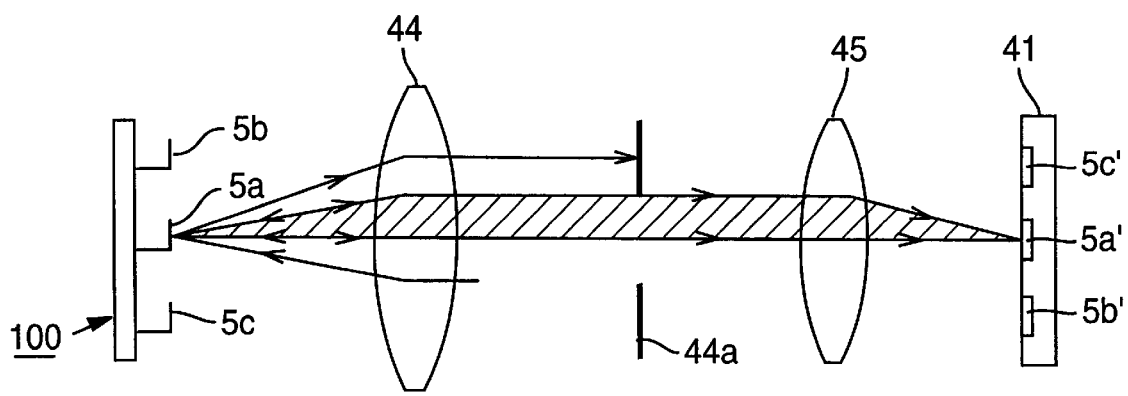

An image-rendering apparatus according to this example embodiment is shown in FIGS. 6(a)–6(c), wherein FIG. 6(a) schematically shows the configuration of the image-rendering apparatus; and FIGS. 6(b)–6(c) depict certain operating principles of the FIG. 6(a) embodiment.

The image-rendering apparatus of this example embodiment includes the conversion device described in Example Embodiment 1, which is denoted by the reference numeral 100 in FIGS. 6(a)–6(c). Also, in FIGS. 6(a)–6(c), right and left directions correspond to upward and downward directions, respectively, in FIG. 1(a).

Referring to FIG. 6(a), an imaging lens 40 transmissive to infrared light converges infrared rays i to form an infrared image on a plane 4P defined by the first films 4 (FIG. 1(a)) of the pixels of the conversion device 100. The films 4 absorb the infrared light and produce heat. The FIG. 6(a) apparatus comprises a readout optical system for irradiating the second films 5 (FIG. 1(a); the second films 5 collectively define the plane 5P of FIG. 6(a)) with a readout light flux. The films 5 (representatively denoted by reference numerals 5a, 5b, and 5c in FIGS. 6(b) and 6(c) for the respective pixels) serve as reflectors of the readout light flux so as to allow image formation collectively by the second films 5 of the pixels. The amount of readout light reflected from any of the second films 5 varies wits the inclination of the respective second film 5. A two-dimensional CCD 41 serves to pick up the optical images.

The image-rendering apparatus of FIG. 6(a) also comprises a light source 42 (which may be a white light source or a monochromatic light source); an illumination lens 43; lenses 44, 45; and a beamsplitter 46, which together constitute the readout optical system. The readout optical system is configured to exploit eclipsing by a pupil to form the optical images. The lenses 43, 44 place the plane 5P and the light-receiving surface of the CCD 41 in a conjugate relationship. The lenses 43, 44 are situated such that the readout light flux emitted by the light source 42 passes through the lenses 43, 44 and irradiates the conversion device 100. Whenever the second films are not inclined, the light from the light source 42 is reflected by the films 5 and passes through approximately the entire exit pupil 44a of the lens 44 (FIG. 6(b)).

The infrared flux i is converged by the imaging lens 40 so as to form an infrared image on the plane 4P. The inclination of the films 4, 5 of each pixel of the conversion device 100 is proportional to the amount of infrared radiation absorbed by the first film 4 of each respective pixel, as described in Example Embodiment 1.

The light flux from the light source 42 passes through the illumination lens 43 and is reflected by the beamsplitter 46. The light flux then passes through the lens 44 to irradiate the conversion device 100 as a readout light flux. Since the plane 5P is in conjugate relation with the light-receiving surface of the CCD 41, the bits of the optical image contributed by each pixel of the conversion device 100 are formed by the readout light beam at respective locations on the light-receiving surface of the CCD 41. I.e., as shown in FIGS. 6(b) and 6(c), an image of the second film 5a is formed at a respective location 5a' on the light-receiving surface of the CCD 41; an image of the second film 5b is formed at a respective location 5b'; and an image of the second film 5c is formed at a respective location 5c'.

As shown in FIG. 6(b), whenever the second film 5a is not inclined, readout light reflected therefrom passes through the lens 44, through approximately the entire pupil 44a, and through the lens 45 to be incident at the respective location 5a'. Thus, the image formed at the location 5a' is bright whenever the film 5a is not inclined.

As shown in FIG. 6(c), whenever the second film 5a is inclined by an amount corresponding to the amount of infrared radiation absorbed by the underlying first film, readout light reflects in a different direction from the second film 5a compared to the situation shown in FIG. 6(b). The angle of reflection is a function of the inclination of the second film 5a. Thus, whenever the second film 5a is inclined, some of the light reflected from the second film 5a is eclipsed (blocked) by the pupil 44a. Such blocking reduces the amount of light forming the image of the second film 5a at the location 5a'. In FIGS. 6(b) and 6(c), hatched regions denote portions of the light flux reflected from the second film 5a passing through the pupil 44a and thus reaching the location 5a'.

According to this example embodiment, an image of the second films 5 of the pixels is formed on the CCD 41, and the brightness of each portion of the image is a function of the inclination of he second film 5 of the respective pixel, and the inclination is a function of the amount of incident infrared radiation absorbed by the first film of the pixel. Hence, incident infrared image is converted into a visible image that can be picked up by the CCD 41.

As an alternative to picking up the visible images by the CCD 41 in this example embodiment, the visible images can be observed by the unaided human eye.

Example Embodiment 4

Figure 7A:
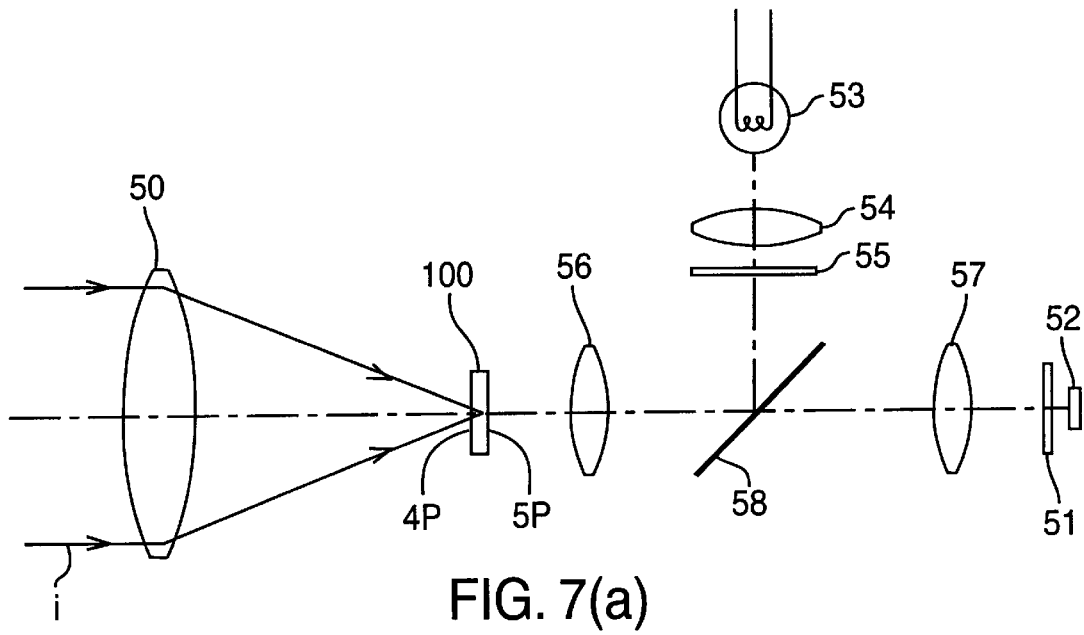
FIGS. 7(a)–7(b) are optical diagrams of an image-rendering apparatus according to Example Embodiment 4, wherein the apparatus is shown in FIG. 7(a) and certain operating principles of the apparatus are shown in FIG. 7(b).
Figure 7B:
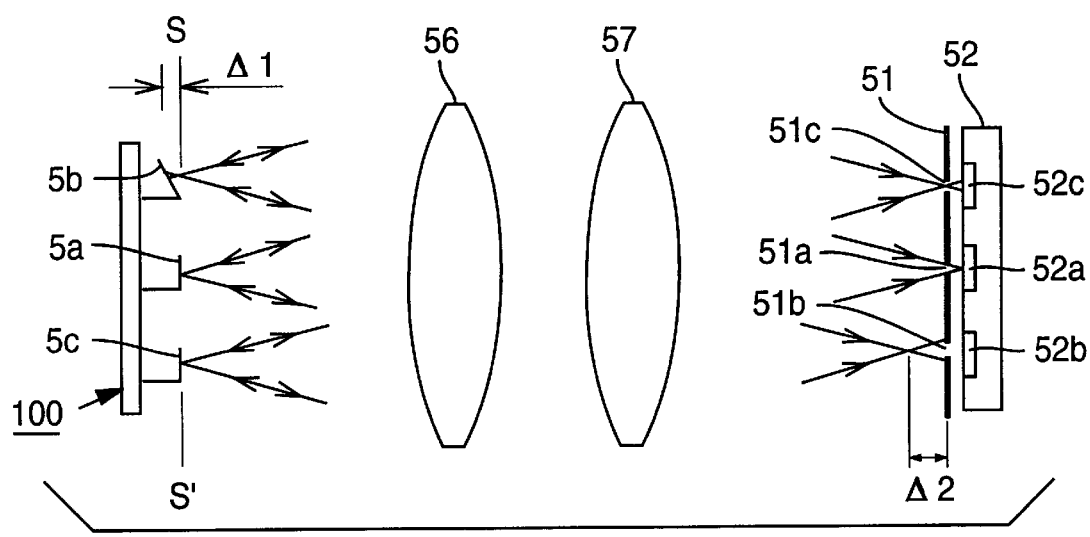

An image-rendering apparatus according to this example embodiment is shown in FIGS. 7(a)–7(b), wherein FIG. 7(a) schematically shows the optical configuration of the embodiment, and FIG. 7(b) depicts certain operating principles of this embodiment.

This example embodiment comprises an optically readable radiation-displacement-conversion device ("conversion device") as described above in Example Embodiment 1. In FIGS. 7(a)–7(b), the conversion device is denoted by the reference numeral 100, and right and left directions correspond to upward and downward directions, respectively, in FIG. 1(a). The FIG. 7(a) embodiment comprises an imaging lens 50 for converging an infrared light flux so as to form an infrared image on a plane 4P collectively defined by the first films 4 (FIG. 1(a)) of the pixels of the conversion device 100. The first films 4 serve as infrared absorbers. The FIG. 7(a) apparatus also comprises a readout optical system that irradiates a readout light flux on a plane 5P collectively defined by the second films 5 (FIG. 1(a)) of the pixels of the conversion device 100. In FIG. 7(b), three pixels are shown, comprising the second films 5a, 5b, and 5c, respectively. The second films 5a, 5b, 5c reflect respective portions of the readout light flux. The reflected readout light passes through lenses 56, 57 which focus the readout light at respective positions 52a, 52b, 52c on a two-dimensional CCD 52. Upstream of the CCD 52 is a diaphragm plate 51 defining a respective aperture 51a, 51b, 51c for each position 52a, 52b, 52c, respectively. In other words, readout light reflected from the second film 5a must pass through the aperture 51a to reach the position 52a. Thus, an image collectively defined by the second films of the pixels of the conversion device 100 is picked up by the CCD 52.

More specifically, in the image-forming apparatus of FIG. 7(a), the readout optical system comprises a light source 53 (which can be a white light source or a monochromatic light source); an illumination lens 54; a diaphragm plate 55 defining "pinhole" apertures (not shown) located at positions on the diaphragm plate 55 corresponding to the positions 52a, 52b, 52c, . . . ; lenses 56, 57; and a beamsplitter 58. The readout optical system of this example embodiment is configured to form an optical image using the principle of a confocal microscope. The second films 5a, 5b, 5c define a plane (denoted the S–S' plane) whenever the second films 5a, 5b, 5c are not inclined. The lenses 56, 57 place the diaphragm plate 51 in a conjugate relationship with the plane S–S', and the lens 56 places the diaphragm plate 55 in a conjugate relationship with the plane S–S'. The CCD 52 is disposed just downstream of the diaphragm plate 51.

Infrared rays i pass through the imaging lens 50 and converge on the plane 4P. The inclination of the films 4, 5 of each pixel is a function of the amount of infrared radiation absorbed by the respective first film 4 of the pixel, as described in Example Embodiment 1.

A light flux emitted from the light source 53 passes through the illumination lens 54 and the diaphragm plate 55 and is reflected by the beamsplitter 58. The light flux then passes through the lens 56 to be incident on the conversion device 100 as a readout light flux. Since the diaphragm plate 55 and the S–S' plane are in a conjugate relationship, an image of the diaphragm plate 55 (i.e., images of the pin holes defined by the diaphragm plate 55) is formed at the S–S' plane, as shown in FIG. 7(b). For example, the readout light flux illuminates the second films 5a, 5b, 5c of respective pixels and is focused at respective pinholes on the S–S' plane. Since the S–S' plane and the diaphragm plate 51 are in a conjugate relationship, the readout light flux reflecting from non-inclined second films 5a and 5c is focused by the lenses 56, 57 at the respective pinholes 51a and 51c of the diaphragm plate 51. Substantially all of each respective portion of reflected readout light passes through the pinholes 51a and 51c so as to reach an effective light-receiving area 52a, 52c, respectively, of the CCD 52. But, since the point on the second film 5b at which readout light is reflected is shifted from the S–S' plane by a distance $\Delta 1$ corresponding to the inclination of the second film 5b, the readout light reflected from the inclined second film 5b is focused by the lenses 56 and 57 at a position shifted forwardly a distance $\Delta 2$ from the respective pinhole 51b of the diaphragm plate 51. The distance $\Delta 2$ corresponds to the distance $\Delta 1$. As a result, the image formed by light reflected from the second film 5b is blurred on the diaphragm plate 51, and only a portion of the reflected readout light from the second film 5b passes through the respective pinhole 51b to reach the effective light-receiving area 52b of the corresponding pixel of the CCD 52. Thus, the amount of readout light reaching the area 52b is reduced by an amount corresponding to the distance $\Delta 1$.

Therefore, according to this example embodiment, images of the second films 5 of the pixels of the conversion device 100 are formed on respective pixels of the CCD 52. The brightness of the image portion contributed by each pixel of the conversion device 100 varies by an amount corresponding to the displacement $\Delta 1$ of the second film 5 of the pixel, i.e., by an amount corresponding to the amount of infrared radiation incident on the first film 4 of the pixel.

Although the diaphragm plate 55 is preferred in order to improve sensitivity, the diaphragm plate 55 may be omitted, and the readout light beam focused on the S–S' plane by the lenses 54 and 56.

A plane displaced from the S–S' plane by the distance of $\Delta 1$ may be arranged at a position that is conjugate with the diaphragm plate 51 and that is conjugate with the diaphragm plate 55.

Also, although the visible images are picked up by the CCD 52 in this example embodiment, the visible images also can be observed by the unaided human eye by altering the configuration in a manner as described above in Example Embodiment 2.

Example Embodiment 5

Figure 8A:
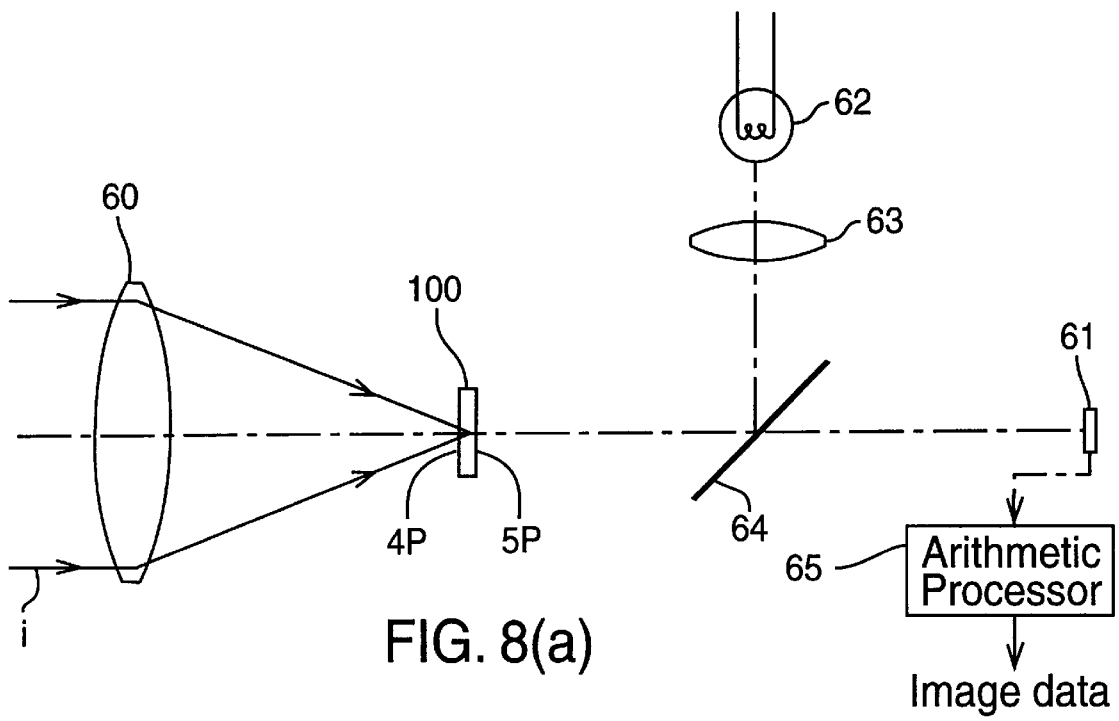
FIGS. 8(a)–8(c) are optical diagrams of an image-rendering apparatus according to Example Embodiment 5, wherein the apparatus is shown in FIG. 8(a) and certain operating principles of the apparatus are shown in FIGS. 8(b)–8(c).
Figure 8B:
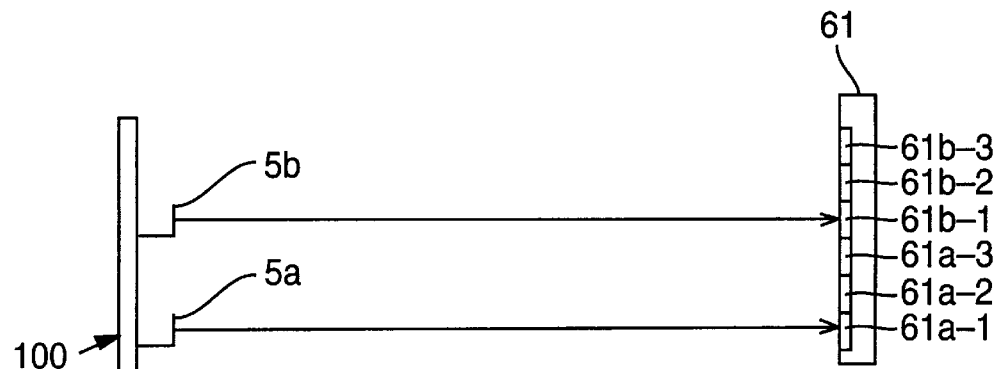
Figure 8C:
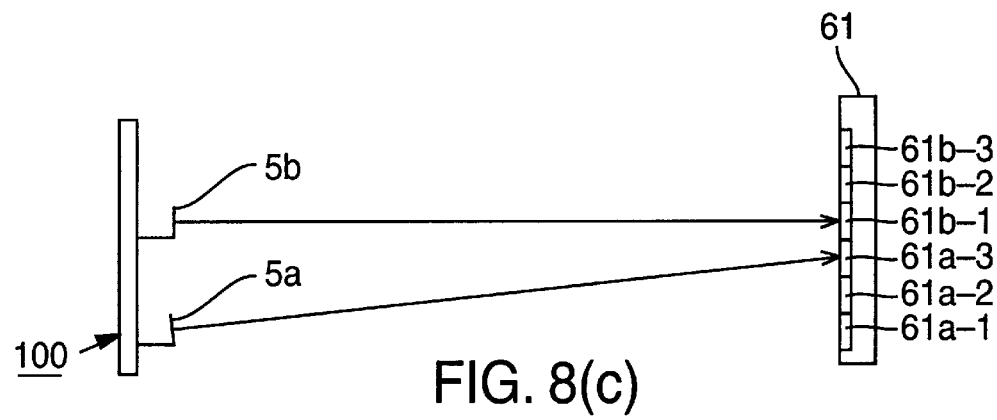

An image-rendering apparatus according to this example embodiment is shown FIGS. 8(a)–8(c), wherein FIG. 8(a) schematically shows the optical configuration of the image-rendering apparatus, and FIGS. 8(b)–8(c) depict certain operating principles of the embodiment.

This example embodiment comprises a conversion device as described in Example Embodiment 1 and denoted in FIGS. 8(a)–8(c) by reference numeral 100. Also with respect to FIGS. 8(a)–8(c), right and left directions correspond to upward and downward directions, respectively, in FIG. 1(a). The FIG. 8(a) embodiment comprises an infrared-transmissive imaging lens 60 for converging infrared light i and forming an infrared image on a plane 4P defined by the first films 4 (FIG. 1(a)) of the conversion device 100. The first films 4 serve as infrared absorbers. The FIG. 8(a) embodiment also comprises a readout optical system for irradiating a readout light flux onto the second films 5 (FIG. 1(a)) of the conversion device (representative pixels 5a and 5b are shown in FIG. 8(b)). The second films 5 serve as readout-light reflectors of the respective pixels of the conversion device 100. The readout optical system also directs the readout light flux, reflected from the pixels of the conversion device 100, to a plane at which optical images can be formed from the individual light fluxes from the respective pixels. Each pixel reflects a different amount of readout light on the imaging plane depending upon the inclination of the respective second film 5 of the pixel. The readout optical system also comprises a two-dimensional CCD 61 for picking up the optical image, and an arithmetical processor 65 connected to the CCD 61 for calculating infrared image data based on electrical signal from the CCD 61.

The readout optical system of the apparatus of FIG. 8(*a*) also comprises a light source 62 (which may be, e.g., a white light source or a monochromatic light source), an illumination lens 63, and a beamsplitter 64.

Infrared rays i are converged by the imaging lens 60 to form an infrared image on the plane 4P. The inclination of each pixel is a function of the corresponding amount of infrared radiation absorbed by the first film 4 of the respective pixel of the conversion device 100, as described in Example Embodiment 1.

A readout light flux emitted from the light source 62 passes through the illumination lens 63 and is reflected by the beamsplitter 64. The readout light flux is then incident on the second film 5 of the pixels of the conversion device 100 from which films the readout light is reflected. The direction of reflection of the readout light from a second film 5 of a pixel depends on the inclination of the film 5 of the respective pixel. The CCD 61 comprises a light-receiving surface that receives readout light from the conversion device 100. The intensity of readout light received at one or more particular pixels of the CCD 61 depends on the inclination angle of the second film 5 of a respective pixel on the conversion device.

For example, as shown in FIGS. 8(*b*) and 8(*c*), the CCD 61 comprises effective light-receiving areas 61*a*-1, 61*a*-2, 61*a*-3 on three pixels, respectively, corresponding to the second film 5*a*, and effective light-receiving areas 61*b*-1, 61*b*-2, 61*b*-3 on three pixels, respectively, corresponding to the second film 5*b*. Each group of three effective light-receiving areas is situated to receive light from a particular pixel on the conversion device 100. In FIG. 8(*b*), readout light reflected from the film 5*a* reaches the light-receiving area 61*a*-1 when the film 5*a* has no inclination. Readout light reflected from the film 5*a* reaches the light-receiving area 61*a*-2 when the film 5*a* has an intermediate inclination and, as shown in FIG. 8(*c*), readout light reflected from the film 5*a* reaches the light-receiving area 61*a*-3 when the film 5*a* has a large inclination. The light-receiving areas 61*a*-1 through 61*a*-3 are situated such that readout light from films other than the film 5*a* cannot reach them. Thus, the inclination of the film 5*a* (which is a function of the amount of incident infrared light absorbed by the respective first film of the pixel) can be determined by ascertaining which of the light-receiving areas 61*a*-1 through 61*a*-3 receives the readout light reflected from the second film 5*a*. Such data from the CCD 61 is utilized by the arithmetical processor 65 to formulate an image from the profile of incident infrared light on the conversion device 100.

A lens can be interposed between the conversion device 100 and the beamsplitter 64 or between the beamsplitter 64 and the CCD 61. With such a lens, the inclination of each second film 5*a* of the conversion device 100 can be ascertained by a corresponding change in the location on the CCD 61 at which the respective reflected readout light is incident.

Example Embodiment 6

Figure 9A:
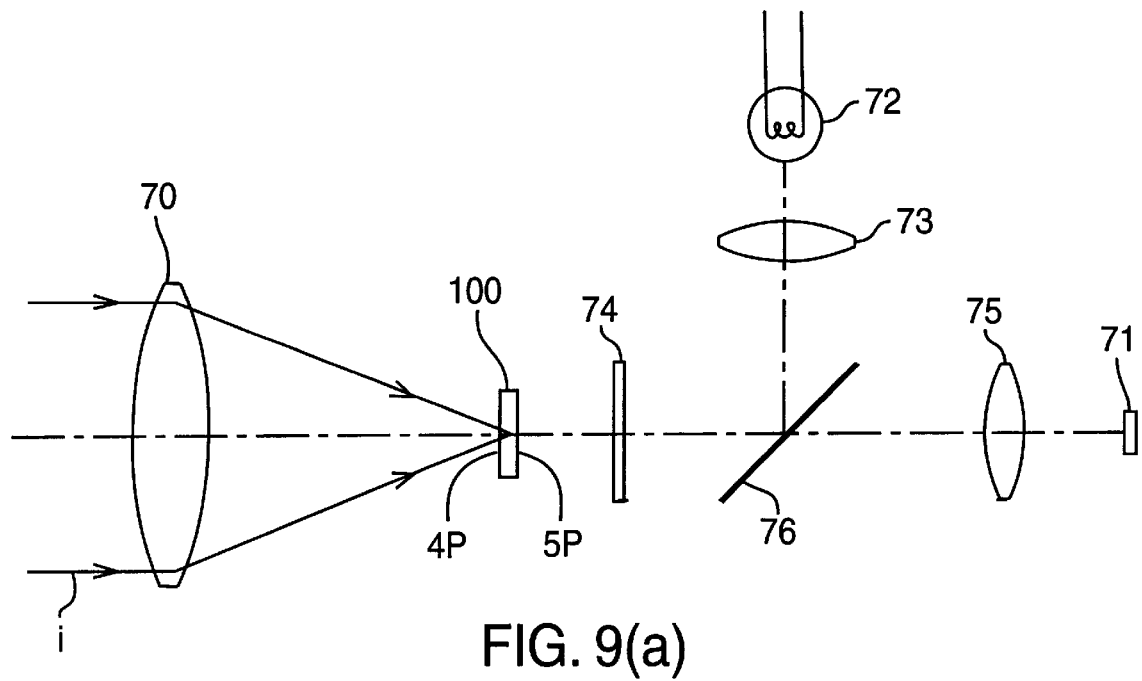
FIGS. 9(a)–9(b) are optical diagrams of an image-rendering apparatus according to Example Embodiment 6, wherein the apparatus is shown in FIG. 9(a) and certain operating principles of the apparatus are shown in FIG. 9(b).
Figure 9B:
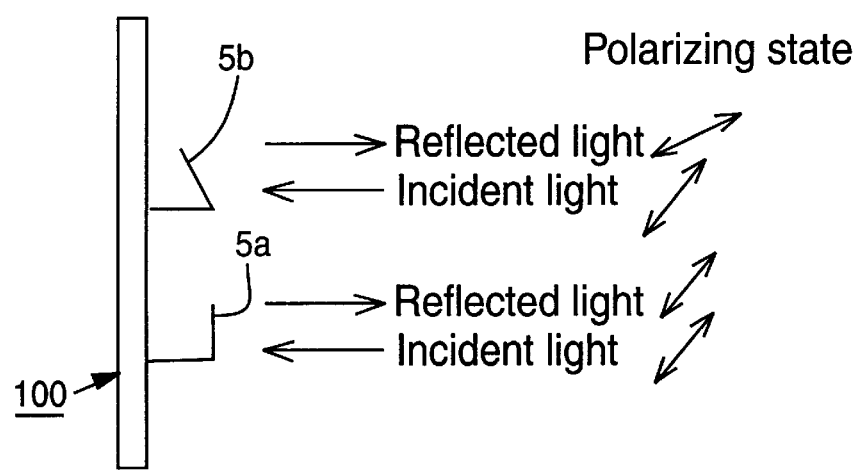

An image-rendering apparatus according to this example embodiment is shown in FIG. 9(*a*)–9(*b*), wherein FIG. 9(*a*) schematically shows the optical configuration of this embodiment, and FIG. 9(*b*) depicts certain operating principles of this example embodiment.

The image-rendering apparatus of this example embodiment comprises a conversion device as described above in Example Embodiment 1 and denoted in FIGS. 9(*a*)–9(*b*) by reference numeral 100. Also, in FIGS. 9(*a*)–9(*b*), right and left directions correspond to upward and downward directions, respectively, in FIG. 1(*a*). The FIG. 9(*a*) apparatus comprises an infrared-transmissive imaging lens 70 for converging the infrared rays i and forming an infrared image on a plane 4P collectively defined by the first films 4 (FIG. 1(*a*)) of the conversion device 100. The FIG. 9(*a*) apparatus also comprises a readout optical system for irradiating a polarized light flux, as the readout light flux, on the second films 5 of the conversion device 100. In FIG. 9(*b*), two individual second films 5*a*, 5*b* are shown each representing a separate pixel of the conversion device 100. As discussed above, the first films 4 absorb infrared radiation and the second films 5 (including the films 5*a*, 5*b* shown in FIG. 9(*b*)) reflect the readout light. The readout optical system also forms optical images from the readout light, reflected from the second films 5, on a two-dimensional CCD 71 that "picks up" the optical images.

The readout optical system of the image-rendering apparatus of FIG. 9(*a*) also comprises a light source 72 (which can be a white light source or a monochromatic light source), an illumination lens 73, a polarizing plate 74 serving both as a polarizer and as a light analyzer, a lens 75, and a beamsplitter 76. The second films collectively define a plane 5P. The lens 75 places the light-receiving surface of the CCD 71 at a conjugate relationship to the plane 5P.

Infrared light i is converged by the imaging lens 70 to form an infrared image on the plane 4P. The inclination of the first and second films 4, 5 of each pixel of the conversion device 10 is a function of the amount of infrared radiation absorbed by the first film 4 of each pixel, as described in Example Embodiment 1.

A readout light flux emitted by the light source 72 passes through the illumination lens 73 and is reflected by the beamsplitter 76. The readout light is changed into a linearly polarizes light flux by passage through the polarizing plate 74. The linearly polarized readout light flux is then incident on the second films 5 of the conversion device 100. Since the second films 5 and the light-receiving surface of the CCD 71 are in a conjugate relationship, the light reflected from the second films 5 of the conversion device 100 forms optical images of the second films 5 at corresponding locations on the light-receiving surface of the CCD 71, irrespective of the inclinations of the respective second films 5. Whenever a second film 5 has no inclination, the readout light flux reflected from that second film 5 has the same polarization state as the readout light flux incident on that second film 5. However, if a second film 5 is inclined, the polarization state of readout light reflected from that second film 5 is different from the polarization state of the incident readout light flux. The magnitude of the change in polarization of the readout light is a function of the inclination of the particular second film 5 (see FIG. 9(*b*)).

The readout light flux reflected from the second films 5 is analyzed by the polarizing plate 74. Whenever a particular second film 5 is not inclined, the amount of light from that second film 5 passing through the polarizing plate 74 is larger than when the particular second film 5 is inclined. Thus, the amount of readout light from a particular second film 5 passing through the polarizing plate 74 is reduced by an amount that is proportional to the inclination of the particular second film 5.

The images of each of the second films 5 are formed in a corresponding array on the CCD 71. The brightness of each second-film image varies in accordance with the inclination of the respective second film 5, i.e., in accordance with the amount of infrared radiation absorbed by the respective pixel of the conversion device 100. Thus, the incident infrared image is converted to a visible image that is picked up by the CCD 71.

As an alternative to picking up the visible images by the CCD 71 in this example embodiment, the visible image can be observed by the unaided human eye. In addition, the polarizing plate 74 can be omitted and a polarizer placed instead between the illumination lens 73 and the beamsplitter 76 and an analyzer placed between the beamsplitter 76 and the lens 75.

Example Embodiment 7

Figure 10:
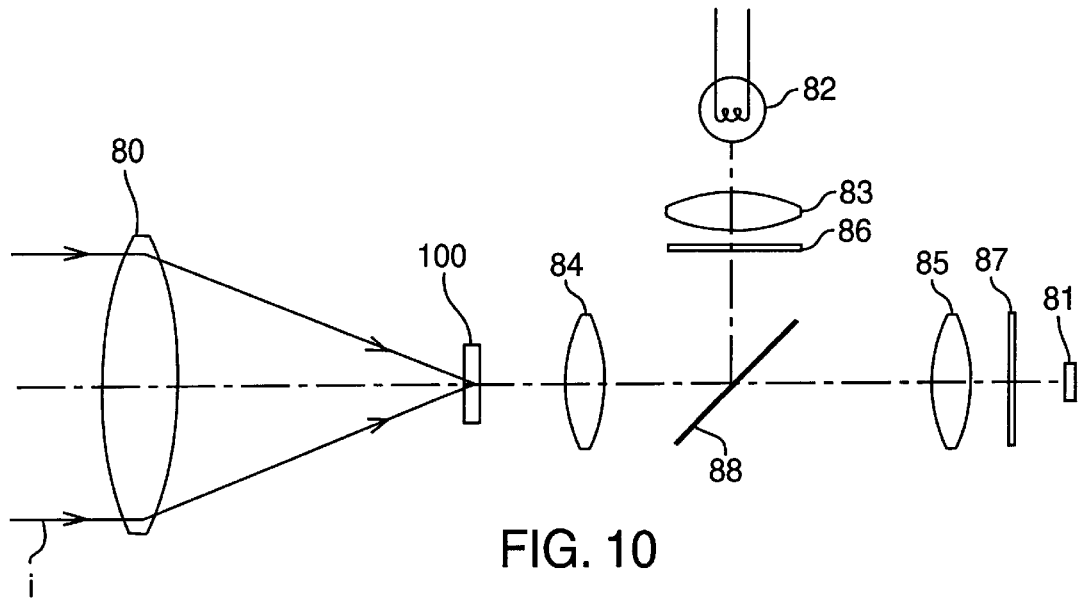
FIG. 10 is an optical diagram of an image-rendering apparatus according to Example Embodiment 7.

An image-rendering apparatus according to this example embodiment is shown schematically in FIG. 10. This example embodiment comprises the conversion device as described above in Example Embodiment 1 (denoted by reference numeral 100 in FIG. 10). Also, in FIG. 10, right and left directions correspond to upward and downward directions, respectively, in FIG. 1(a). The FIG. 10 apparatus also comprises an infrared-transmissive imaging lens 80 that converges infrared light i and forms an infrared image on a plane 4P defined by the first films 4 (serving as infrared absorbers) of the conversion device 100.

The FIG. 10 embodiment also comprises a readout optical system for irradiating a readout light beam on the second films 5 (serving as readout-light reflectors) of the pixels of the conversion device 100. The readout optical system forms optical images of the second films 5 from light reflected from the second films 5 according to a phase-difference method. A two-dimensional CCD 81 is used to "pick up" the optical images.

More specifically, the readout optical system of this example embodiment comprises; a light source 82 (which can be a white light source or a monochromatic light source), an illumination lens 83, lenses 84, 85, a ring diaphragm 86, a phase plate 87 corresponding to the ring diaphragm 86, and a beamsplitter 88.

The phase-difference method of light analysis is currently known. In any event, the optical images are formed on the CCD 81 in accordance with displacements of the second films 5 of the respective pixels of the conversion device 100. Thus, the infrared image formed on the conversion device 100 is converted to a corresponding visible image that is picked up by the CCD 81.

As an alternative to picking up the visible image using the CCD 81, the visible image can be observed by the unaided human eye.

Example Embodiment 8

Figure 11:
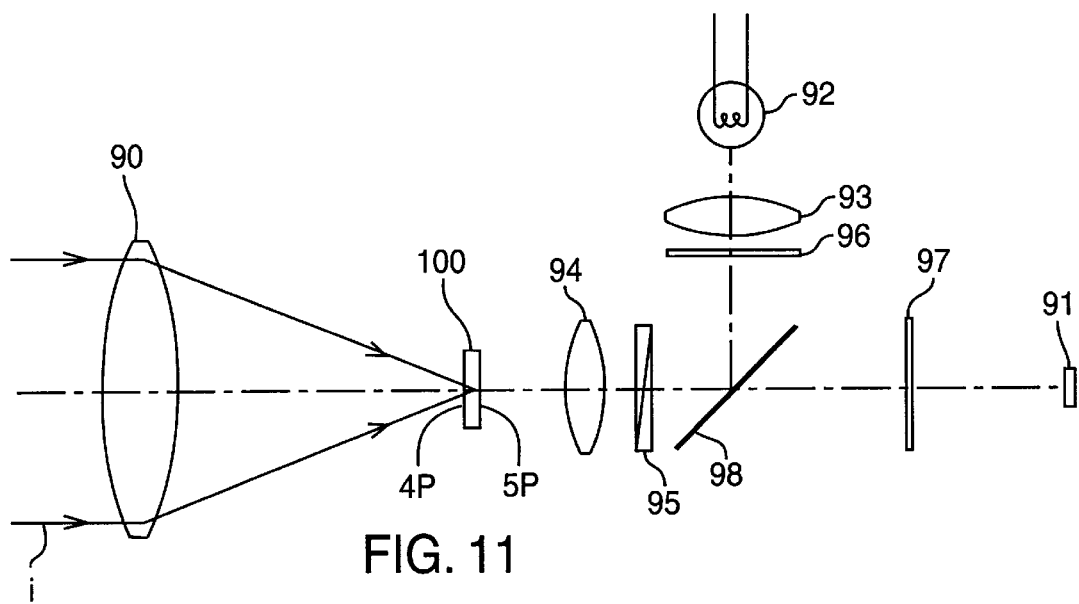
FIG. 11 is an optical diagram of an image-rendering apparatus according to Example Embodiment 8.

An image-rendering apparatus according to this example embodiment is shown schematically in FIG. 11. The FIG. 11 apparatus comprises a conversion device as described above in Example Embodiment 1 and denoted by reference numeral 100 in FIG. 11. Also with respect to FIG. 11, right and left directions correspond to up and down directions, respectively, in FIG. 1(a).

The FIG. 11 embodiment also comprises an infrared-transmissive imaging lens 90 for converging infrared light i and forming an infrared image on a plane 4P collectively defined by the films 4 (serving as infrared absorbers) of the pixels of the conversion device 100.

The FIG. 11 apparatus also comprises a readout optical system for illuminating the second films 5 with a readout light beam. The second films 5 collectively serve as readout-light reflectors. The readout optical system forms an optical image of each of the second films 5 according to a differential interference method. A two-dimensional CCD 91 serves to "pick up" the optical images which are formed in an array on the CCD 91.

More specifically, the readout optical system of this example embodiment comprises a light source 92 (which can be a white light source or a monochromatic light source), an illumination lens 93, a lens 94, a prism 95 (Wollaston or Nomarski type), a polarizer 96, an analyzer 97, and a beamsplitter 98. Each of the prism 95 and the polarizer 96 has a polarization direction of 45° with respect to the plane of the page of FIG. 11. Readout light that ha, passed through the polarizer 96 is linearly polarized with a polarization direction of 45° with respect to the plane of the page of FIG. 11.

The differential interference method is known and not described in detail here. In any event, optical images corresponding to the inclinations of the second films 5 of the pixels are formed on the CCD 91. Thus, the incident infrared image is converted to a visible image that is picked up by the CCD 91.

As an alternative to picking up the visible images by the CCD 91, the visible images can be observed by the unaided human eye.

Example Embodiment 9

Figure 12A:
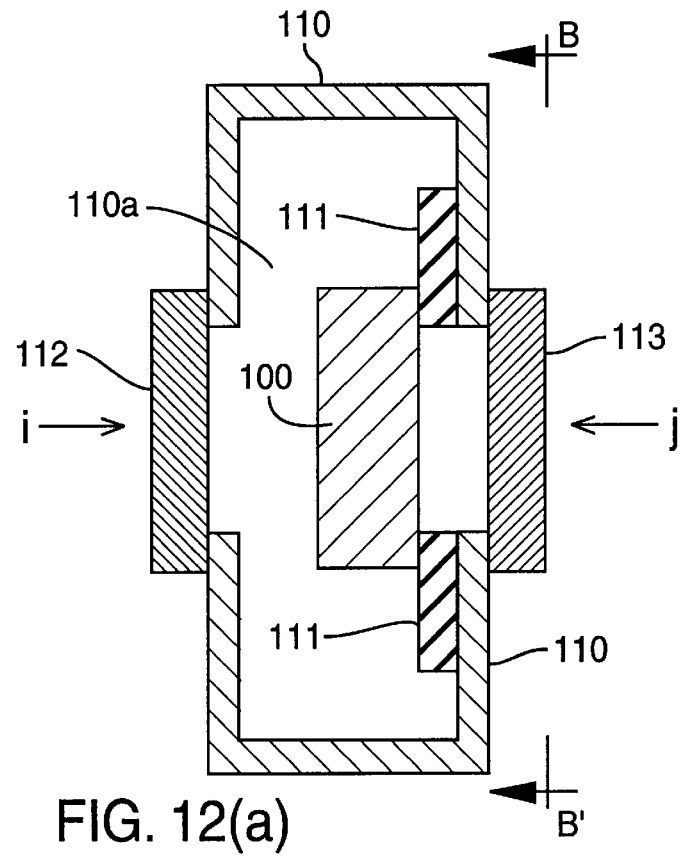
Figure 12B:
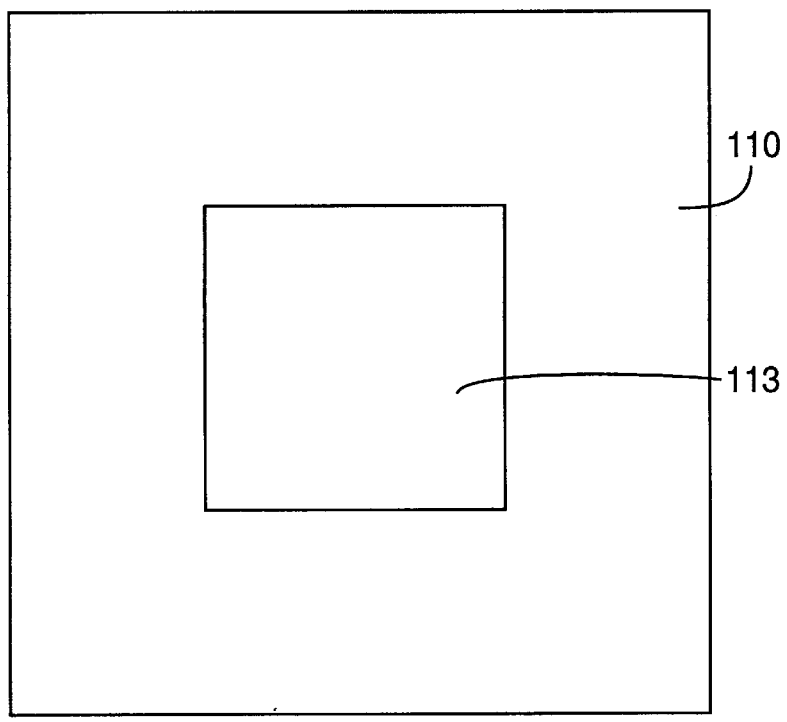

In this example embodiment, shown in FIGS. 12(a)–12(b), the conversion device according to the invention (e.g., the conversion device of FIGS. 1(a)–1(d)) is enclosed in a vessel or container 110 defining an interior space 110a in which the atmosphere is evacuated. Placing the conversion device 100 within the container 110 improves the thermal insulation of the conversion device. This allows a larger increase in temperature of the first and second films 4, 5 of any of the pixels caused by absorption of infrared rays by the first films 4, and less temperature change of the substrate 1 with a change in ambient temperature.

In order to further suppress any temperature change of the substrate 1 (FIG. 1(a)), the apparatus of this example embodiment preferably comprises a thermoelectric temperature stabilizer (TTS) 111, such as a Peltier element or the like, for generating or absorbing heat as required. The TTS is preferably in intimate thermal contact with the container 110 for effective temperature control.

FIG. 12(a) is a sectional view schematically showing the conversion device 100 situated within the container 110. Interposed between the conversion device 100 and a wall of the container 110 is the TTS 111. On the side of the container 110 toward the source of infrared light i is a window 112 transmissive to infrared light i and opaque to other light. The window 112 is also suitable for use on the wall of a vacuum vessel. On the opposite side of the container 110 (toward the source of the readout light beam j) is another window 113 that is transmissive to the readout light j and opaque to other light. The window 113 is also suitable for use on the wall of a vacuum vessel. The inside 110a of the container 113 is evacuated to a suitable subatmospheric pressure.

FIG. 12(b) is a view in the direction indicated by the arrows B–B' in FIG. 12(a). The TTS 111 is preferably situated so as not to prevent the readout light flux j from being incident on the container 110.

A temperature sensor (not shown) in contact with the conversion device 100 preferably is provided. For optimal contact, the temperature sensor can be situated within the substrate 1 (FIG. 1(*a*)) of the conversion device 100, for example. Temperature control of the TTS 111 is performed by utilizing a temperature-detection signal from the temperature sensor.

In addition, it is preferable that the image-rendering apparatus of each of, e.g., Example Embodiments 2–8 (FIGS. 5–11) (including the conversion device) be enclosed within a vibration-proof container that cannot vibrate at any mechanical resonance frequency of the suspended portion 3 during use of the apparatus.

Figure 13A:
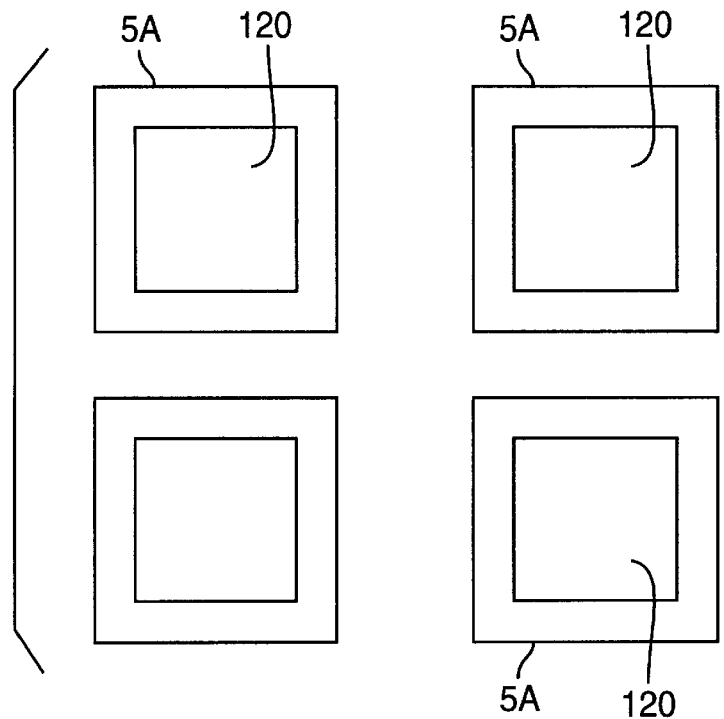
FIGS. 13(a)–13(b) are representative plan views of multiple pixels on the conversion device of Example Embodiment 9.
Figure 13B:
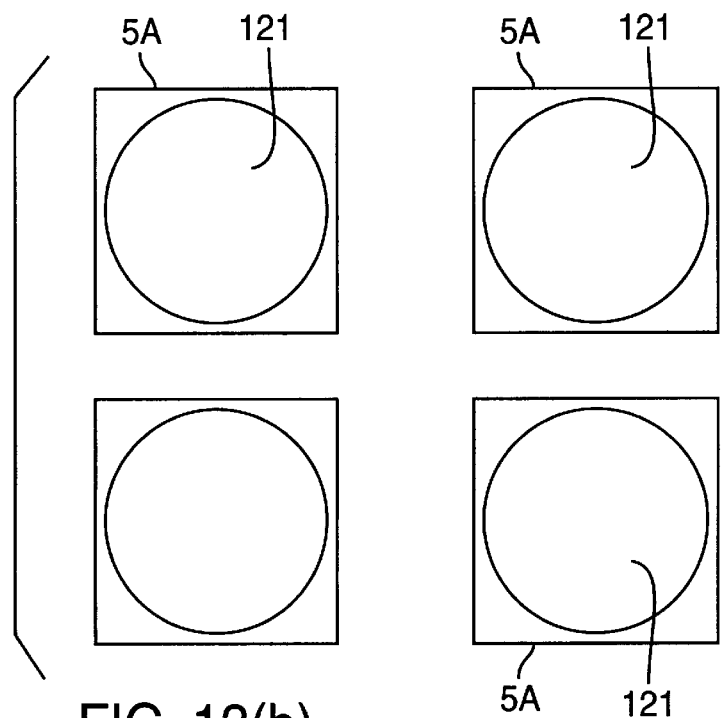

With respect to the image-rendering apparatus of FIG. 5 (Example Embodiment 2), it is preferable (although not necessary) that each of the CCDs 21–23 comprise a number of pixels equal to the number of pixels on the conversion device 100. Thus, each pixel on any of the CCDs corresponds to a unique second film 5. It is also preferable that the readout optical system form the optical images of the second films 5 in such a manner that each of the pixels of the CCDs 21–23 receives reflected readout light from only the corresponding film 5 of the respective pixel on the conversion device 100. More specifically, as shown in FIGS. 13(*a*) and 13(*b*), the magnification of the readout optical system (in particular, of the lenses 25–28) is preferably such that the image 5A of each separate second film 5 (i.e., the image formed by reflection of readout light from the respective second film 5) is formed on a light-receiving surface of any of the CCDs 21–23 at a size equal to or larger than the corresponding CCD pixel whenever the CCDs lack microlenses. (The corresponding pixels on any of the CCDs is denoted by the numeral 120 in FIGS. 13(*a*) and 13(*b*).) Alternatively, if the CCDs have microlenses, each second-film image is formed on the light-receiving surface of any of the CCDs at a size equal to or larger than the area of the microlens 121 on the corresponding pixel. Thus, each of the images 5A preferably overlaps the respective portion of the effective light-receiving area of the CCD.

FIG. 13(*a*) shows, in the case where the CCDs 21–23 lack microlenses, the relationship between the area 120 of the light-receiving portion of each of several pixels of the CCDs 21–23 and the area of the image 5A of each of the corresponding second films 5. FIG. 13(*b*) shows, for CCDs 21–23 having microlenses, the relationship between the area 121 of the microlens on each of several pixels of the CCDs 21–23 and the image 5A of each the corresponding second films 5. In configurations such as shown in FIGS. 13(*a*)–13(*b*), each of the pixels of the CCDs 21–23 effectively receives only the readout light (i.e., "signal light") reflected from a single corresponding second film 5 and not from any other source. This effectively reduces reception of "noise light" by each pixel of the CCDs without having to employ a mask or antireflection film, and provides an improved signal-to-noise ratio.

Whereas the foregoing discussion was directed to the FIG. 5 embodiment, it is equally applicable to any of the other embodiments disclosed herein.

Example Embodiment 10

This example embodiment, shown in FIGS. 14(*a*)–14(*b*), is a modification of Example Embodiment 1, and is directed specifically to a modification of the conversion device shown in FIGS. 1(*a*)–1(*d*). Each of FIGS. 14(*a*)–14(*d*) corresponds to FIG. 1(*a*), and components in FIGS. 14(*a*)–14(*d*) that are the same as or similar to those in FIGS. 1(*a*)–1(*d*) have the same reference numerals. Further description of such components is not provided here.

The FIG. 14(*a*) embodiment (showing one pixel of the conversion device 100) comprises a mask 130 for blocking readout light flux that would otherwise not be incident on the second films 5. For each pixel of the conversion device, the mask 130 defines an aperture 130*a* having a size corresponding to the size of the second film 5. The mask 130 may be formed by, for example, coating the window 113 (FIG. 12(*a*)) with black paint (except for locations of the apertures 130*a*). The readout light reflected from the second films 5 is the "signal light" from the conversion device 100. Mixing the signal light with other readout light reflected from portions of the conversion device 100 other than the second films 5 causes a reduction in the signal-to-noise (S/N) ratio. Utilizing a mask 130 as described above, however, improves the S/N ratio.

Referring now to FIG. 14(*b*), an antireflection film 131 is provided to prevent reflection of readout light from locations other than the second films 5. To such end, the antireflection film 131 is formed on the substrate 1 in the regions lying between the various pixels. The antireflection film 131 can be made from, for example, an insulating film such as $SiO_2$, SiN, or the like; a thin ceramic film such as $Al_2O_3$; a thin carbon-based film such as SiC, or a suitable black paint. In any event, the antireflection film 131 yields an improved S/N ratio.

Turning now to FIG. 14(*c*), a reflective film 132 is provided for reflecting readout light. The reflective film 132 is formed on the substrate 1 in regions lying between the various pixels. The reflecting film 132 can be made of, for example, Al, Ag, MgO, or the like. With the FIG. 14(*c*) embodiment, all the readout light is reflected from the second films 5 and from the reflective film 132, leaving none for absorption by the substrate 1. Such a configuration is especially useful in preventing absorption of readout-light energy by the substrate 1 and preventing conduction of heat generated from such absorption to the suspended portion 3. This allows the first and second films 4, 5 of each pixel to be displaced only in response to heat generated by absorption of infrared radiation by the first film 4. Thus, the S/N ratio is improved. However, because readout light reflected from the reflective film 132 may contribute in other ways to noise, it is preferable to combine the FIG. 14(*c*) configuration with the configurations of FIGS. 13(*a*)–13(*b*) which remove such noise.

Turning now to the embodiment shown in FIG. 14(*d*), infrared antireflection films 133, 134 are provided. The antireflection film 133 prevents reflection of infrared light from the upper surface of the substrate 1, and the antireflection film 134 prevents reflection of infrared light from the lower surface of the substrate 1. The antireflection films 133, 134 are situated in regions covered by the trajectories of infrared rays incident on the first film 4. If the substrate 1 is made of silicon, then the antireflection films 133, 134 can be made of SiO or the like. The infrared antireflection films 133, 134 allow the infrared rays to be efficiently transmitted by the substrate 1 so as to reach the first film 4, thereby improving sensitivity.

The antireflection film 133 can be omitted, wherein only the antireflection film 134 is used, and still provide substantially improved sensitivity.

Of course, any of the configurations shown in FIGS. 14(*a*)–14(*d*) can be combined.

Moreover, each of the configurations of FIGS. 14(a)–14(d) can be fabricated by a method similar to the fabrication method shown in, e.g., FIGS. 2(a)–2(c). For example, when fabricating the conversion device shown in FIG. 14(b), the antireflection film 131 preferably is formed prior to the formation of the sacrificial layer. When fabricating the conversion device shown in FIG. 14(c), the reflective film 132 preferably is formed before forming the sacrificial layer. When fabricating the conversion device of FIG. 14(d), the infrared antireflection film 133 preferably is formed before forming the sacrificial layer; the infrared antireflection film 134 can be formed at any appropriate time before forming the sacrificial layer.

Example Embodiment 11

Figure 15A:
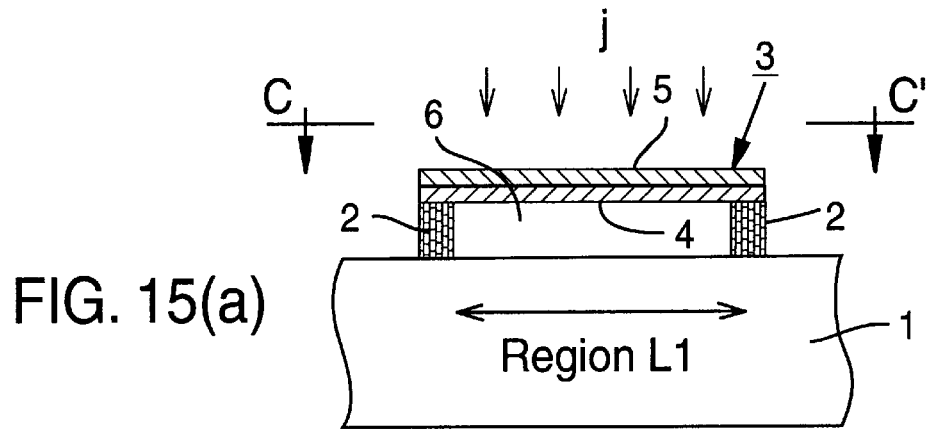
Figure 15B:
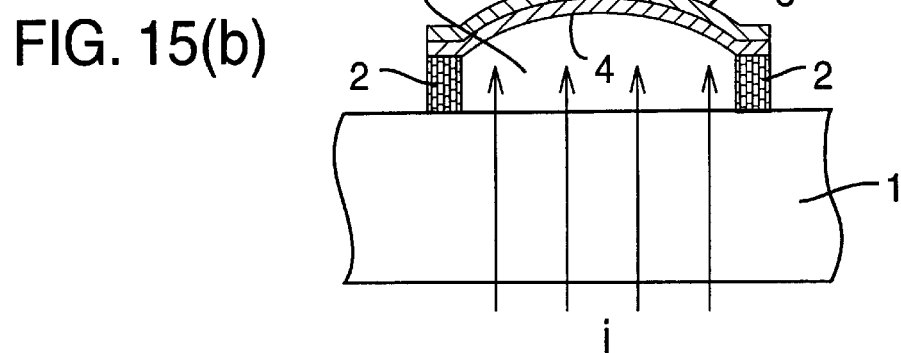
Figure 15C:
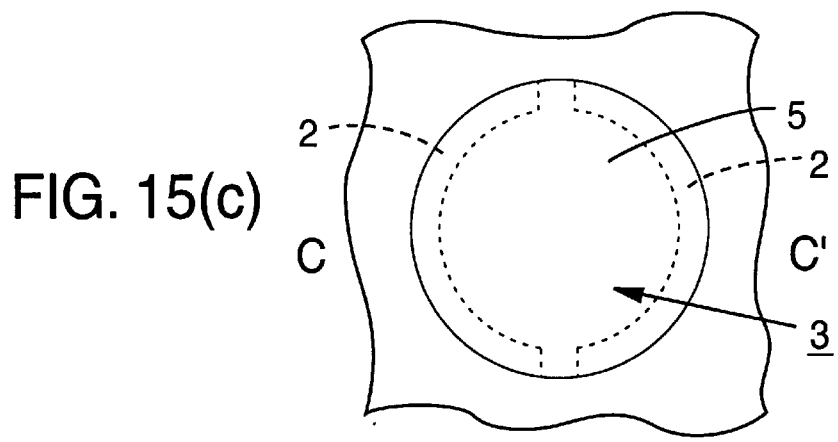

A conversion device according to this example embodiment is shown in FIGS. 15(a)–15(c). FIG. 15(a) is a sectional view schematically showing a pixel (unit element) in a state in which infrared light i is not incident. FIG. 15(b) is a sectional view schematically showing a pixel in a state in which infrared light i is incident on the pixel. FIG. 15(c) is a view in the direction indicated by the arrows C–C' in FIG. 15(a). In FIGS. 15(a)–15(c), components that are similar to those in FIGS. 1(a)–1(d) have the same reference numerals and further description of such components is not provided here.

The conversion device shown in FIGS. 15(a)–15(c) differs from the device of FIGS. 1(a)–1(d) in one aspect. Namely, in FIGS. 1(a)–1(d), the displaceable member formed by the first and second films 4, 5 is configured as a cantilever. In FIGS. 15(a)–15(c), the displaceable member formed by the first and second films 4, 5 is configured as a diaphragm.

The conversion device of FIGS. 15(a)–15(c) can be used in a manner similar to that shown in FIGS. 1(a)–1(d), e.g., in any of the image-rendering apparatus of Example Embodiments 2–8. In addition, the modifications shown in FIGS. 14(a)–14(d) can be applied to the conversion device of this example embodiment.

The films 4, 5 of a pixel of the embodiment of FIGS. 15(a)–15(c) become domed upward when they absorb heat. Each domed films thus defines a curvature having a radius that is inversely proportional to the amount of heat absorbed by the first film 4 (FIG. 15(b)). With a conversion device as shown in FIGS. 1(a)–1(d), in contrast, the films 4, 5 are bent by an angle (relative to the horizontal in the figure) that is proportional to the amount of heat absorbed by the first film 4.

Whenever the reflector serving as the optically effecting portion is limited to a portion of the displaceable member rather than extending over the entire displaceable member, the portion including the reflector is bent so as to be inclined. Therefore, a conversion device as used in the image-rendering apparatus of, for example, FIGS. 8(a)–8(c), can have a diaphragm structure as described above.

The conversion device shown in FIGS. 15(a)–15(c) also can be fabricated by a method similar to, e.g., that shown in FIGS. 2(a)–2(c).

Example Embodiment 12

Figure 16A:
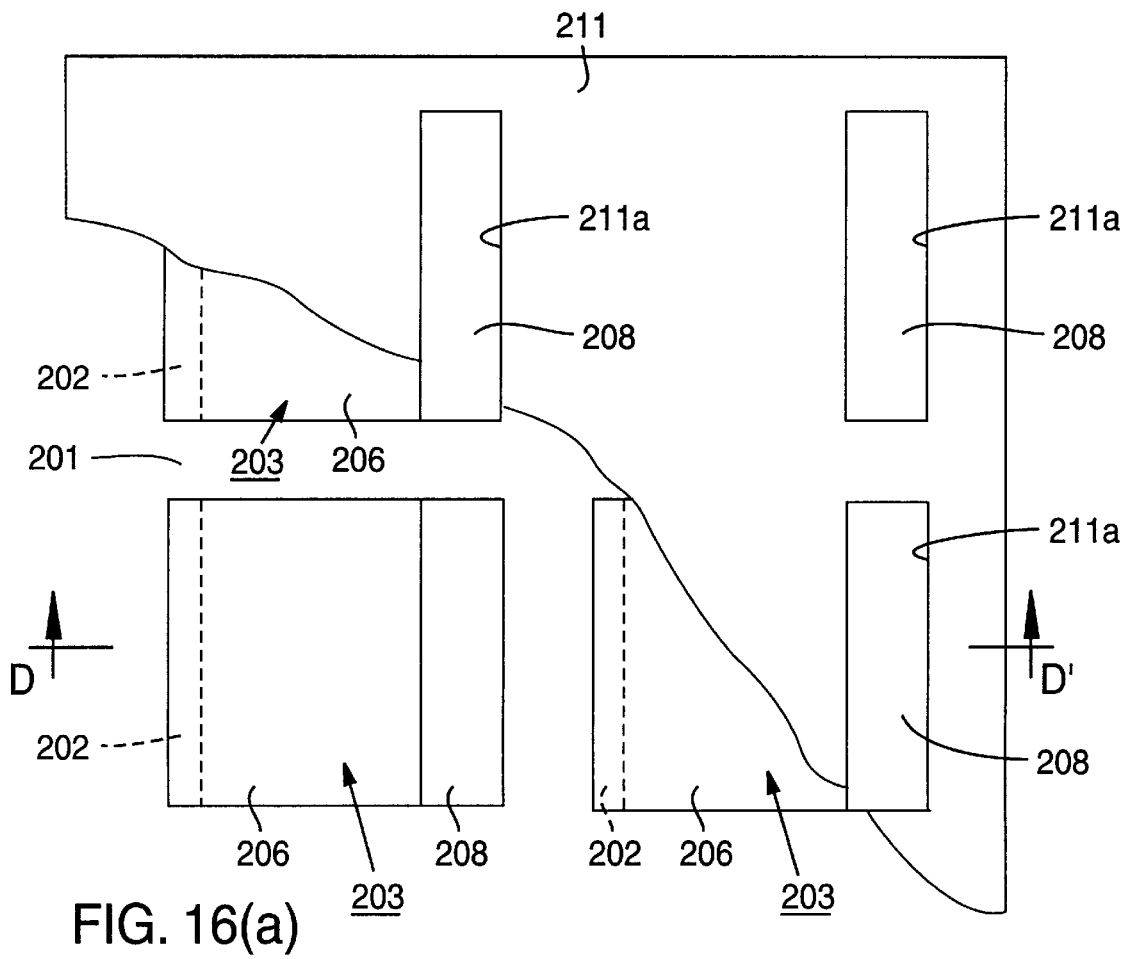
Figure 16B:
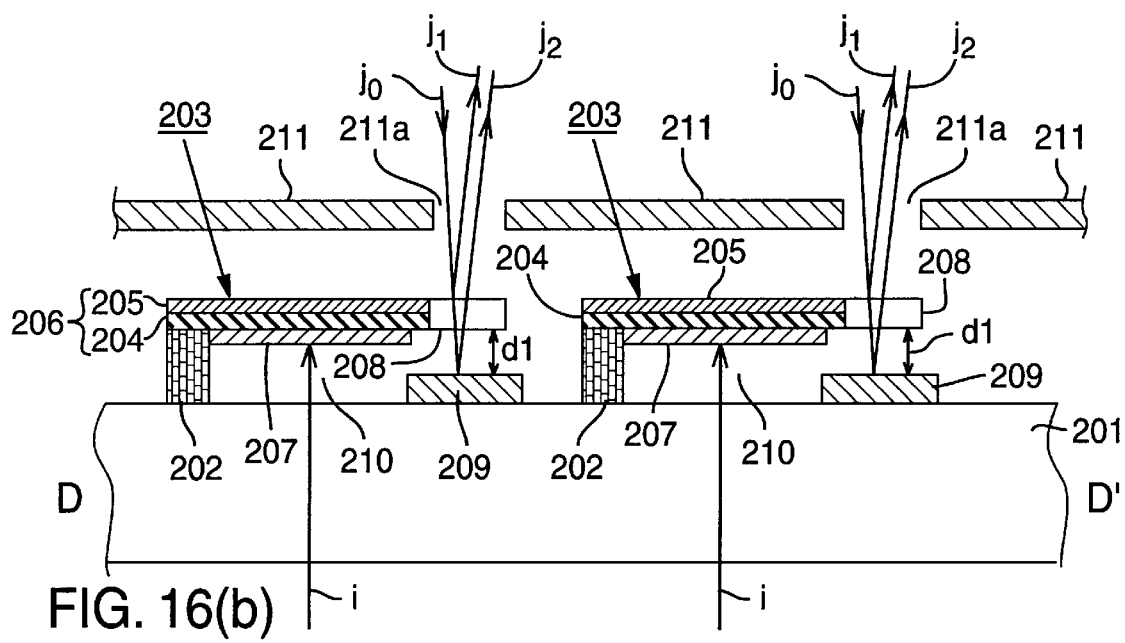

A conversion device according to this example embodiment is shown in FIGS. 16(a) and 16(b). FIG. 16(a) is a partially cutaway schematic plan view of the conversion device showing four pixels, and FIG. 16(b) is a sectional schematic view along the line D–D' in FIG. 16(a), showing two pixels of the conversion device.

The conversion device of FIG. 16(a) comprises a substrate 201 and a suspended portion 203 extending over the substrate and supported by a leg portion 202. Infrared light i enters the conversion device from below the substrate 201 and readout light $j_o$ enters from above the substrate 201. Thus, in such a configuration, the substrate 201 is formed of a material that is transmissive to the infrared light i, e.g., silicon or germanium. The material used to fabricate the substrate 201 need not be so limited if an aperture is provided below each pixel for passage of light therethrough.

The suspended portion 203 comprises a first film 204 and a second 205 laminated together. The first and second films are made of different materials having different coefficients of thermal expansion, and thus form a so-called "thermal bimorph" structure. By way of example and not intending to be limiting, representative materials for making the films 204, 205 are listed in Table 1. On the lower surface of the first film 204 is an IR-absorbing film 207, formed of the same material as the first film 4 in FIGS. 1(a)–1(c), e.g., gold oxide. The films 204 and 205 form a displaceable member 206 that deflects relative to the substrate 201 by an amount proportional to the amount of heat absorbed by the IR-absorbing film 207. The displaceable member 206 is configured as a cantilever. If the first film 204 has a greater coefficient of thermal expansion than the upper film 205, then the displaceable member 206 deflects (bends) upward upon absorption of heat. If the first film 204 has a lower coefficient of thermal expansion than the upper film 205, then the displaceable member 206 deflects (bends) downward upon absorption of heat.

The first film 204 and the IR-absorbing film 207 may be formed as a single film, as in the conversion device described in Example Embodiment 1.

The suspended portion 203 comprises a half-mirror portion 208 for reflecting some of the readout light $j_o$. The half-mirror portion 208 is attached to the distal end of the displaceable member 206 and is thus displaced along with any deflection of the displaceable member 206. A total-reflection mirror 209 is formed on the substrate 201 opposite the half-mirror portion 208. The total-reflection mirror 209 reflects readout light transmitted by the half-mirror portion 208.

As shown in FIG. 16(b), whenever the readout light $j_o$ is incident on the half-mirror portion 208, some of the readout light $j_o$ is reflected by the half-mirror portion 208 to form a reflected light flux $j_1$. Readout light $j_o$ passing through the half-mirror portion 208 is reflected by the total-reflection mirror 209 toward the half-mirror portion 208. Some of the readout light reflected from the total-reflection mirror 209 is transmitted through the half-mirror portion 208 to become a transmitted light flux $j_2$. The transmitted light flux $j_2$ and the reflected light flux $j_1$ have an optical path-length difference that is twice the distance d1 between the half-mirror portion 208 and the total-reflection mirror 209. Consequently, an interference arises between the transmitted light flux $j_2$ and the reflected light flux $j_1$. A characteristic of the interference varies depending upon the optical path-length difference and thus upon the amount of deflection of the displaceable member 206. The interference intensity is at a maximum when the reflected light flux $j_1$ and the transmitted light flux $j_2$ are equal to each other in intensity. To such end, it is preferable that the half-mirror portion 208 have a reflectivity of about 38%.

The half-mirror portion 208 and the total-reflection mirror 209 thus comprise an interference means for receiving the readout light flux $j_o$, for changing the received readout light $j_o$ to an interference light flux exhibiting an interference characteristic that varies with displacement (deflection) of the displaceable portion 206, and for causing the interference light flux to propagate away from the displaceable member 206 for measurement of the interference characteristic. Thus, the half-mirror portion 208 and the total-reflection mirror 209 comprise an "optically effecting portion."

The suspended portion 203 is suspended above the substrate 201 with a gap 210 situated therebetween. To such end, the suspended portion 203 is supported at one end by the leg portion 202. The displaceable member 206 thus is cantilevered over the gap 210. Such a configuration provides a high thermal resistance between the suspended portion 203 and the substrate 201. Thermal resistance is augmented further by making the leg portion 202 of a thermally and electrically insulative material such as $SiO_2$ or the like. Consequently, very little heat energy escapes from the suspended portion 203, and absorption of even small amounts of infrared radiation causes an effective increase in the temperature of the IR-absorbing film 207. These characteristics allow this example embodiment to exhibit infrared detection at high sensitivity.

The displaceable member 206, the IR-absorbing film 207, the half-mirror portion 208, the total-reflection mirror 209, and the leg portion 202 together constitute a "pixel" (unit element) of the conversion device of this example embodiment. Typically, the conversion device comprises multiple such pixels arranged in a two-dimensional array on the substrate 201. Alternatively, multiple pixels can be arranged one-dimensionally on the substrate 201 if desired, or the conversion device can comprises only a single pixel for use in merely detecting the intensity of infrared radiation.

In an alternative configuration, the readout light $j_o$ can enter a pixel from below the substrate 201 while the infrared light i enters from above the substrate 201. In such an alternative configuration, the substrate 201 is formed of a material that is transmissive to the readout light. For example, the IR-absorbing film 207 can be formed on the upper surface of the second film 205, the half-mirror portion 208 can be substituted with a total-reflection mirror, and the total-reflection mirror 209 can be substituted with a half mirror.

The embodiment of FIG. 6(b) includes a mask 211 for blocking readout light $j_o$ other than the interference light flux exiting the half-mirror portion 208, similar to the FIG. 14(a) embodiment. For each pixel, the mask 211 defines an aperture 211a above the half-mirror portion 208. The mask 211 may comprise a coating of black paint applied to the window 113 (FIG. 12(a)) on the container 110 (which container can be used to enclose the conversion device of Example Embodiment 12).

The interference light flux exiting the half-mirror portion 208 constitutes the "signal" light flux from the conversion device. Mixing of the signal light with other readout light ("noise" light) can cause a reduction in the S/N ratio exhibited by the conversion device. Although the mask 211 is rot necessary, it effectively can prevent mixing of the noise light with the signal light, thus improving the S/N ratio.

An infrared antireflection film (not shown) can be applied to the upper and lower surfaces of the substrate 201 in regions where infrared rays are incident on the IR-absorbing film 207, similar to the configuration shown in FIG. 14(d).

Figure 17A:
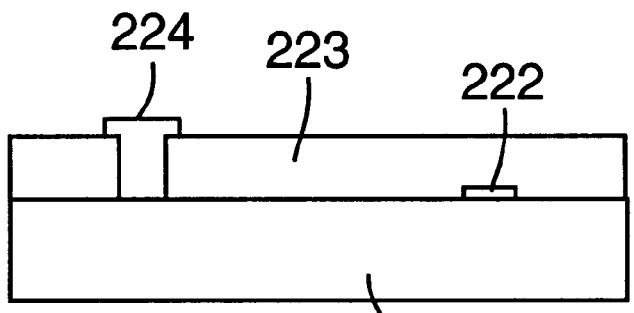
FIGS. 17(a)–17(c) schematically depict, in elevational sectional views of a single pixel, the results of certain steps in a first method for fabricating the conversion device of Example Embodiment 12.
Figure 17B:
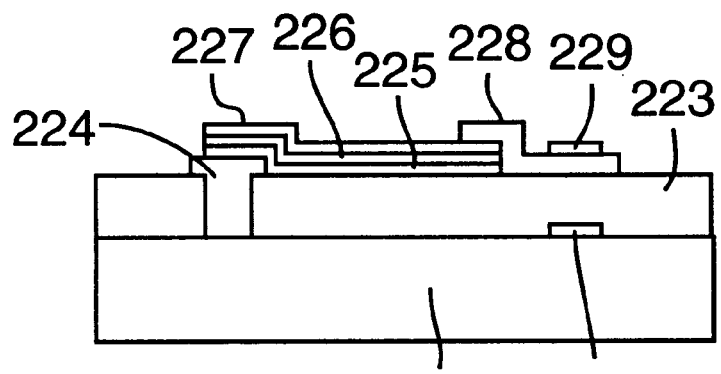
Figure 17C:
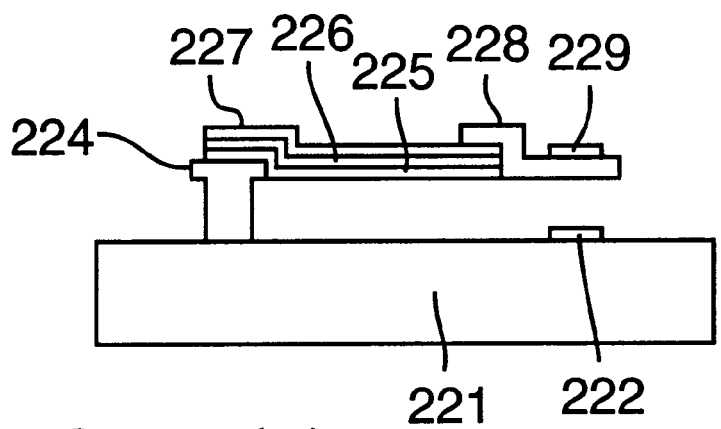

A conversion device according to this example embodiment preferably is manufactured using a method as shown in FIGS. 17(a)–17(c). FIGS. 17(a)–17(c) are sectional elevational views (from the same perspective as used in FIG. 16(b)) of certain steps in the method.

In a first step, a high-melting metal film 222 (having a thickness of, e.g., 1000 Å) such as titanium or the like is applied to a silicon substrate 221 (destined to be the substrate 201). The metal film 222 is destined to become the total-reflection mirror 209 in each pixel, and preferably is formed by sputtering or the like. The metal film 222 is patterned in accordance with the desired profiles and locations of the total-reflection mirrors 209. Next, a polyimide film 223 (having a thickness of, e.g., 2.5 μm, and destined to be a sacrificial layer) is formed on the entire surface of the substrate 221 by spin-coating c)r the like. Openings are formed in the polyimide film 223, corresponding to desired locations of the leg portions 202, by photolithography and etching. A silicon oxide film 224 (having a thickness of, e.g., 1 μm and destined to form the leg portions 202) is deposited on the entire surface of the polyimide film 223 so as to fill in the openings in the polyimide film 223. The silicon oxide film 224 is applied preferably by a low-temperature process such as plasma CVD or the like. The silicon oxide film 224 is patterned in accordance with the intended shape of the leg portions 202 by photolithography and etching (FIG. 17(a)). Portions of the silicon oxide film 224 remaining after patterning are exposed.

In the next step, the following films are successively applied to the polyimide layer. 223: a gold oxide film 225 (having a thickness of, e.g., 1000 Å and destined to become the IR-absorbing film 207); a metal film 226 (having a thickness of, e.g., 1000 Å and destined to become the first film 204; and a metal film 227 (having a thickness of, e.g., 1000 Å and destined to become the second film 205). These three films 225, 226, 227 are formed preferably by sputtering. The films 225, 226, 227 then are patterned in accordance with the intended shapes and locations of the films 207, 204, 205, respectively, by photolithography and etching. Next, a silicon oxide film 228 (having a thickness of, e.g., 2000 Å and destined to be a support for the half-mirror portion 208) is deposited on the entire surface of the substrate 221 by plasma CVD or the like. The silicon oxide film 228 is patterned in accordance with the intended shape and locations of the half-mirror portion 208 by photolithography and etching. The supporting portion (not shown in FIGS. 16(a) and 16(b)) is preferably transparent to visible light. Then, a metal film 229 (e.g., titanium and having a thickness of, e.g., 100 Å and destined to be the half-mirror portions 229) is applied to the silicon oxide film 228 and elsewhere by, e.g., sputtering so as to obtain a desired reflectivity. The metal film 229 is patterned in accordance with the intended shape and locations of the half-mirror portion 208 by photolithography and etching (FIG. 17(b)).

Finally, the polyimide film 223 is removed by elution using an organic solvent, plasma etching, or the like (FIG. 17(c)), thus completing fabrication of the conversion device of FIGS. 16(a)–36(b).

Certain steps of the fabrication method described above employ individual known techniques as used in semiconductor fabrication. Thus, the method is performed easily. Moreover, during fabrication, the films 225, 226, 227 are supported collectively by and fixed to the sacrificial layer (i.e., the polyimide film 223) until the end of the fabrication process at which time the sacrifice layer is removed. As a result, defects such as deformation or breakage of the displaceable members that would otherwise occur during fabrication do not occur.

Normally, with the foregoing method, multiple conversion devices are fabricated at the same time on a single substrate 221. In such an instance, the substrate 221 is cut into individual chips preferably before removing the polyimide film 223, i.e., after the step shown in FIG. 17(b). This minimizes deformation or breakage of the displaceable members during the fabrication process since the films 225, 226, 227 are supported by and fixed to the sacrificial layer during the cutting step. This greatly increases the yield of the process.

An alternative method for fabricating the conversion device of FIGS. 16(a)–16(b) is shown in FIGS. 18(a)–18(d). FIGS. 18(a)–18(d) are schematic sectional views, similar to the perspective of FIG. 16(b), of certain steps in the process In a first step, an aluminum film 522 (having a thickness of, e.g., 1000 Å and destined to become the total-reflection mirror 209) is formed on a silicon substrate 521 (destined to be the substrate 201) by sputtering or the like. The aluminum film 522 is patterned in accordance with the intended shape and locations of the total-reflection mirrors 209. Next, a resist film 523 (e.g., polyimide, having a thickness of, e.g., 1.2 μm, and destined to be a sacrificial layer) is formed on the entire surface of the substrate 521 by spin-coating or the like. Openings 523a are formed at locations on the resist 523, corresponding to intended locations of the leg portions 202, by photolithography. To fill in the openings 523a, a silicon oxide film 524 (having a thickness of, e.g., 1 μm and destined to become the leg portions 202) is deposited on the entire surface of the resist film 523 by a low-temperature process such as plasma CVD. Next, by CMP, entire etchback, or other suitable technique, selected portions of the silicon oxide film 524 and of the resist film 523 are removed so that the upper surface of the resist film 523 is exposed in regions other than locations of the leg portions 202, and to planarize the exposed surfaces of the silicon oxide film 524 and the resist film 523 (FIG. 18(a)).

In a next step, a silicon nitride film 525 (having a thickness of, e.g., 3000 Å and destined to become the IR-absorbing film 207) is formed on the resist film 523. The silicon nitride film 525 is patterned in accordance with the intended shape and locations of the IR-absorbing films 207. Next, a silicon oxide film 526 (having a thickness of, e.g., 2000 Å) is formed on exposed regions of the silicon oxide film 524, the silicon nitride film 525, and the resist film 523. The silicon oxide film 526 is patterned by photolithography and etching in accordance with the intended shape and locations of a support portion for the half-mirror portion 208 and the first film 204. That is, in this method, the silicon oxide film 526 serves as both a support for the half-mirror portion 208 and as the first film 204 constituting part of the displaceable member. Next, a relatively thick aluminum film 527 (having a thickness of, e.g., 2000 Å and destined to become the second film 205) is formed on the silicon oxide film 526. The aluminum film 527 is patterned in accordance with the intended shape and locations of the second film 205 by photolithography and etching (FIG. 18(b)).

In the next step of the method, an aluminum film 529 (having a thickness of, e.g., 50 Å and destined to become part of the half-mirror portion 208) is formed by sputtering or the like. The aluminum layer is relatively thin so as to obtain a desired reflectivity, and is patterned in accordance with the intended shape and locations of the half-mirror portions 208 by photolithography and etching (FIG. 18(c)).

Figure 18A:
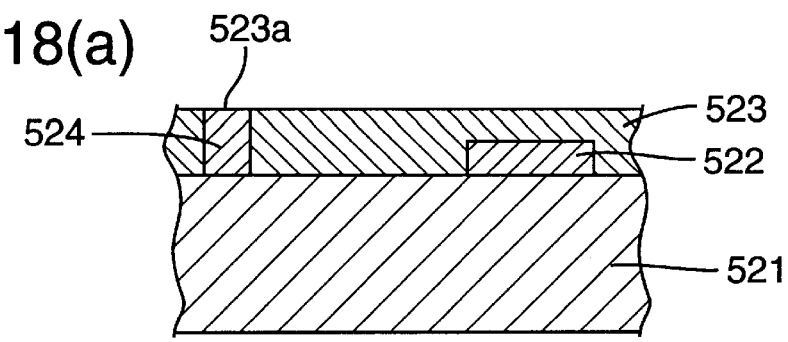
FIGS. 18(a)–18(d) schematically depict, in elevational sectional views of a single pixel, the results of certain steps in a second method for fabricating the conversion device of Example Embodiment 12.
Figure 18B:
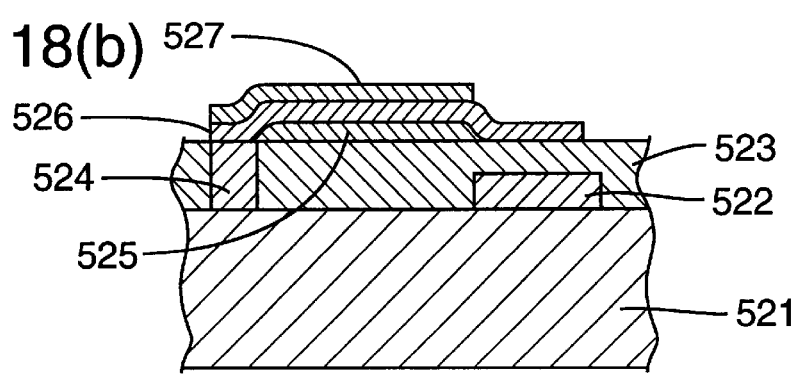
Figure 18C:
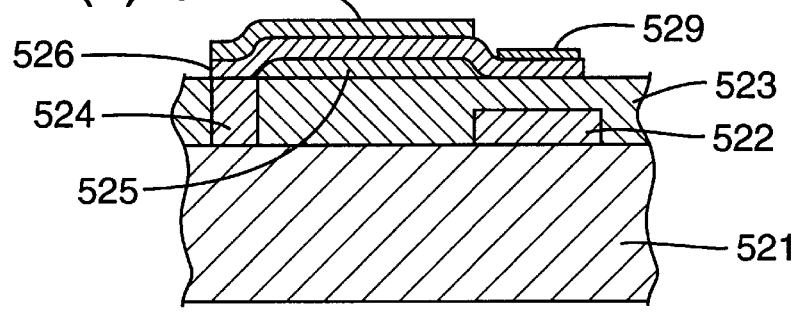

Although not shown in the drawings, the structure shown in FIG. 18(c) is cut preferably into individual chips before proceeding to the next step in the process. During the cutting, the structure can be subjected to forces from, for example, sprayed water. However, the films 525, 526, 527 are supported during cutting by the silicon oxide film 524 and by the resist film 523. Thus, any possible deformation or breakage of the films 525, 526, 527 during cutting is minimized.

Figure 18D:
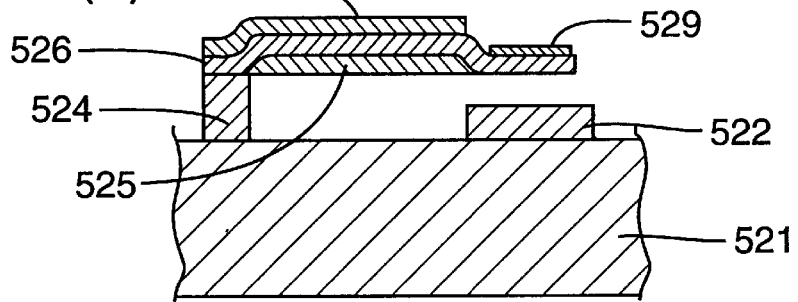

Finally, the resist film 523 is removed by, e.g., plasma etching (FIG. 18(d)), thereby completing formation of the conversion device of FIGS. 16(a)–16(b). Removal of the resist film 523 may be performed by wet-etching, dry-etching, or the like. If wet-etching is employed, subsequent drying after rinsing away the etchant is performed preferably by freeze-drying, solidification-sublimation, or analogous technique.

Because certain steps of the foregoing method utilize known techniques as used in semiconductor processes, the method can be performed easily. During fabrication, the displaceable member comprising the silicon nitride film 525, the silicon oxide film 526, and the aluminum film 527 is supported by and affixed to the sacrificial layer (the resist film 523) until the sacrificial layer is removed. Such a protocol minimizes defects such as deformation or breakage of the displaceable member during fabrication.

With the conversion device of FIGS. 16(a)–16(b), infrared light i strikes from below. The infrared light i is transmitted through the substrate 201 and absorbed by the IR-absorbing film 207 to be converted into heat. The displaceable member 206 is bent upward or downward, and thus assumes an "inclined" posture, in proportion to the amount of heat generated in the IR-absorbing film 207. That is, a given amount of incident infrared radiation i is converted to a corresponding displacement of the displaceable member 206.

A readout optical system, described below, causes a readout light flux $j_0$ to strike the half-mirror portion 208 from above via the aperture 211a of the mask 211 (FIG. 16(b)) to irradiate the half-mirror portion 208. The readout light flux $j_0$ incident on the half-mirror portion 208 is changed to an interference light flux. The interference intensity is a function of the amount of displacement of the displaceable member 206. The interference light flux exits upward from the half-mirror portion 208 (FIG. 16(b)). Measurement of a characteristic of the interference light flux provides a measurement of the incident infrared irradiation.

Whenever materials such as listed in Table 1 are used to form the films 204, 205, for example, the displacement D of the distal end of the displaceable portion 206 per 1° C. temperature change of the displaceable portion 206 (with the proximal end of the displaceable portion 206 affixed to the leg portion 202) can be calculated from the specific curvature (K) value given in Table 1, the thickness d of the displaceable member, and the length L of the displaceable portion 206 by the following Equation (1):

$$D = L^2 \cdot K / 2d \tag{1}$$

For example, assuming the length L, the distance d, and the specific curvature K to be 20 μm, 0.1 μm, and 3×10$^{-4}$, respectively, the maximal displacement D is 0.6 μm. But, if the efficiency of conversion of incident infrared radiation to a measurable temperature change is 1 percent as described above, then the displacement of the displaceable member is 6 nm.

As described above, the transmitted readout light flux $j_2$ and the reflected readout light flux $j_1$ have an optical-path difference equal to twice the distance d1 between the half-mirror portion 208 and the total-reflection mirror 209. This optical path difference causes the interference. If the readout light flux $j_0$ has a wavelength of 500 nm, for example, then the interference becomes alternately strong or weak every time the distance d1 changes by 125 nm since the interference becomes alternately strong or weak every half wavelength.

Thus, for example, a 6-nm displacement of the displaceable member 206 corresponds to 4.8 percent of the interference period of 125 nm. This is far larger than the change in resistance of 0.02 percent obtained using a prior-art infrared sensor employing bolometers.

Because this example embodiment exploits interference for detection of infrared radiation, minute displacements of the displaceable member 206 can be detected with a sensitivity that is much higher than realized with conventional infrared sensors.

Furthermore, since the infrared radiation is converted to a measurable change in a readout light flux rather than a change in electrical resistance, the need to have an electric current flow through the suspended portion 203 is eliminated, which prevents self-heating of the suspended portion 203. Hence, the only heat that is generated is that produced by incident infrared radiation. This greatly improves the S/N ratio and detection accuracy. Also, with this example embodiment, a cooler required for a conventional quantum-type infrared detector is not required. In addition, with this example embodiment, since infrared radiation is not "read out" as an electric signal, a sensitive readout circuit for sensing a very weak electric signal produced by a conventional thermal-type infrared detector is not required.

With respect to the conversion (device of this example embodiment, an interference light beam can be obtained using the image-rendering apparatus shown in, e.g., FIG. 5. If (1) the conversion devics used in the apparatus of FIG. 5 is that of Example Embodiment 1, (2) the conversion device is irradiated with a flux of infrared radiation having a uniform transverse intensity profile, and (3) the second films 5 of the pixels do not uniformly define a plane because of poor flatness of the substrate 1 or of the total-reflection mirror 31, then signals having different interference intensities can be produced from the respective pixels regardless of the uniformity of the incident infrared light.

With the conversion device of Example Embodiment 12, in contrast, the half-mirror portion 208 and the total-reflection mirror 209 of each pixel together constitute an interference means. Interference light is produced by each pixel independently of the other pixels in the device. As a result, the uniformity of the output signal from one pixel to the next is excellent. Since it is unnecessary to form an interference optical system outside the conversion device (in contrast to Example Embodiment 1 as used with the apparatus of FIG. 5), the configuration of a readout optical system for use with the conversion device of Example Embodiment 12 can be simplified.

Further with respect to Example Embodiment 12, if the range of displacement of the displaceable member 206 is not limited, an inversion phenomenon can arise. During such an instance, when infrared radiation having excessive intensity is incident, the intensity of the resulting interference can be inverted because the intensity of the interference becomes alternately strong or weak whenever the optical-path difference equals ½ of the wavelength of the readout light. Thus, it is preferable to restrict the displacement of the displaceable member 206 to a range equal to or less than ¼ of the wavelength of the readout light to be sure that the change in interference intensity due to the displacement of the displaceable member 206 is monotonic. For example, in the case where the displaceable member 206 of FIG. 16(b) bends increasingly downward with an increase in temperature thereof, if the gap between the half-mirror portion 208 and the total-reflection mirror 209 is no more than ¼ of the readout-light wavelength, movement of the displaceable portion 206 is arrested when the half-mirror portion 208 contacts the total-reflection mirror 209, even under conditions of excessive infrared radiation. Since the intensity of the interference reaches a maximum at this point, the inversion phenomenon does not arise.

The foregoing pertains to situations when a monochromatic light flux is used as the readout light. If a white light flux is used as the readout light, then the range of displacement of the displaceable member 206 may be restricted so that changes in interference color caused by displacement of the displaceable member 206 are monotonic. If required, a specific restricting member for limiting the range of displacement of the displaceable member 206 additionally may be provided.

Example Embodiment 13

Figure 19:
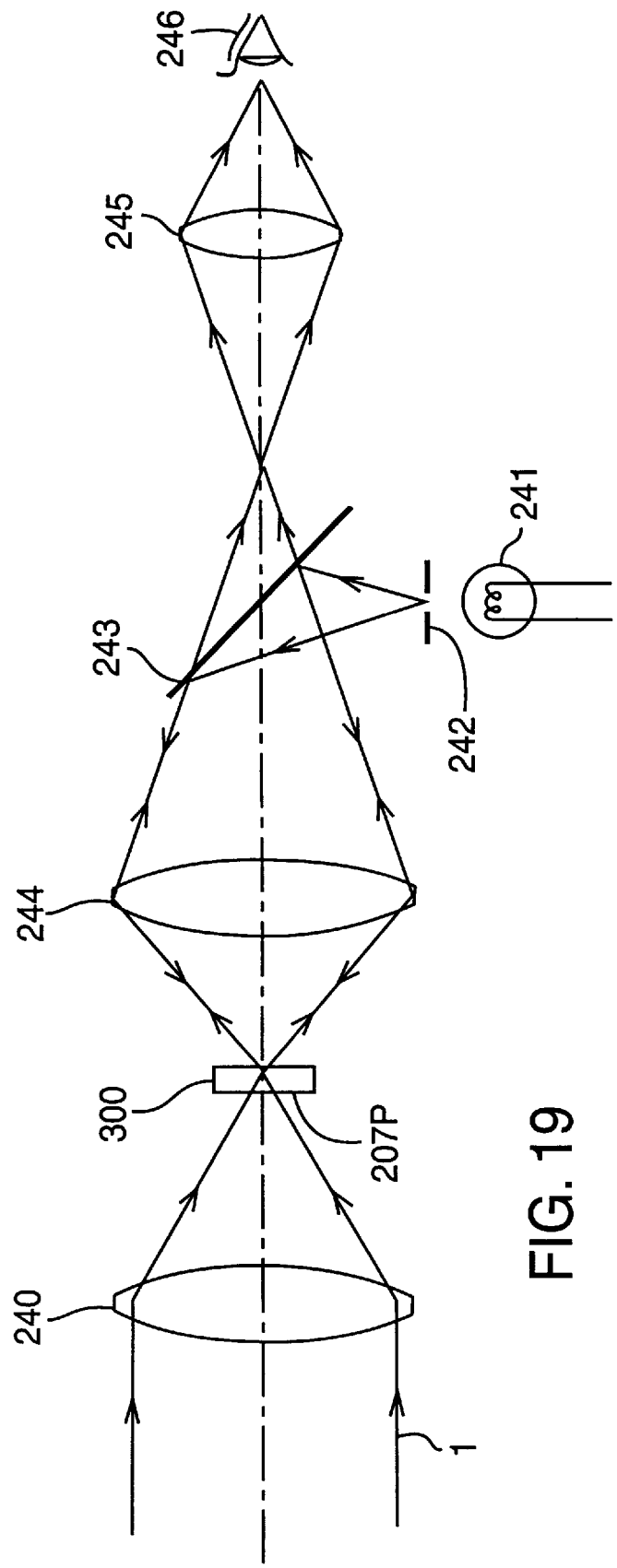
FIG. 19 is an optical diagram of an image-rendering apparatus according to Example Embodiment 13.

This example embodiment is directed to an image-rendering apparatus as shown in FIG. 19, which depicts an optical diagram of the apparatus. The FIG. 19 apparatus can comprise the conversion device of, e.g., Example Embodiment 12 (FIGS. 16(a)–16(b)), denoted in FIG. 19 by the reference numeral 300. Also in FIG. 19, right and left directions correspond to upward and downward directions, respectively, in FIG. 16(b).

The FIG. 19 apparatus comprises an imaging lens 240 transmissive to infrared light. The imaging lens 240 converges the infrared light i to form an infrared image on a plane 207P collectively defined by the IR-absorbing films 207 of the pixels of the conversion device 300. The FIG. 19 apparatus also comprises a readout optical system for illuminating the half-mirror portions 208 of the pixels of the conversion device 300 with a readout light flux $j_0$. The readout light flux is used to generate an optical image from the collective displacements of the displaceable portions 206 of the pixels, based on the respective interference light fluxes exiting from the half-mirror portions 208 of the pixels.

More specifically, the image-rendering apparatus of FIG. 19 comprises a light source 241, a diaphragm 242 (which may be replaced with an illumination lens); a beamsplitter 243; and lenses 244, 245, which together constitute the readout optical system.

Infrared light i is converged by the imaging lens 240 to form an infrared image on the plane 207P. The displaceable members 206 of the pixels of the conversion device 300 are displaced individually in accordance with the amount of infrared radiation incident on the IR-absorbing film 207 of the respective pixel.

A light flux emitted from the light source 241 is reflected by the beamsplitter 243, passes through the lens 244, and strikes the conversion device 300 as a readout light flux $j_0$. As a result, individual interference light fluxes each having an Interference intensity corresponding to the displacement of the displaceable member 206 of the respective pixel exit from the half-mirror portions 208 of the pixels toward the lens 244. The individual interference light fluxes pass through the lens 244, the beamsplitter 243, and the lens 245 to form collectively an optical image that can be observed by a human eye 246. Thus, the incident infrared image is converted to a visible image.

Alternatively, the optical image may be "picked up" by including with the FIG. 19 apparatus a two-dimensional CCD or the like situated at the location of the eye 246. In such an instance, variations in sensitivity, offset, or the like can be corrected electrically. Similar results can be realized if the conversion device 300 is used with any of the other image-rendering apparatus described above (e.g., any of Example Embodiments 2–8). Even though not necessary, it is preferred that the CCD have the same number of pixels as the conversion device 300.

The readout optical system is not limited to the configuration shown in FIG. 19. Since the conversion device 300 produces interference internally, it is unnecessary to provide an additional optical system for making interference occur outside the conversion device 300. It is sufficient that the conversion device 300 be able to internally create interference having an intensity profile enabling the interference intensity distribution to be observed.

In addition, the readout light is not limited to monochromatic light, but may comprise, e.g., white light. If white light is used, the interference-intensity profile is observed as a distribution of interference colors.

Alternatively, when the readout light comprises two monochromatic light fluxes having different wavelengths, optical path-length differences can be observed even when the interference includes one period or more (which is not so when a monochromatic light beam is used). Thus, using two monochromatic light fluxes as readout light allows the infrared image to be "read out" over a wider dynamic range compared to the case in which a monochromatic light is used.

Example Embodiment 14

Figure 20:
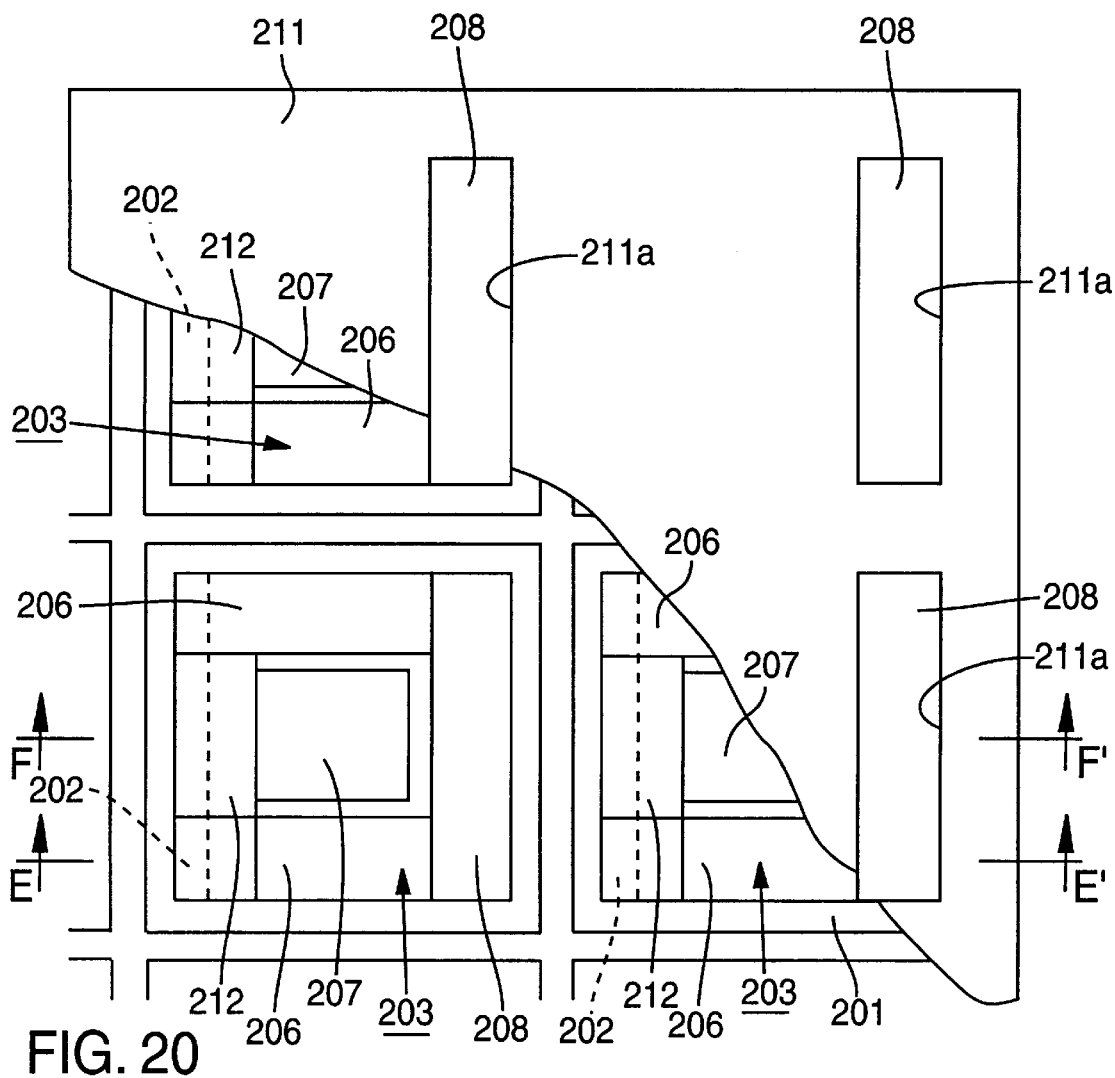
FIG. 20 is a schematic partially cutaway plan view of four pixels of a conversion device according to Example Embodiment 14.
Figure 21A:
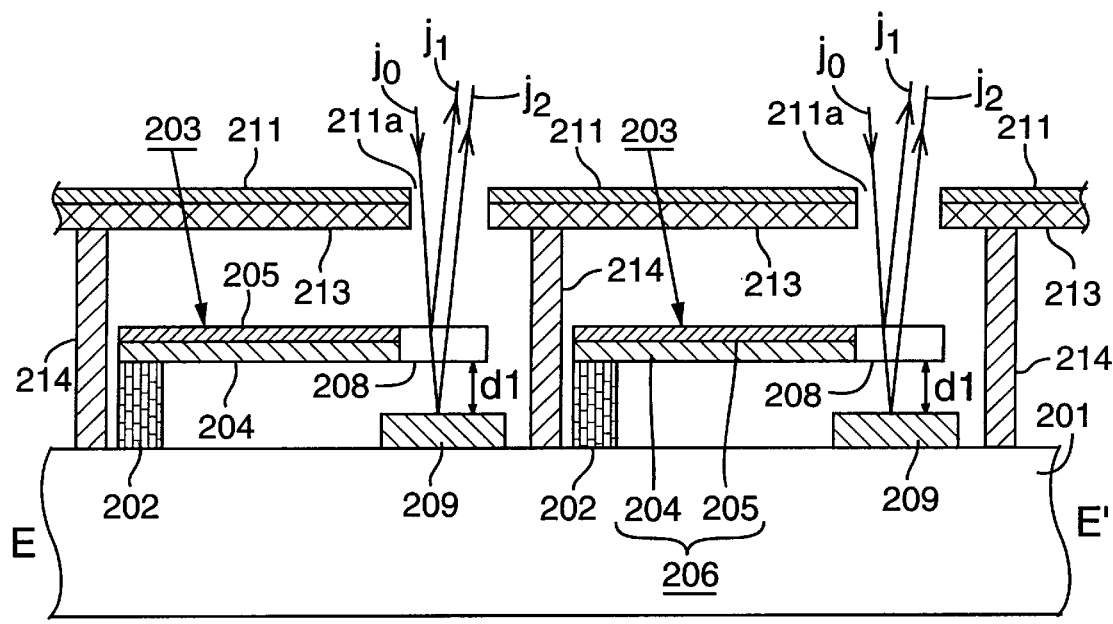
Figure 21B:
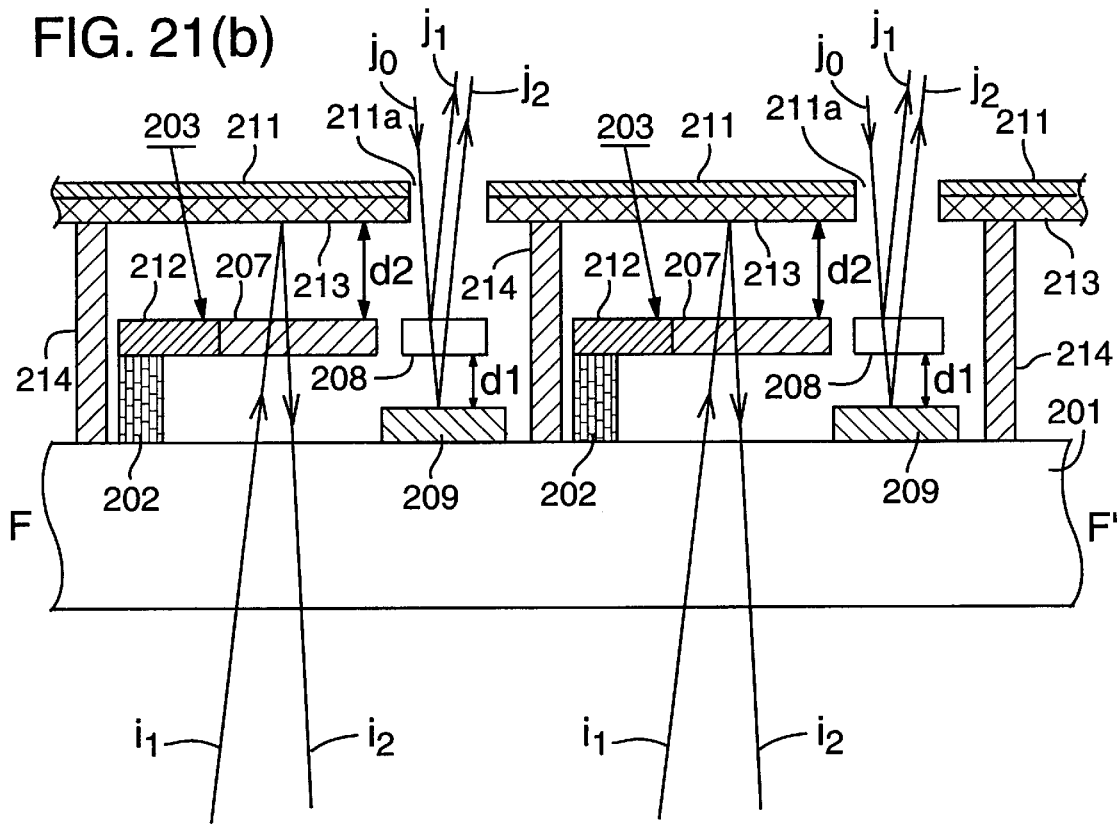

A conversion device according to this example embodiment is shown in FIGS. 20 and 21(a)–21(b). FIG. 20 is a partial cutaway plan view schematically depicting four representative pixels of the conversion device. FIG. 21(a) is a schematic sectional view of the FIG. 20 device along the line E-E', and FIG. 21(b) is a schematic sectional view of the FIG. 20 device along the line F-F'. In FIGS. 20 and 21(a)–21(b), components that are similar to those shown in FIGS. 16(a)–16(b) have the same reference numerals and are not described further below.

Referring to FIG. 20, an IR-absorbing film 207 is supported in the center of each pixel. In each pixel, a displaceable member 206 flanks two opposing sides of the IR-absorbing film 207, and a half-mirror portion 208 is attached to the distal (unsupported) end of the displaceable members 206 so as to effectively surround the IR-absorbing film 207 on three sides thereof. Each IR-absorbing film 207 is connected thermally to the displaceable member 206 via a connector 212 formed of a material having a high thermal conductivity such as copper or the like. The connectors do not move even when the respective displaceable members 206 move. Thus, the IR-absorbing films 207 are fixed with respect to the substrate 201 independently of any movement of the displaceable member 206, and the IR-absorbing films 207 and respective displaceable embers 206 are thermally connected to each other. That is, in each pixel, one end of the displaceable member 206 and the connector 212 are fixed to a leg portion 202, while the IR-absorbing film 207 is fixed to the connector 212 but not to the displaceable member 206.

The suspended portion 203 is supported so as to extend as a cantilever from the respective leg portion 202. The suspended portion 203 comprises the respective displaceable member 206, IR-absorbing film 207, and connector 212.

Even if the IR-absorbing films 207 are made thicker so as to increase the ratio of deflection per unit absorption, movement of the displaceable members 206 is not prevented thereby. In contrast, in the conversion device of FIGS. 16(a)–16(b), with increasing thickness of the IR-absorbing film 207, the displaceable member 206 increases in mechanical strength. Such increased thickness can inhibit deflection of the displaceable member 206.

As shown in FIGS. 21(a)–21(b), an infrared-reflecting (IR-reflecting) film 23 is provided for reflecting infrared light. The IR-reflecting film 213 is spaced vertically (in the figure, in a direction opposite to the direction of propagation of incident infrared light) apart from the IR absorbing film 207 a distance d2, wherein d2 is substantially equal to $n\lambda_0/4$, wherein n is an odd number and $\lambda_0$ is the median wavelength of the incident infrared light. Thus, a so-called optical cavity structure is formed between the films 207, 213 in which interference occurs between the incident infrared light $i_1$ and the reflected infrared light $i_2$. A portion of the incident infrared radiation $i_1$ is absorbed by the IR-absorbing film 207, and the remaining portion of the infrared i radiation is transmitted by the IR-absorbing film 207 and reflected by the under-surface of the IR-reflecting film 213, and is incident again on the IR-absorbing film 207. Interference between these counterpropagating infrared light fluxes occurs in the space between the IR-absorbing film 207 and the IR-reflecting film 213. Absorption of infrared light by the IR-absorbing film 207 reaches a maximum because the integral d2 is equal to ¼ of an odd-number multiple of the median wavelength of the incident infrared light, thereby further improving the absorption of infrared light by the IR-absorbing film 207. The IR-reflecting film 213 can be made of Al or the like.

The IR-reflecting film 213 also can serve to support a mask 211 formed on the upper surface of the IR-reflecting film 213. The mask 11 can be made of gold oxide or the like. The IR-reflecting film 213 is spaced apart from the substrate 201 by a support 214.

Except for the differences described above, the conversion device of this example embodiment shares certain similarities with the conversion device of FIGS. 16(a)–16(b). Thus, the conversion device of this example embodiment provides the same advantages as obtained by the conversion device of FIGS. 16(a)–16(b).

The conversion device according to this example embodiment can be used in the image-rendering apparatus of, e.g., FIG. 19 as item 300 in that figure.

Figure 22A:
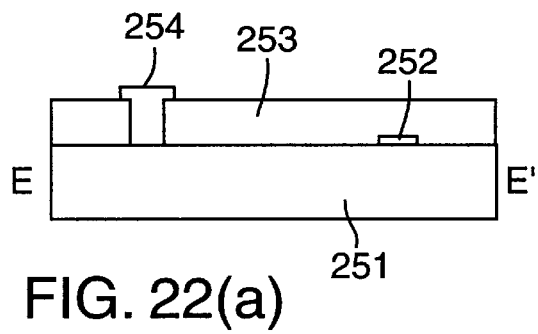
Figure 22B:
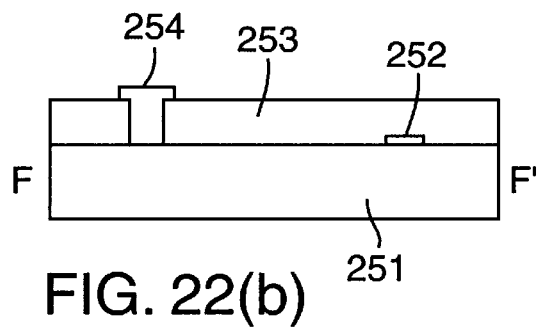
Figure 22C:
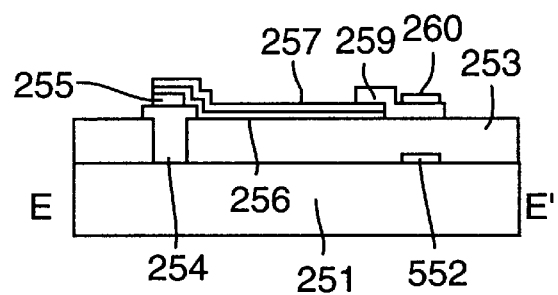
Figure 22D:
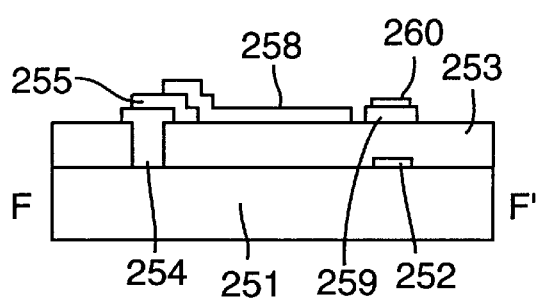
Figure 22E:
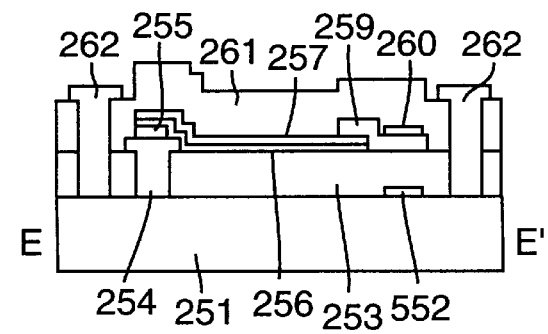
Figure 22F:
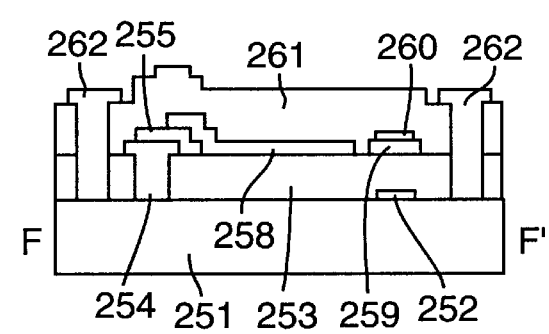
Figure 22G:
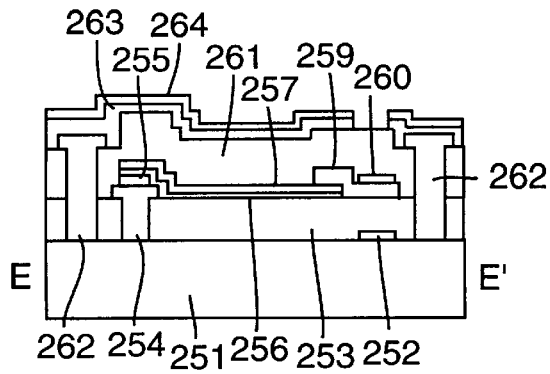
Figure 22H:
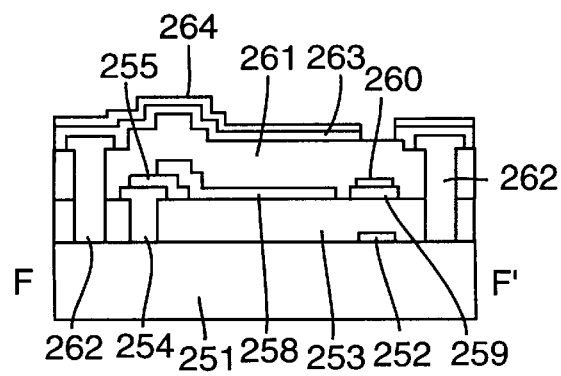
Figure 22I:
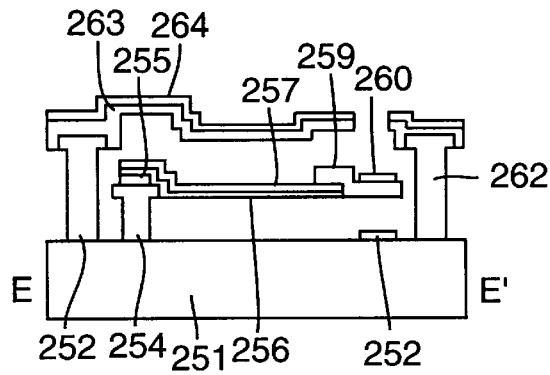
Figure 22J:
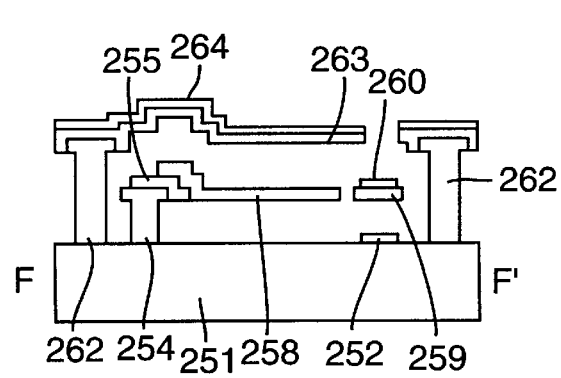

The conversion device of this example embodiment can be manufactured by process, certain steps of which are illustrated in FIGS. 22(a)–22(j). Each of FIGS. 22(a)–22(j) is sectional view of the result of the respective step in the process. FIGS. 22(a) and 22(b) show the result of the same step; FIGS. 22(c) and 22(d) show the result of the same step; FIGS. 22(e) and 22(f) show the result of the same step; FIGS. 22(g) and 22(h) show the result of the same step; and FIGS. 22(i) and 22(j) show the result of the same step. FIGS. 22(a), 22(c), 22(e), 22(g), and 22(i) correspond to FIG. 21(a) and depict the section taken along the line E-E' in FIG. 20. FIGS. 22(b), 22(d), 22(f), 22(h), and 22(j) correspond to FIG. 21(b) and depict the section taken the line F-F' in FIG. 20.

In a first step, a high-melting-point metal film 252 (e.g., titanium or the like having a thickness of, e.g., 1000 Å and destined to be the total-reflection mirror 209) is formed on a silicon substrate 251 (corresponding to the substrate 201) by sputtering or the like. The metal film 252 is patterned in accordance with the intended shape and locations of the total-reflection mirrors 209. Next, a polyimide film 253

(having a thickness of, e.g., 1500 Å) is formed on the exposed surfaces by, e.g., spin-coating. Openings are formed by photolithography and etching at locations on the polyimide film 253 destined to be the locations of the leg portions 202. Then, a silicon oxide film 254 (having a thickness of, e.g., 1000 Å and destined to become the leg portions 202) is deposited on the exposed surfaces of the polyimide film 253, by a low-temperature process such as plasma CVD or the like, to fill in the openings. The silicon oxide film 254 is patterned in accordance with the intended shape of the leg portions 202 by photolithography and etching (FIGS. 22(a) and 22(b)).

Next, a copper film 255 (having a thickness of, e.g., 2000 Å and destined to become the connector 240) is formed on the polyimide film 253 and the silicon oxide film 254 by sputtering. The copper film is patterned in accordance with the intended shape and locations of the connector 240 by photolithography and etching. Then, a metal film 256 (having a thickness of, e.g., 1000 Å and destined to become the first film 204) and a metal film 257 (having a thickness of, e.g., 1000 Å and destined to become the second film 205) are formed successively by sputtering. The metal films 256, 257 are patterned in accordance with the intended shapes and locations of the first and second films 204, 205, respectively, by photolithography and etching. Next, a gold oxide film 258 (having a thickness of, e.g., 3000 Å and destined to become the IR-absorbing film 207) is formed by sputtering, evaporation, or the like. The gold oxide film is patterned in accordance with the intended shape and locations of the IR-absorbing film 207 by photolithography and etching. Then, a silicon oxide film 259 (having a thickness of, e.g., 1000 Å and destined to become the support for the half-mirror portion 208) is deposited on the exposed surfaces by plasma CVD or the like. The silicon oxide film 259 is patterned in accordance with the intended shape and locations of the half-mirror portions 208 by photolithography and etching. Since the support (not shown in FIGS. 21(a) and 21(b)) for the half-mirror portion 208 is formed of the silicon oxide film 259, the support is transparent to visible light. Then, a metal film 260 (such as titanium or the like having a thickness of, e.g., 100 Å and destined to be the actual half-mirror portion) is formed on the silicon oxide film 259 and other exposed films by, e.g., sputtering, to obtain a desired reflectivity. The metal film 260 is patterned in accordance with the intended shape and locations of the half-mirror portion 208 by photolithography and etching (FIGS. 22(c)–22(d)).

Next, a polyimide film 261 (having a thickness of, e.g., 2.5 μm and destined to be the sacrificial layer) is formed on the exposed surfaces by, e.g., spin-coating. A groove is formed by photolithography and etching at each intended position on the polyimide film 261 corresponding to the supports 242. Next, a silicon oxide film 262 (having a thickness of, e.g., 1.5 μm and destined to become the supports 242) is deposited on the polyimide film 261 by a low-temperature process such as plasma CVD to fill in the grooves. The silicon oxide film 262 is patterned in accordance with the intended shape and locations of the supports 242 by photolithography and etching (FIGS. 22(e) and 22(f)).

Next, to the surface of the structure shown in FIGS. 22(e) and 22(f) is applied an aluminum film 263 (having a thickness of, e.g., 1000 Å and destined to become the IR-reflecting film 241) and a gold oxide film 264 (having a thickness of, e.g., 3000 Å and destined to become the mask 211) are formed successively by sputtering or the like. The films 263, 264 are patterned in accordance with the intended shapes and locations of the IR-reflecting film 241 and the mask 211 by photolithography and etching (FIGS. 22(g) and 22(h)).

Finally, the polyimide films 253 and 261 are removed by elution using an organic solvent, plasma etching, or other suitable technique (FIGS. 22(i) and 22(j)), thereby completing formation of the conversion device.

Certain steps of the fabrication method described above are derived from known semiconductor-process techniques. Thus, this fabrication method can be performed easily. During execution of the method, the displaceable members (each comprising the films 256 and 257) are supported by and affixed to the sacrificial layer (the polyimide films 253 and 261) until the sacrificial layer is removed, thereby minimizing defects such as deformation or breakage of the displaceable members.

Normally, multiple conversion devices are fabricated at the same time on a single substrate 251. In such an instance, the substrate 251 is cut into individual "chips" each comprising a conversion device. Separation of the chips is preferably performed before removing the sacrificial layer, i.e., after the step shown in FIGS. 22(g) and 22(h). This protocol minimizes deformation or breakage of the displaceable members since the displaceable members (films 256, 257) are supported by and affixed to the sacrificial layer during the chip-cutting step.

In the conversion device shown in FIGS. 20 and 21(a)–21(b), the IR-reflecting film 241 and the mask 211 can be omitted in certain instances.

If the half-mirror portion 208 is replaced with a total-reflection mirror in the conversion device shown in FIGS. 16(a) and 16(b) or the conversion device shown in FIGS. 20, 21(a), and 21(b), then the conversion devices can be used in any of the image-rendering apparatus shown in FIGS. 5–11 in place of the conversion device 100. Whenever the conversion device 100 is replaced in such a manner, the total-reflection mirror 209 is not required.

If it is desired to merely detect the intensity of infrared radiation rather than produce an image therefrom, an infrared detector according to the invention can be obtained by configuring the conversion device to include a single pixel and by retaining only that portion of the readout optical system that is relevant to a single pixel.

Example Embodiment 15

Figure 23:
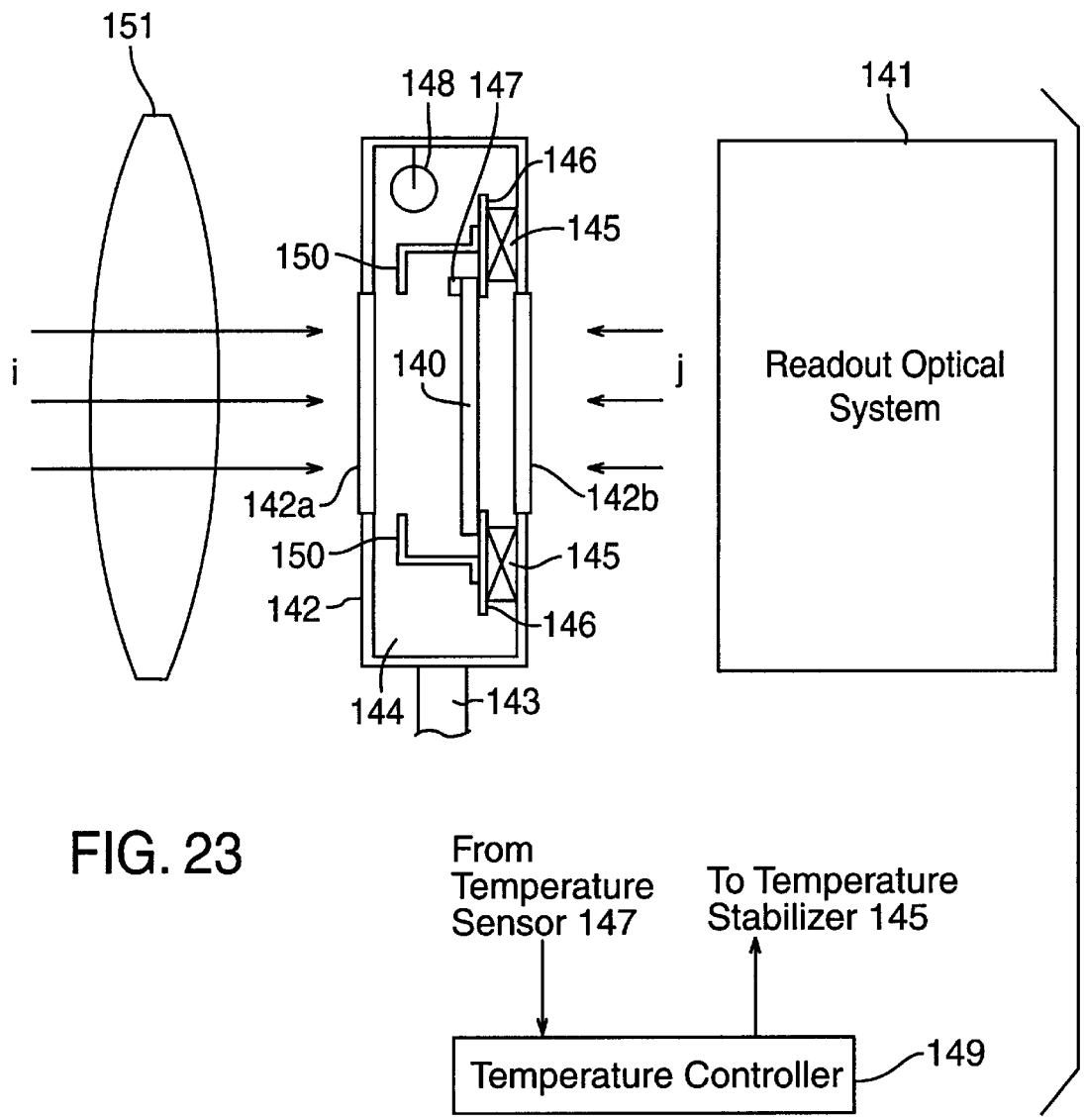
FIG. 23 is an optical diagram of an image-rendering apparatus according to Example Embodiment 15.

An image-rendering apparatus according to this example embodiment is depicted schematically in FIG. 23, and comprises a conversion device 140 that, like the conversion device described in Example Embodiment 1, for example, comprises multiple pixels arranged in one or two dimensions. Each of the pixels (a) receives a flux of incident radiation i (e.g., infrared, ultraviolet, or X-ray light, but referred to generally herein as "IR" light) and generates heat from absorption of the incident IR light i; (b) exhibits a displacement corresponding to the amount of generated heat; (c) receives a readout light flux j and changes a characteristic of the readout light flux j by an amount corresponding to the displacement; and (d) emits readout light having the changed characteristic. The FIG. 23 apparatus also comprises a readout optical system 141 that forms an optical image, corresponding to the displacement profile of the pixels, based on the emitted readout light having the changed characteristic.

The conversion device 140 is housed in a container 142 that is sealable from the exterior environment. The container 142 comprises a window 142a transmissive to the IR light flux i, and a window 142b transmissive to the readout light flux j. If the light flux i comprises IR light, the window 142a preferably is made of Ge which transmits IR light and blocks other light. The window 142 preferably is transmissive only to readout light (e.g., white light or monochromatic light) and blocks other light. The container 142 itself can be made of, for example, copper, stainless steel, aluminum, aluminum alloy, or other suitable material. Connected to the container 142 is an exhaust conduit 143 for evacuating the space 144 defined inside the container 142. The exhaust conduit 143 includes a valve or other means (not shown) for obstructing flow through the conduit 143 after evacuating the space 144 so as to maintain the space 144 at a suitable "vacuum" during operation of the conversion device 140.

As an alternative to evacuating the space 144, it may be filled with an inert gas having low thermal conductance such as xenon gas or the like. In any event, a gas scavenger 148 such as a getter, silica gel, or the like preferably is placed in the space 144 inside the container 102.

The FIG. 23 apparatus further comprises a temperature stabilizer 145 for maintaining the temperature of the substrate of the conversion device 140 constant. The temperature stabilizer 145 can comprise, e.g., a Peltier device. The temperature stabilizer 145 is located preferably inside the container 142 and is coupled thermally with the substrate of the conversion device 140 via a heat-transfer plate 146. The temperature stabilizer 145 alternatively can be located outside the container 142. In any event, the temperature stabilizer 14, should not block incoming readout light j.

The FIG. 23 apparatus also comprises a temperature sensor 147 for detecting the temperature of the substrate 1 of the conversion device 140, and a temperature controller 149 for controlling operation of the temperature stabilizer 145 to maintain constancy of the temperature of the substrate of the conversion device 140.

The temperature sensor 147 is preferably different from the conversion device 140. By way of example, if the conversion device 140 has a silicon substrate, then the temperature sensor 147 may be a resistance bolometer installed directly on the substrate. Alternatively, the temperature sensor 147 can be used for detecting the temperature of the substrate of the conversion device 140 indirectly by sensing the temperature of the heat-transfer plate 146 rather than the substrate.

The temperature controller 149 controls the electric current passing through the temperature stabilizer 145, based on a detection signal delivered to the temperature controller 149 from the temperature sensor 147. Thus, the substrate temperature is set so as to be at or near the temperature of the surrounding environment.

Furthermore, as shown in FIG. 23, the container 142 also preferably encloses a thermal shield 150. The thermal shield 150 is coupled thermally to the temperature stabilizer 145 via the heat-transfer plate 146 and reduces the amount of unwanted thermal energy transferred to the conversion device 140. The thermal shield 150 is made of a material having high thermal conductance.

The FIG. 23 embodiment also comprises a lens 151 transmissive to the irradiation light flux i. The lens 151 converges the irradiation light flux i in an image-forming way.

The conversion device 140 used in the FIG. 23 embodiment can be, for example, the conversion device described above in Example Embodiment 1 (FIGS. 1(a)–1(d)), Example Embodiment 10 (FIGS. 14(a)–14(d)), Example Embodiment 11 (FIGS. 15(a)–15(c)), Example Embodiment 12 (FIGS. 16(a)–16(b)), Example Embodiment 14 (FIGS. 20 and 21(a)–21(b)), or any other conversion device according to the invention.

Representative methods for making the conversion device 140 are, for example, as described above in Example Embodiment 1.

As described above, an image carried by the incident irradiation (e.g., infrared radiation) can be produced using the image-rendering apparatus of this Example Embodiment (FIG. 23) with high accuracy and high sensitivity without having to use a cooler. The substrate temperature of the conversion device 140 is kept virtually constant by enclosing the conversion device 140 in the sealed container 142, detecting the temperature of the substrate using the temperature sensor 147, and controlling the temperature stabilizer 145 with the temperature controller 149 based on a temperature-detection signal from the temperature sensor 147. Thus, the substrate temperature of the conversion device 140 is kept constant even if the temperature of the environment outside the container 142 changes, and any displacement exhibited by each pixel of the conversion device depends only on the intensity of the incident irradiation i at the respective pixel and not on any temperature change of the pixel conducted from the external environment. This allows for stable imaging.

Although not required, it is preferred to keep the space 144 inside the container 142 under "vacuum" to prevent temperature variations of the container 142, arising from temperature changes in the surrounding environment, from being convectively transferred to the conversion device 140. This provides even more stability to the substrate temperature and thus to the image produced by the apparatus.

If the space 144 inside the container 142 is evacuated but the container 142 lacks this gas scavenger 148, then the vacuum level of the space 144 typically exhibits a gradual loss of "vacuum" due to outgassing. Such a situation could allow temperature variations in the external environment to have gradually more effect on the temperature of the conversion device 140, with a corresponding reduction in image stability. Including the gas scavenger 148 inside the container 142 allows outgassed molecules to be constantly removed from the space 144, and thus provides much greater stability of the vacuum level inside the container 102.

Placing the temperature stabilizer 145 inside the container 142 rather than outside the container 102 reduces the thermal load imposed on the temperature stabilizer 145, allowing temperature to be controlled with greater responsiveness. Thus, the temperature of the substrate of the conversion device 140 is maintained constant with a high degree of accuracy.

Even if the space 144 inside the container 142 is evacuated, if the temperature of the container 142 changes in response to a temperature change in the surrounding environment, then the amount of infrared radiation emitted by the container can exhibit a corresponding change, which can cause a corresponding change in substrate temperature of the conversion device 140. The thermal shield 150, however, helps prevent such a phenomenon by blocking unwanted infrared rays from reaching the conversion device 140. This facilitates more accurate temperature control of the conversion device 140.

Example Embodiment 16

Figure 24A:
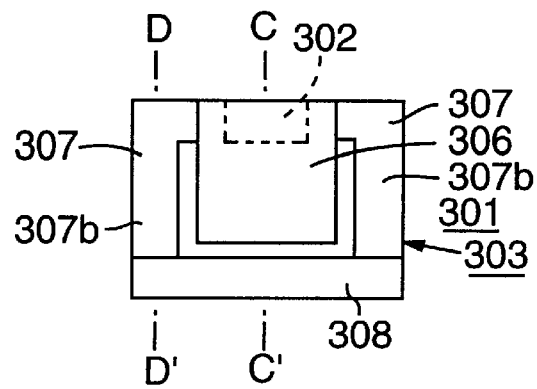
Figure 24B:
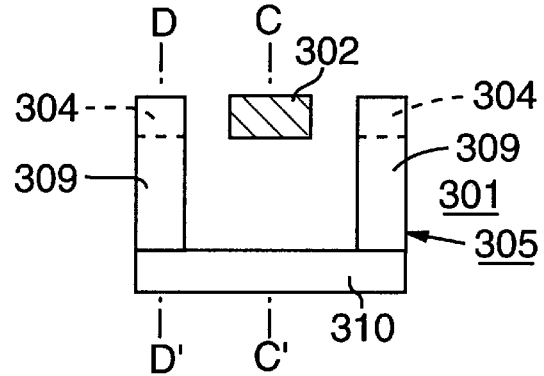
Figure 24C:
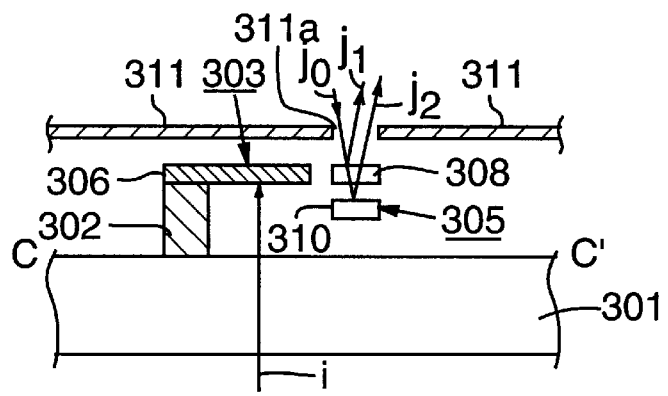
Figure 24D:
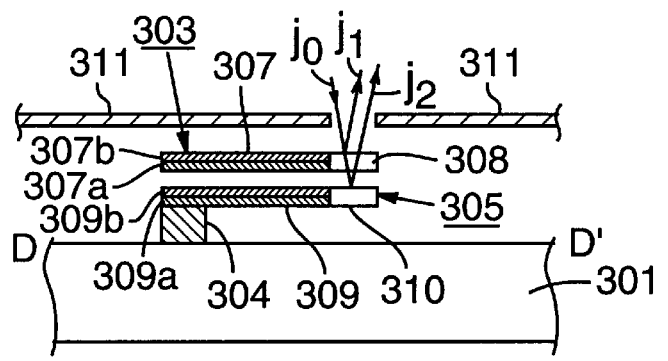
Figure 25:
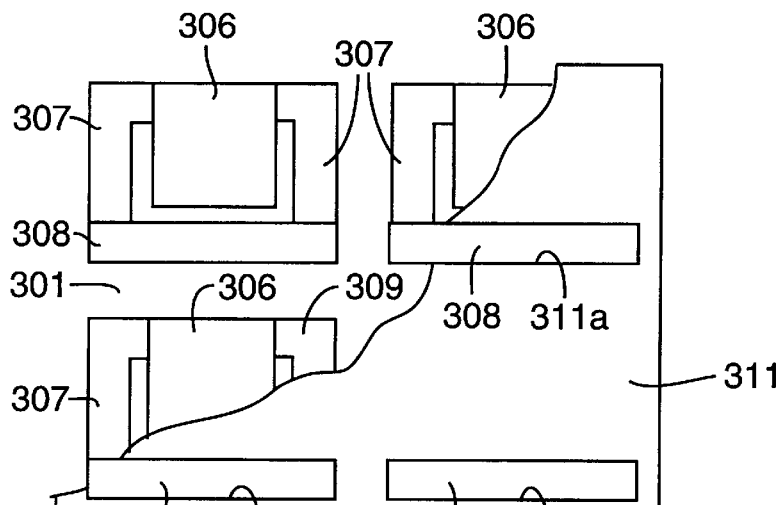
FIG. 25 is a schematic partial cutaway plan view of four pixels of the conversion device of Example Embodiment 16.

A conversion device according to this example embodiment is shown in FIGS. 24(a)–24(d) and 25. A representative pixel of the conversion device has a bilevel structure, wherein FIG. 24(a) is a schematic plan view of an upper level and FIG. 24(b)) is a schematic plan view of a lower level (i.e., a level closer to the substrate than the upper level). FIG. 24(c) is a sectional view of the pixel of FIG. 24(a) along the line C-C', and FIG. 24(d) is a sectional view of the pixel of FIG. 24(a) along the line D-D'. FIG. 25 is a plan view with partial cutaway of a group of four pixels of the conversion device.

The conversion device of this example embodiment can be incorporated into any of various image-rendering apparatus according to the invention, such as the apparatus disclosed above in Example Embodiment 15 (in which instance the conversion device of this example embodiment is represented by the conversion device 140 shown in FIG. 23).

The conversion device of this example embodiment comprises a substrate 301, a first suspended portion 303 attached to and supported by a first leg portion 302 so as to be suspended in cantilever fashion over the substrate 301, and a second suspended portion 305 attached to and supported by a second leg portion 304 so as to be suspended in cantilever fashion over the over the substrate 301. The first and second suspended portions 303, 305 comprise the upper and lower levels, respectively.

Referring for example to FIG. 24(c), an infrared light flux i (as a representative irradiation light flux) is incident from below the substrate 301. A readout light flux $j_0$ is incident from above the substrate 301. With such a configuration, the substrate 301 is preferably made of a material (e.g., Si or Ge) that is transmissive to infrared light. Alternatively, the readout light flux $j_0$ can be incident from below the substrate 301 with the infrared light flux i being incident from above the substrate 301; in such alternative configuration the substrate 301 preferably is made of a material that is transmissive to the readout light flux $j_0$. However, if the substrate 301 is configured to define through-apertures for transmitting the infrared light flux or the readout light flux as required, then any of various materials can be used for the substrate 301.

The first suspended portion 303 comprises an IR-absorbing film 306 attached to the lee portion 302 (FIG. 24(a)). The IR-absorbing film 306 is situated so as to receive and absorb the incident infrared light flux i, and to convert the infrared light into heat. A first displaceable member 307 comprises two segments affixed to opposite sides of the IR-absorbing film 306 (FIG. 24(a)). A half-mirror portion 308 is attached to distal ends of the first displaceable member 307 for reflecting a portion of the readout light flux $j_0$. Thus, the first displaceable member 307 is configured as a cantilever.

The IR-absorbing film 306 is coupled thermally to the first displaceable member 307. The IR-absorbing film 306 is configured so as not to move even if the first displaceable member 307 is displaced.

Representative materials for making the IR-absorbing film 306 include, for example, sintered metals, ceramics (e.g., mixed sintered bodies such as $ZrO_2$, $MnO_2$, $FeO_3$, CoO, CuO, $Al_2O_3$, MgO, $SiC_2$, or mixtures thereof), positive resists, negative resists, graphite (carbon), and SiN.

The first displaceable member 307 comprises two superposed films 307a, 307b each made of a material having a different coefficient of thermal expansion. Thus, the films 307a, 307b have a so-called "thermal bimorph" structure. With such a structure, the first displaceable member 307 is displaced by a magnitude corresponding to the heat generated in the IR-absorbing film 306. More specifically, the first displaceable member 307 tilts upward if heat is generated in the IR-absorbing film 306 and the bottom film 307a has a larger coefficient of thermal expansion than the top film 307b. On the other hand, if the coefficient of thermal expansion of the bottom film 307a is smaller than the coefficient of thermal expansion of the top film 307b, then the first displaceable member 307 tilts downward if heat is generated in the IR-absorbing film 306.

The films 307a and 307b may be made of any of various materials having different coefficients of thermal expansion. For example, any of various metallic materials can be used that are conventionally used to make thermal bimorphs can be used, including Al, Ag, and MgO (see, e.g., Table 1).

Since the first suspended portion 303 extends over the substrate 301 with a void therebetween, the thermal resistance between the first suspended portion 303 and the substrate 301 is high. The leg portion 302 preferably is made of a thermally insulating material such as $SiO_2$. Thus, the space between the first suspended portion 303 and the substrate 301 is an electrical insulator having a low heat conductance and a high thermal resistance, thereby further increasing the thermal resistance between the first suspended portion 303 and the substrate 301. Such a configuration allows thermal energy to become trapped in the first suspended portion 303, which causes the temperature of the IR-absorbing film 306 to increase more with smaller amounts of incident infrared light. Thus, infrared detection sensitivity is improved.

The second suspended portion 305 comprises a second displaceable member 309 comprising two segments each having an end situated directly below a respective segment of the first displaceable member 307. The second displaceable member 309 is affixed to the second leg portion 304. The second leg portion 304 preferably is made of an insulative material such as $SiO_2$. The second displaceable member 309 also comprises a total-reflection mirror 310 that reflects the readout light flux transmitted by the half-mirror portion 308. The total-reflection mirror 310 is affixed to the distal ends of the two segments of the second displaceable member 309, which surround three sides of the first leg portion 302 (FIG. 24(c)). The total-reflection mirror 310 faces the half-mirror portion 308.

The second displaceable member 309 is configured as a cantilever, and comprises two superposed films 309a, 309b similar to the first displaceable member 307. The films 309a, 309b are made of materials (such as any of the materials from which the films 307a, 307b can be made) having different coefficients of thermal expansion; thus, the films 309a, 309b are configured as a thermal bimorph. As such, the second displaceable member 309 is displaceable, relative to the second leg portion 304, by a magnitude that is proportional to the amount of heat received by it from the substrate 301 via the second leg portion 304. Preferably, the direction of displacement of the second displaceable member 309 is the same as the direction of displacement of the first displaceable member 307 with absorption of heat. In other words, the materials for the films of the first and second displaceable members 307, 309, respectively, preferably are selected such that the dominance relation (i.e, "greater than" or "less than") of the thermal-expansion coefficient of the bottom film 309a relative to the top film 309b coincides with the dominance relation of the thermal-expansion coefficient of the bottom film 307a relative to the top film 307b.

Whenever the readout light flux $j_0$ strikes the half-mirror portion 308, a portion of the readout light flux $j_0$ is reflected by the half-mirror portion 308 and becomes reflected light $j_1$. The remainder of the readout light flux $j_0$ passes through the half-mirror portion 308, is reflected by the total-reflection mirror 310, and re-enters the half-mirror portion 308 from below. A portion of the readout light re-entering the half-mirror portion 308 from below passes through the half-mirror portion 308 and becomes transmitted light $j_2$. The optical path-length differential between the transmitted light $j_2$ and the reflected light $j_1$ is twice the dimension of the gap between the half-mirror portion 308 and the total-reflection mirror 310. An interference corresponding to the optical path difference arises between the transmitted light $j_2$ and the reflected light $j_1$. Thus, the transmitted light $j_2$ and the reflected light $j_1$ become an interference light flux having an interference intensity corresponding to the optical path length (i.e., corresponding to the displacement of the first displaceable member 307 relative to the second displaceable member 309). The interference light flux is emitted from the half-mirror portion 383. The intensity of the interference light flux reaches a maximum when the intensity of the reflected light $j_1$ and the intensity of the transmitted light $j_2$ are equal. Thus, it is desirable that the reflectance of the half-mirror portion 308 be approximately 38 percent.

In view of the foregoing, the half-mirror portion 308 and the total-reflection mirror 310 collectively constitute an interference means that receives the readout light flux $j_0$, transforms the received readout light flux $j_0$ into an interference light flux having an interference characteristic corresponding to the relative displacement of the first displaceable member 307 relative to the second displaceable member 309, and emits the interference light flux. More generally, the half-mirror portion 308 and the total-reflection mirror 310 receive the readout light flux $j_0$, change a characteristic of the received readout light flux $j_0$ by an amount corresponding to the relative displacement of the first displaceable member 307 relative to the second displaceable member 309, and emit the changed readout light.

Turning now to FIG. 25, each of the pixels of a conversion device according to this example embodiment comprises the first and second suspended portions 303, 305, respectively, the half-mirror portion 308, the total-reflection mirror 310, and the first and second leg portions 302, 304, respectively. The pixels are arranged, by way of example, two-dimensionally on the substrate 301.

A conversion device according to this example embodiment also can comprise a mask 311 (FIGS. 24(c)–24(d)). The mask 311 blocks the readout light flux $j_0$ except for the portion of the readout light flux $j_0$ directed to, reflected from, or transmitted through the half-mirror portion 308. To such end, for each pixel, the mask 311 defines an aperture 311a having a shape and dimensions corresponding to the shape and dimensions, respectively, of the respective half-mirror portion 308. The mask 311 can be made, for example, in the same way as the mask 211 described above in Example Embodiment 12.

The interference light emitted from the half-mirror portion 308 constitutes a "signal light." Mixing of other readout light (i.e., "noise light" which is light other than the interference light) with the signal light can cause a reduction in the S/N ratio of the conversion device. Although the mask 311 is not necessary, the mask 311 prevents mixing of noise light with signal light, thus increasing the S/N ratio.

Referring to FIGS. 24(c)–24(d), the infrared light flux i is incident from below the substrate 301. The infrared light flux i passes through the substrate 301 and is absorbed by the IR-absorbing film 306 in which the light is converted into heat. The heat is transferred to the first displaceable member 307 which responds by distorting and tilting upward or downward relative to the substrate. The second suspended portion 305 lacks an IR-absorbing film. Hence, the second displaceable member 309 does not distort or tilt when is illuminated by the infrared light flux i.

A readout light flux $j_0$ (e.g., visible light produced by a readout optical system of an image-rendering apparatus) is incident from above and passes through the aperture 311a of the mask 311. The readout light flux $j_0$ is incident on the half-mirror portion 308. As described above, readout light $j_0$ incident on the half-mirror portion 308 is transformed into the interference light flux exhibiting an interference intensity corresponding to the displacement of the first displaceable member 307 relative to the second displaceable member 309. The interference light flux propagates upward in FIGS. 24(c) and 24(d) from the half-mirror portion 308 and serves as signal light. By exploiting interference of light in such a manner, detection of the infrared image can be performed with a higher degree of sensitivity compared to conventional image sensors. Furthermore, because the infrared image is not converted by an array of resistance bolometers as used in the prior art, there is no need to supply an electric current to the first suspended portion 301 and there is no production of self-generated heat. Consequently, the only heating that arises is due to the incident irradiation. The result is an improved S/N ratio, improved detection accuracy, and better detection accuracy of an image conveyed by an infrared light flux (or other incident irradiation). In addition, the cooler that was necessary in prior-art quantum-type infrared detectors is not needed.

The temperature of the substrate 301 can change with a change in temperature of the environment of the substrate. Such a temperature change of the substrate 301 can conduct to the first displaceable member 307 via the first leg portion 302 regardless of the thermal resistivity of the first leg portion 302. The first displaceable member 307 can be displaced due to such a temperature change. However, under such conditions, the second displaceable member: 309 would be displaced in the same direction as the first displaceable member 307 with respect to the substrate 301 by an amount corresponding to the heat transferred thereto from the substrate 301. Thus, the displacement of the first displaceable member 307 relative to the second displaceable member 309 (and the displacement of the half-mirror portion 308 relative to the total-reflection mirror 310) is substantially the same as the displacement of the first displaceable member 307 produced by heating due to the incident infrared light i and transferred from the IR-absorbing film 306 (which displacement is not influenced by the temperature of the environment). Hence, the conversion device of this example embodiment exhibits minimal response to changes in substrate temperature. This eliminates the need to strictly control temperature of the substrate.

If the displacement amounts of the first and second displaceable members 307, 309, respectively, due to the substrate temperature are substantially equal, then any influence of external-environmental temperature can be eliminated nearly completely, which is desirable. This can be accomplished by manufacturing the first and second displaceable members 307, 309 using the materials and the same dimensions.

Furthermore, if the thermal-change time constants of the first and second displaceable members 307, 309, respectively, with respect to substrate temperature are substantially equal, then transitional temperature changes due to the influence of changes in environmental temperature can be eliminated. This can be accomplished by equalizing the thermal resistivity of the leg portions 302, 304 (which can be accomplished by appropriately adjusting the lengths and thicknesses of the leg portions 302, 304). The thermal resistivity of the leg portions 302, 304 is high compared to the thermal resistivity of other portions of the conversion device. Moreover, the heat capacity of the first suspended portion 303 (comprising the IR-absorbing film 306, the first displaceable member 307, and the half-mirror portion 308) and the heat capacity of the second suspended portion 305 (comprising the second displaceable member 309 and the total-reflection mirror 310) are equal. The thermal-change time constants of the first and second suspended portions 303, 305 are made equal by equalizing their thermal resistivities and heat capacities. However, it is not necessary that both the thermal resistivity and heat capacitor be set equal. It suffices to equalize the product of the thermal resistivity and heat capacity of the first displaceable member 307 with that of the second displaceable member 309.

As described above, the IR-absorbing film 306 is thermally coupled to the first displaceable member 307. The IR-absorbing film 306 is structured so as not to be displaced when the first displaceable member 307 is displaced. Hence, motion of the first displaceable member 307 is unaffected even if the thickness of the IR-absorbing film 306 is increased in order to improve the absorption rate.

In this example embodiment, the half-mirror portion 308 and the total-reflection mirror 310 may be interchanged. In such an instance, the readout light $j_0$ is incident from below the substrate 301. Also, in the foregoing description, the first suspended portion 303 is situated above the second suspended portion 305. Alternatively, the first suspended portion 303 can be situated below the second suspended portion 305, in which instance the other portions of the conversion device need not be rearranged so long as the readout light $j_0$ is incident from below the substrate 301. If the readout light $j_0$ is incident from above the substrate 301, it suffices to interchange the half-mirror portion 308 and the total-reflection mirror 310.

Figures 26A, 26B:
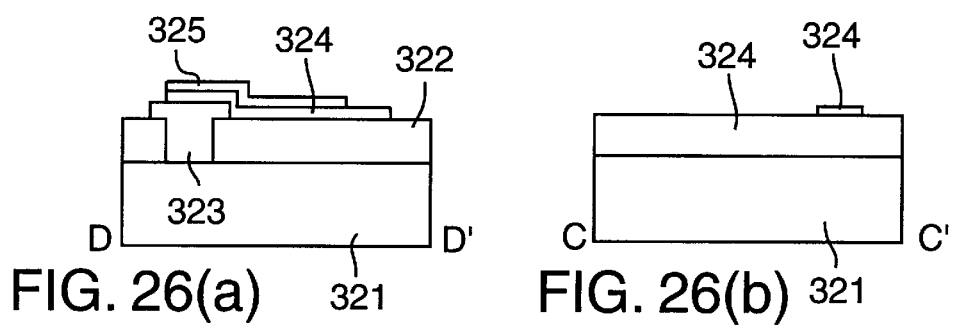
Figures 26C, 26D:
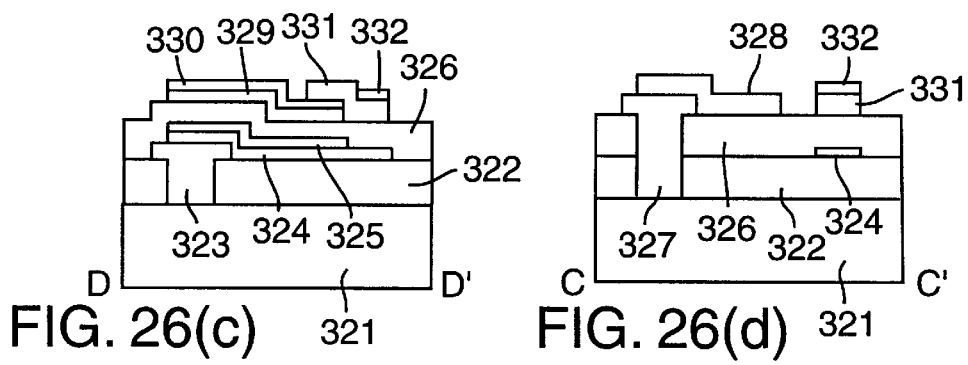
Figures 26E, 26F:
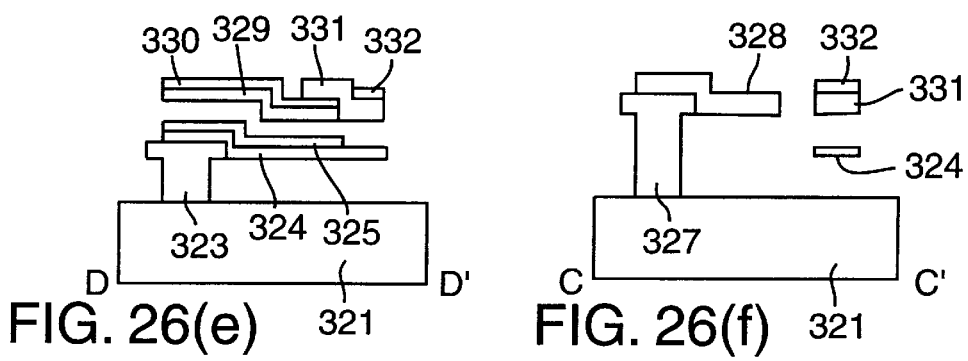

The conversion device of this example embodiment can be manufactured using a process in which certain individual steps utilize known techniques as used in other semiconductor manufacturing processes. A representative example of a manufacturing process is shown in FIGS. 26(a)–26(f)), depicting in schematic sectional views of a single pixel the results of certain steps of the process. More specifically, FIGS. 26(a) and 26(b) depict the same step, FIGS. 26(c) and 26(d) depict the same step, and FIGS. 26(e) and 26(f) depict the same step; FIGS. 26(a), 26(c) and 26(e) are sections along the line D-D' of FIG. 24(a), and FIGS. 26(b), 26(d), and 26(f) are sections along the line C-C' of FIG. 24(a).

In a first step, the results of which are shown in FIGS. 26(a)–26(b), a polyimide film 322 is formed on the entire surface of a silicon substrate 321 by, for example, a spin-coating technique. A portion of the polyimide film 322 is removed by photolithography and etching to form voids in the polyimide film 322 at the intended locations of the second leg portions 304. Then, a silicon oxide film 323 is applied to fill in the voids and cover the polyimide film 322; the silicon oxide film 323 is formed by a low-temperature technique, such as plasma CVD. The silicon oxide 323 is formed by photolithography and etching to have the required shape and dimensions of the second leg portions 304. A first metal layer 324 (destined to become part of the total-reflection mirror 310 and the film 309a of the second displaceable member 309) is formed by sputtering and patterned by photolithography and etching. A second metal layer 325 (destined to become the film 309b of the second displaceable member 309) similarly is sputtered and patterned by photolithography and etching.

In a second step, the results of which are shown in FIGS. 26(c) and 26(d), a polyimide film 326 is applied by, e.g., spin-coating to cover the exposed surfaces of layers formed in the previous step. Portions of the polyimide film 326 are removed to form voids at locations where the first leg portions 302 are to be formed. A silicon oxide film 327 (destined to become the first leg portions 302) then is formed (e.g., by plasma CVD) so as to fill in the voids; and cover the polyimide film 326. The silicon oxide film 327 is patterned into the intended shape and dimensions of the first leg portions 302 by photolithography and etching. Then, gold oxide 328 is applied by sputtering and then patterned according to the intended locations and dimensions of the IR-absorbing film 306. First and second metal films 329 and 330 are applied successively by sputtering and patterned by photolithography and etching to form the films 307a and 307b, respectively, of the first displaceable member 307. A silicon oxide film 331 is applied and patterned (by photolithography and etching) according to the intended locations and dimensions of the half-mirror portion 308 so as to form a mirror support for each pixel. The silicon oxide film 331 is preferably transparent to the readout (e.g., visible) light. A metal 332 (e.g., titanium, destined to become the half-mirror portion 308) then is sputtered as a very thin film onto the silicon oxide films 331 so as to have a desired reflectance. The thin metal film 332 is patterned according to the intended locations and dimensions of the half-mirror portions 308 by photolithography and etching.

Finally, in FIGS. 26(e)–26(f), the remaining polyimide films 322 and 326 are removed by, e.g., elution using an organic solvent or plasma etching. Thus, the process of manufacturing a conversion device as shown in FIGS. 24(a)–24(d) is completed.

The conversion device of this Example embodiment can be used with any of various image-rendering apparatus according to the invention, such as the apparatus shown in FIG. 19 and described above in Example Embodiment 13 (in which the conversion device of Example Embodiment 16 is the conversion device 300 denoted in FIG. 19).

In FIG. 19, the imaging lens 240 focuses the infrared light flux i on the IR-absorbing films 306 (FIG. 24(c)) of the pixels of the conversion device 300. A readout optical system directs readout light $j_0$ to the half-mirror portions 308 of the pixels of the conversion device 300, and forms an optical image based on coherent light returned from the half-mirror portions 308. The optical image formed by the readout optical system represents the collective displacements of the first and second displaceable members 307, 309, respectively, of the pixels.

The IR-absorbing films 306 are located on the imaging plane of the imaging lens 240. Infrared light focused by the imaging lens 240 on the IR-absorbing films 306 is converted by the IR-absorbing films 306 into thermal energy that causes the first displaceable members 307 to deflect. The amount of such deflection at each pixel is a function of the amount of infrared irradiation absorbed by the respective IR-absorbing film 306. The second displaceable member 309 does not exhibit deflection from the incident infrared light because no IR-absorbing film is provided on the second displaceable member 309.

A light flux emitted by the light source 241 is reflected by the beamsplitter 243 and strikes the conversion device 300 as readout light $j_0$. A first portion of the readout light $j_0$ is reflected by the half-mirror portions 308, and a second portion of the readout light $j_0$ passes through the half-mirror portions 308 and reflected by the total-reflecting mirror 310. These components of the readout light interfere with each other and exit the half-mirror portions 308 as a light flux having a coherency that depends or the path difference, i.e., relative displacement between the first and second displaceable members 307 and 309. The coherent light passes through the lens 245, the beamsplitter 243, and the lens 245, an(i forms an optical image viewable by an unaided eye 246. Thus, the infrared image formed collectively on the IR-absorbing films 306 is converted to a visible image.

Instead of observing the visible image directly by an unaided eye 246, a two-dimensional CCD can be provided at the location of the user's eye 246 to convert the optical image into corresponding electric signals that can be processed for forming, e.g., a video image. In such an instance, offset and fluctuation in the sensitivity can be electrically compensated for. It is not necessary that the number of pixels in the CCD equal the number of pixels of the conversion device 300; however, such equality is preferred.

The readout optical system is not limited to the structure shown in FIG. 19. Since interference of the readout light $j_0$ occurs inside the conversion device of FIGS. 24(a)–24(d), no external interference means is required. The readout optical system simply needs to produce a readout light flux and detect the coherency of the coherent light returned from the conversion device.

The readout light can be monochromatic or, e.g., white visible light. If white visible light is used, coherency of the returned light is observed as interference colors. If two monochromatic light fluxes having different wavelengths are used, a path difference with 360° (one period) phase shift (which cannot be recognized by monochromatic light) is detected, thereby providing a broader dynamic range of infrared detection.

During use, the conversion device of this example embodiment is accommodated preferably in a container such as the container 110 shown in FIG. 12 and described above in Example Embodiment 9 (wherein the conversion device of the instant example embodiment is denoted in FIG. 12 by the reference numeral 100). As described above, the interior space 110a inside the container 110 is evacuated to efficiently insulate the conversion device 100 from temperature changes in the external environment. Thus, temperature changes in the substrate 301 due to external factors can be prevented as much as possible, while making more pronounced the temperature increase each of the IR-absorbing films 306 due to absorption of incident infrared irradiation.

In order to prevent temperature changes in the substrate 301, a thermoelectric temperature stabilizer 111 (capable of absorbing or radiating heat), such as a Peltier device, can be attached directly to the container 110. However, strict temperature control is not required because the radiation-to-displacement converter 100 itself is designed so as not to be subjected significantly to the external temperature change.

The image-rendering apparatus of FIG. 19 is preferably mounted on or in an anti-vibration container that does not resonate at mechanical resonant frequencies of the first and second suspended portions 303, 305, respectively, of the conversion device.

Example Embodiment 17

Figure 27A:
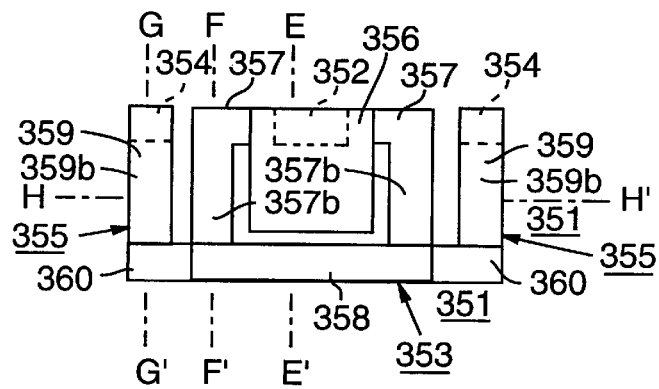
Figure 27B:
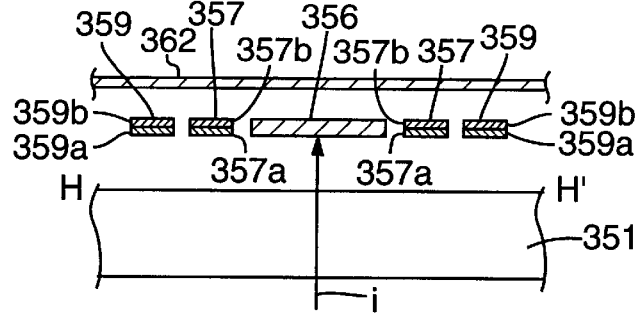
Figure 27C:
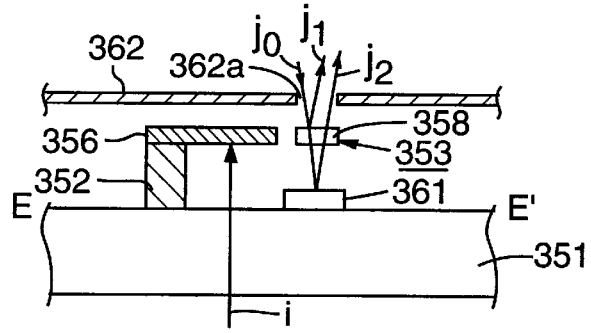
Figure 27D:
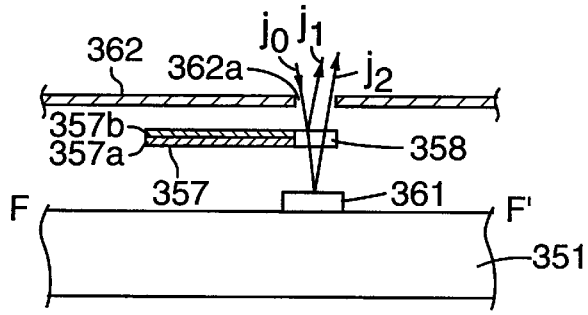
Figure 27E:
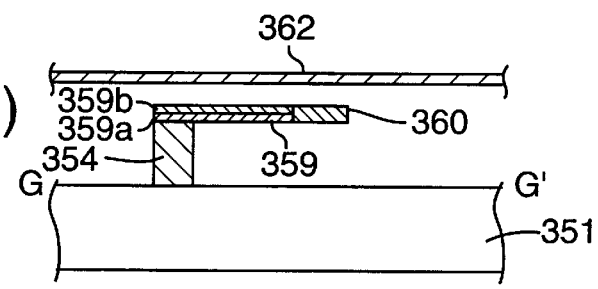

A conversion device according to this example embodiment is illustrated in FIGS. 27(a)–27(e). FIG. 27(a) is a plan view schematically depicting a pixel of the subject conversion device; FIG. 27(b) is a schematic sectional view of the FIG. 27(a) pixel along the line H-H'; FIG. 27(c) is a schematic sectional view of the FIG. 27(a) pixel along the line E-E'; FIG. 27(d) is a schematic sectional view of the FIG. 27(a) pixel along the line F-F'; and FIG. 27(e) is a schematic sectional view of the FIG. 27(a) pixel along the line G-G'.

The conversion device of this example embodiment can be used in any of various image-rendering apparatus according to the present invention (e.g., as disclosed in any of Example Embodiments 2, 3, 4, 5, 6, 7, 8, 13, and 15).

The conversion device of FIGS. 27(a)–27(e) comprises a substrate 351, a first suspended portion 353 supported by a first leg portion 352 so as to extend in a cantilever manner over a region of the substrate 351, and a second suspended portion 355 supported by a second leg portion 354 so as to extend in a cantilever manner over the region of the substrate 351. The first and second suspended portions 353, 355, respectively, are at approximately the same height above the region of the substrate 351.

The infrared light flux i (as an example of a heat-generating irradiation) is incident: from below the substrate 351, and the readout light $j_0$ is incident from above the substrate 351. With such a configuration, the substrate 351 is made of a material that is transmissive to infrared light. Alternatively, the infrared light flux i can be incident from above the substrate 351 and the readout light flux $j_0$ can be incident from below the substrate 351, in which instance the substrate 351 is made from a material that is transmissive to the readout light. Also with respect to the alternative configuration, a half-mirror portion 358 to be described below is replaced with a total-reflection mirror, and the total-reflection mirror 361 to be described below is replaced with a half-mirror.

In either configuration, the substrate can be provided with an aperture for each pixel for passing the infrared light flux or the readout light flux as required through the substrate. If apertures are provided, the substrate 351 can be made of a wide variety of materials without regard to its transmissivity.

The first suspended portion 353 is identical to the first suspended portion 303 (upper level) described in Example Embodiment 16. Thus, the first suspended portion 353 comprises an IR-absorbing film 356 that is directly affixed to the first leg portion 352, receives the infrared light flux, and converts the infrared light flux into heat.

A first displaceable member 357 comprises two segments (FIG. 27(a)), wherein one end of each segment is attached to an opposing side of the IR-absorbing film 356. The two segments extend parallel to each other with the IR-absorbing film 356 situated therebetween. A half-mirror portion 358, for reflecting a portion of the readout light flux $j_0$, is affixed to the distal end of each of the segments of the first displaceable member 357. Thus, the half-mirror portion 358 and the segments of the first displaceable member 357 surround three sides of the IR-absorbing film 356 and are configured as a cantilever relative to the first leg portion 352.

The IR-absorbing membrane 356 is coupled thermally with the first displaceable member 357. However, the IR-absorbing membrane 356 does not move even if the first displaceable member 357 moves.

A total-reflection mirror 361 functions as a reflector of the readout light flux transmitted through the half-mirror portion 358. The total-reelection mirror 361 is situated so as to face the half-mirror portion 358.

The first displaceable member 357 comprises two superposed films 357a, 357b made of substances each having a different coefficient of thermal expansion relative to the other, similar to the first displaceable member 307 described in Example Embodiment 16. The films 357a, 357b define a thermal bimorph structure.

The first and second leg portions 352, 354, the IR-absorbing film 356, and the films 57a, 357b can be made of the same materials as described above in Example Embodiment 16 for making the leg portions 302, 304, the IR-absorbing film 306, and the films 307a, 307b, respectively.

As shown in FIGS. 27(c) and 27(d), the readout light flux $j_0$ is incident on the half-mirror portion 358. A portion of the readout light flux $j_0$ is reflected from the half-mirror portion 358 to become the reflected light $j_1$. The remainder of the readout light flux $j_0$ passing through the half-mirror portion 358 is reflected from the total-reflection mirror 361 and is incident on the half-mirror portion 358 from below. A portion of the readout light re-entering the half-mirror portion 358 from below passes through the half-mirror portion 358 and becomes the transmitted light $j_2$. The difference in optical path length of the transmitted light $j_2$ relative to the reflected light $j_1$ is twice the distance (gap) between the half-mirror portion 358 and the total-reflection mirror 361. Thus, an interference arises between the transmitted light $j_2$ and the reflected light $j_1$. The interference exhibits a characteristic that is a function of the optical path-length difference. Thus, the transmitted light $j_2$ and the reflected light $j_1$ become an interference light flux exhibiting, e.g., an interference intensity that is a function of the optical path-length difference (and that is therefore a function of the displacement of the first displaceable member 357). This interference light flux is emitted from the half-mirror portion 358. Thus, it is preferred that the half-mirror portion 358 have a reflectance of approximately 38 percent.

In view of the above, the half-mirror portion 358 and the total-reflection mirror 361 comprise an interference means that is operable to receive the readout light flux $j_0$, transform the received readout light $j_0$ into an interference light flux having a measurable characteristic exhibiting a value corresponding to the displacement of the first displaceable member 357 relative to the substrate 351, and emit the interference light. The half-mirror portion 358 and the total-reflection mirror 361 receive the readout light flux $j_0$, change a value of a characteristic of the received readout light flux $j_0$ by an amount corresponding to the displacement of the first displaceable member 357, and emit the changed readout light.

The second suspended portion 355 comprises two segments flanking opposing sides of the first suspended portion 353. The second suspended portion 355 comprises a displacement suppressor 359, one side of which is affixed to the second leg portion 354. The displacement suppressor 359 is configured as a cantilever, and comprises two superposed films 359a, 359b, similar to the first displaceable member 357.

The films 359a, 359b are made of materials having different coefficients of thermal expansion (see, e.g., Table 1, above). Thus, the films 359a, 359b define a thermal bimorph structure. The direction (up or down relative to the substrate in FIGS. 27(a)–27(e)) in which the displacement suppressor 359 moves in response to gain or loss of heat is preferably opposite to the direction of displacement of the first displaceable member 357 under similar conditions. In other words, the materials for the films 357a, 357b, 359a, 359b are selected so that the dominance relation between the films 359a and 359b is opposite to the dominance relation between the films 357a and 357b. The distal end of the displacement suppressor 359 is attached to the half-mirror portion 358 via a connector 360 having large heat conductance. The distal end of the displacement suppressor 359 is coupled to the first displaceable member 357.

The displacement suppressor 359 suppresses displacement of the first displaceable member 357 by displacing itself with respect to the substrate 351 in a direction that is opposite to the displacement direction of the first displaceable member 357 induced by absorption or loss of heat received from the substrate 351 via the second leg portion 354.

Although not shown in the figures, the pixels (each comprising first and second suspended portions 353, 355, a half-mirror portion 358, a total-reflection mirror 361, and leg portions 352, 354) preferably are arranged two-dimensionally on the substrate 351.

The conversion device of this example embodiment can also include a mask 362 similar to the mask 311 of Example Embodiment 16. For each pixel, the mask 362 defines an aperture 362a in a region corresponding to the location of the half-mirror 358.

In the configuration shown in FIGS. 27(b) and 27(c), the infrared light flux i is incident from below the substrate 351. The infrared light i passes through the substrate 351, is absorbed by the IR-absorbing film 356, and is converted into heat. The heat generated in the IR-absorbing film 356 is transferred to the first displaceable member 357 which exhibits a corresponding distortion and tilting upward or downward relative to the substrate. Meanwhile, the readout light flux $j_0$ (e.g., visible light) is incident on the half-mirror portion 358 from above through the aperture 362a of the mask 362. The readout light $j_0$ passing through the half-mirror portion 358 becomes an interference light flux exhibiting an interference intensity corresponding to the amount of displacement of the first displaceable member 357. The interference light propagates upward the figure from the half-mirror portion 358. Thus, infrared light i striking the IR-absorbing film 356 is converted into an interference condition of the readout light, on which interference condition the infrared radiation is detected.

Because a conversion device according to this example embodiment exploits light interference to detect micro-displacements in each pixel caused by incident radiation, detection of the incident irradiation and images carried thereby is performed with a much higher sensitivity than conversion devices according to the prior art.

In each pixel, because the incident irradiation is converted by heat into a change in a characteristic of the readout light rather than a change in electrical resistance, there is no need to supply an electric current to the first suspended portion 353 and thus the first suspended portion 353 does not undergo self heating. Consequently, a conversion device according to this example embodiment exhibits an improved S/N ratio and image-detection accuracy. Also, no cooler is needed.

The first displaceable member 357 experiences displacement relative to the substrate due to heat generated in the IR-absorbing film from absorption of the incident irradiation i. In addition, the temperature of the substrate 351 can experience a change with a change in the temperature of the surrounding environment. A change in substrate temperature can be conducted to the first displaceable member 357 via the first leg portion 352 regardless of the thermal resistance of the first leg portion 352, thus causing a corresponding displacement of the first displaceable member 357. However, the displacement suppressor 359 suppresses such displacement of the first displaceable member 357 by displacing itself, due to heat conducted from the substrate, in a direction opposite to the direction of any displacement of the first displaceable member 357 induced by heating (relative to the substrate) caused by irradiation. With such an "offset," the net amount of displacement exhibited by the first displaceable member 357 is due substantially only to heating of the IR-absorbing film 356 generated by the incident irradiation i. This allows cost to be reduced because there is no need to strictly control the temperature of the conversion device.

If the amount of displacement of the first displaceable member 357 (induced by a temperature change of the substrate 351) and the amount of displacement of the displacement suppressor 359 (induced by a temperature change of the substrate 351) are substantially equal, then the influence of temperature of the surrounding environment can be eliminated nearly completely. This can be accomplished by manufacturing the first displaceable member 357 and the displacement suppressor 359 using the same materials and the same dimensions.

If the thermal-change time constants of the first displaceable member 357 and of the displacement suppressor 359 are essentially equal with respect to the temperature of the substrate 351, then any transitional temperature changes of the first displaceable member 357 caused by a temperature change in the surrounding environment can be also eliminated. This can be accomplished by equalizing the thermal resistances of the leg portions 352, 354 (e.g., by adjusting the lengths and thicknesses of the leg portions 352, 354). The thermal resistances of the leg portions 352, 354 are large compared to the thermal resistances of the other components of the conversion device. Moreover, the heat capacity of the first suspended portion 353 (comprising the IR-absorbing film 356, the first displaceable member 357, and the half-mirror portion 358) and the heat capacity of the second suspended portion 355 (comprising the displacement suppressor 359) are preferably equal. The thermal-change time constants of the first and second suspended portions 353, 355 can be made equal by equalizing their thermal resistances and heat capacities. It is not necessary that both the thermal resistance and the heat capacity be made equal. It is sufficient to equalize the product of the thermal resistance and heat capacity of the first suspended portion 353 with that of the second suspended portion 355.

Although the IR-absorbing film 356 is thermally coupled to the first displaceable member 357, the IR-absorbing film 356 normally is not displaced with displacement of the first displaceable member 357. Hence, motion of the first displaceable member 357 is unaffected even if the thickness of the IR-absorbing film 356 is increased in order to improve the absorption rate.

If the displacement range of the first displaceable member 357 is not limited, then the intensity of interference fluctuates wherever the optical path length difference reaches half the wavelength of the readout light. Thus, if the first displaceable member 357 is illuminated with an excessive intensity of irradiation light flux i, then an inversion phenomenon can arise that inverts the intensity of the interference. Hence, the range of displacement of the first displaceable member 357 is restricted preferably to within one-fourth of the wavelength of the readout light. For example, if the first displaceable member 357 is designed to bend downward in FIG. 27(b) and FIG. 27(c) whenever its temperature rises, and if the gap between the half-mirror portion 358 and the total-reflection mirror 361 is within one-fourth of the wavelength of the readout light, then motion of the first displaceable member 357 stops at a position where the half-mirror portion 358 contacts the total-reflection mirror 361 (even if an excessive amount of irradiation light flux i is incident. Since the interference intensity is maximized under such conditions, the inversion phenomenon does not arise.

The situation described in the previous paragraph applies principally to when the readout light is a monochromatic light. When the readout light is a white light, it is sufficient to restrict the range of displacement of the first displaceable member 357 so that any change in interference color due to displacement of the first displaceable member 357 is monotonic. In any event, means can be included to restrict the displacement range of the first displaceable member 357.

A representative process for manufacturing a conversion device according to this example embodiment is shown in FIGS. 28(a)–28(t) which depict schematic sectional views of certain steps of the process. FIGS. 28(a)–28(d) depict the same step, FIGS. 28(e)–28(h) depict the same step, FIGS. 28(i)–28(l) depict the same step, FIGS. 28(m)–28(p) depict the same step, and FIGS. 28(q)–28(t) depict the same step. FIGS. 28(a), 28(e), 28(i), 28(m), 28(r) correspond to FIG. 26(b), which is a section along the H-H' line of FIG. 26(a); FIGS. 28(b), 28(f), 28(j), 28(n), and 28(r) correspond to FIG. 26(c), which is a section along the E-E' line of FIG. 26(a); FIGS. 28(c), 28(g), 28(h), 28(o), and 28(s) correspond to FIG. 26(d), which is a section along the F-F' line of FIG. 26(a); and FIGS. 28(d), 28(h), 28(1), 28(p), and 28(t) correspond to FIG. 26(e), which is a section along the G-G' line of FIG. 26(a).

In the step shown in FIGS. 28(a)–28(d), a metal 372 having a high melting point, such as titanium, is sputtered onto a silicon substrate 372 (destined to become the substrate 351). The metal 372 is destined to become the total-reflecting mirror 361 in the pixels and thus is patterned to define the intended locations and shapes of the total-reflecting mirrors 361. A polyimide film 373 is applied (e.g., by spin coating) to the surface of the silicon substrate 371 and metal 372. Selected portions of the polyimide film 373 are removed by photolithography and etching to form voids in the polyimide film where the first and second leg portions 352, 354 are to be located. Then, a silicon oxide film 374 (destined to become the leg portions 352, 354) is applied to fill the voids and otherwise (cover the polyimide film 373 by, e.g., plasma CVD. The silicon oxide film 374 is patterned into the intended shapes of the leg portions 352 and 354 by photolithography and etching. Then, a gold oxide layer 375 (intended to become the IR-absorbing film 356) is applied by sputtering and is patterned by photolithography and etching to define the intended shapes and locations of the IR-absorbing films 356.

Turning now to FIGS. 28(e)–28(h), metal films 376 and 377 (destined to become the films 357a, 357b, respectively, of the first displaceable member 357) are applied successively by sputtering and patterned by photolithography and etching to define the intended shapes and locations of the films 357a, 357b, respectively, of the first displaceable member 357. Similarly, metal films 378 and 379 (destined to become the films 359a, 359b, respectively, of the second displaceable member 359) are applied successively by sputtering and patterned by photolithography and etching to define the intended shapes and locations of the films 359a, 359b, respectively, of the second displaceable member 359.

Referring to FIGS. 28(i)–28(l), a silicon oxide film 380 is formed on the exposed surface by plasma CVD. The silicon oxide film 380 is patterned by photolithography and etching to define the intended shapes and locations of the half-mirror portions 358. Actually, the silicon oxide film is destined to become a mirror support (not shown) for each pixel. Each silicon oxide mirror support will become a part of the respective half-mirror portion 358 when the half-mirror portions 358 are formed subsequently. The mirror supports are transparent to the readout light (e.g., to visible light). A thin metal film 381 (e.g, titanium, destined to become the half-mirror portions 358) is sputtered on the silicon oxide film 380 to achieve a desired reflectance. The thin metal film 381 is patterned by photolithography and etching to define the intended locations and dimensions of the half-mirror portions 58.

In FIGS. 28(m)–28(p), another silicon oxide film 382 (destined to become the connectors 360) is formed on the exposed surface by plasma CVD. The silicon oxide film 382 is patterned by photolithography and etching to define the intended locations and dimensions of the connectors 360.

Finally, in FIGS. 28(q)–28(t), the remaining polyimide film 373 is removed by, e.g., Elution using an organic solvent or by plasma etching, thus completing manufacture of the conversion device of this example embodiment.

The conversion device of this example embodiment can be used in any of various image-rendering apparatus according to the invention, such as the apparatus of Example Embodiment 13.

Example Embodiment 18

FIGS. 29(a)–29(d) depict various features of a conversion device according to this example embodiment. This example embodiment comprises an IR-absorbing film and a first displaceable member that are layered.

Figure 29A:
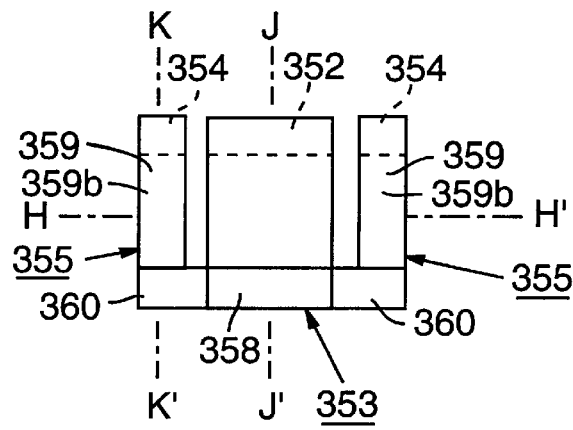
Figure 29B:
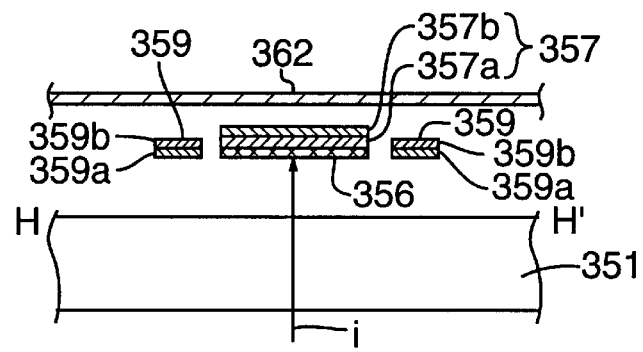
Figure 29C:
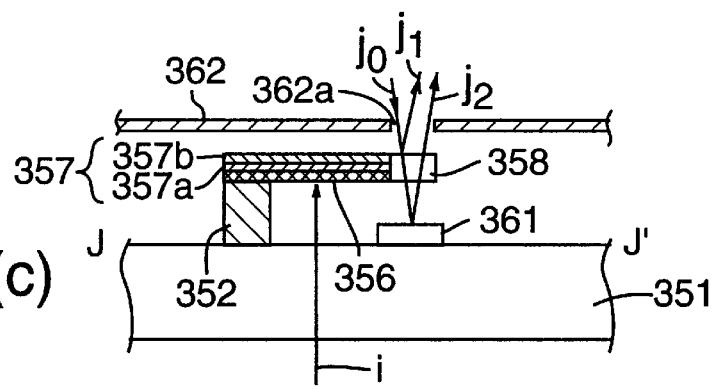
Figure 29D:
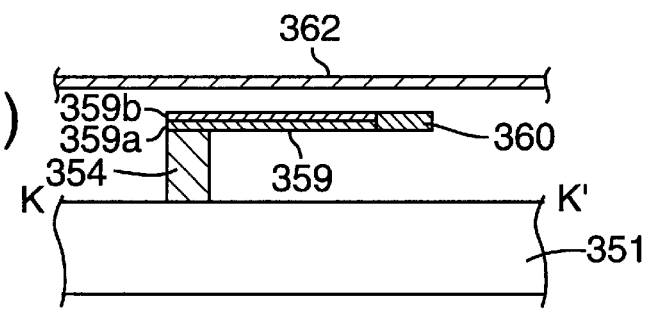

FIG. 29(a) is a plan view of a pixel of the conversion device; FIG. 29(b) is a sectional view along the H-H' line of FIG. 29(a); FIG. 29(c) is a sectional view along the J-J' line in FIG. 29(a); and FIG. 29(d) is a sectional view along the K-K' line in FIG. 29(a). Components that are the same as shown in FIGS. 27(a)–27(e) have the same reference numerals and are not further described below.

As mentioned above, each of the IR-absorbing film 356 and the first displaceable member 357 is preferably layered in this embodiment. Alternatively, the IR-absorbing film 356 and the lower layer 357a of the first displaceable member 357 can be formed as a single layer.

The conversion device of this example embodiment can achieve the same effects as the conversion device of, e.g., Example Embodiment 17. Also, the conversion device of this example embodiment can be used in the image-rendering apparatus of, by way of example, Example Embodiment 13.

Figure 30A:
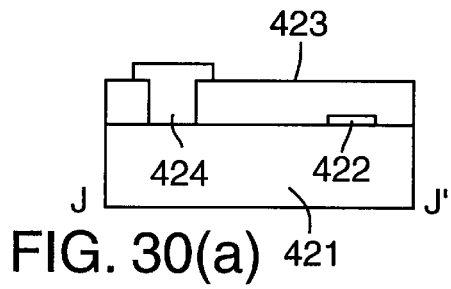
Figure 30B:
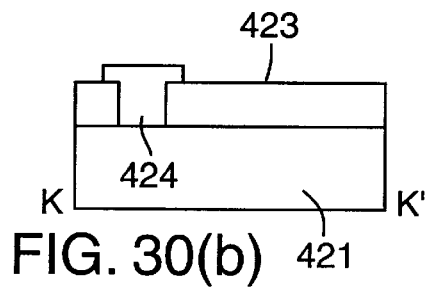
Figure 30C:
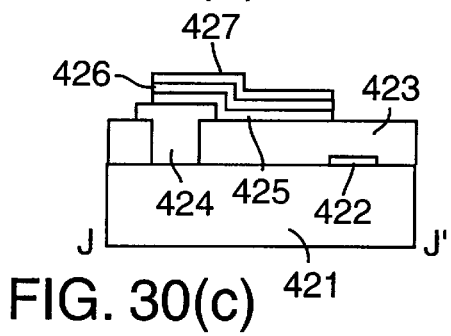
Figure 30D:
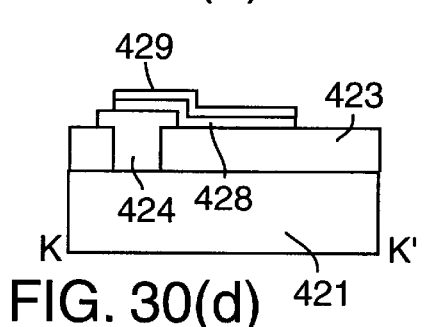
Figure 30E:
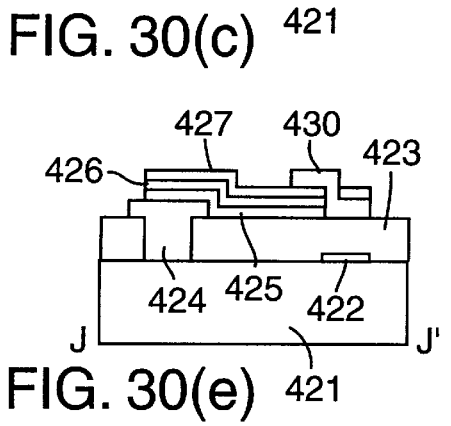
Figure 30F:
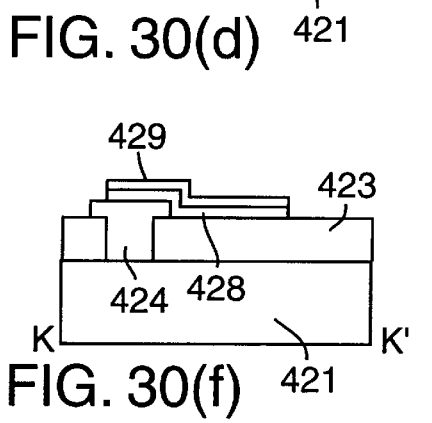
Figure 30G:
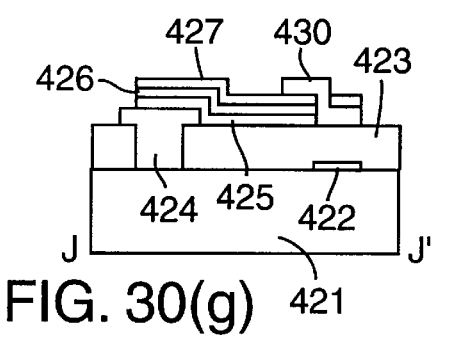
Figure 30H:
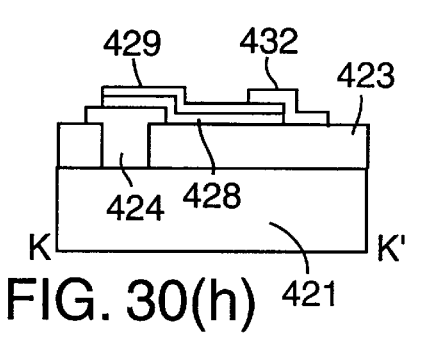
Figure 30I:
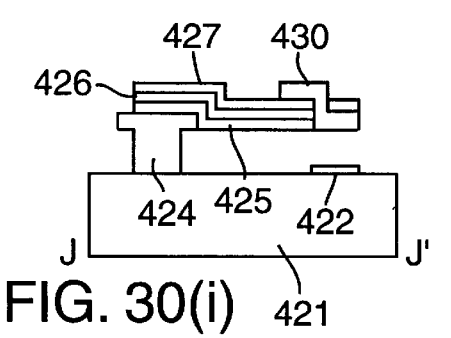
Figure 30J:
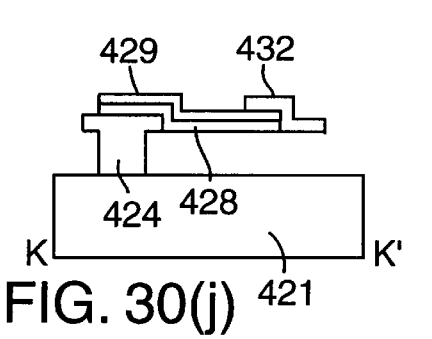

FIGS. 30(a)–30(j) depict certain steps (in sectional views) of a process for manufacturing a conversion device according to this example embodiment. Specifically, FIGS. 30(a) and 30(b) depict the same step; FIGS. 30(c) and 30(d) depict the same step; FIGS. 30(e) and 30(f) depict the same step; FIGS. 30(g) and 30(h) depict the same step; and FIGS. 30(i) and 30(j) depict the same step. FIGS. 30(a), 30(c), 30(e), 30(g), and 30(i) correspond to FIG. 29(c), which are sectional views along the J-J' line of FIG. 29(a); and FIGS. 30(b), 30(d), 30(f), 30(h), and 30(j) correspond to FIG. 29(d), which are sectional views along the K-K' line of FIG. 29(a).

Turning first to FIGS. 30(a) and 30(b), a metal 422 having a high melting point (e.g., titanium, destined to become the total-reflecting mirror 361) is sputtered as a layer onto a silicon substrate 421 (destined to become the substrate 351). The metal layer 422 is patterned to produce the intended shapes and locations of the total-reflecting mirrors 361 at the intended locations. A polyimide film 423 is formed on the exposed surfaces of the silicon substrate 421 and the metal film 422 by, e.g., spin-coating. Portions of the polyimide film 423 are removed by photolithography and etching to form voids having the intended dimensions and located at the intended locations of first and second leg portions 352, 354, respectively. Then, a silicon oxide film 424 (destined to become the leg portions 352, 354) is formed (by a low-temperature technique such as plasma CVD) that fills the voids and covers the exposed surface of the polyimide film 423. The silicon oxide film 424 is patterned by photolithography and etching to define the intended shapes and locations of the leg portions 352 and 354.

In FIGS. 30(c) and 30(d), gold oxide 425 and metal films 426 and 427 are applied successively by sputtering onto the exposed surface. The gold oxide 425 is destined to become part of the IR-absorbing film 356, while the metal films 426 and 427 are destined to become the layers 357a and 357b of the first displaceable member 357. The gold oxide layer 425 and the metal layers 426 and 427 are patterned by photolithography and etching to define the intended locations and dimensions of the first displaceable member 357. Then, metal films 428 and 429 are applied successively by stuttering and patterned by photolithography and etching into the lower and upper layers 359a, 359b, respectively, of the second displaceable member 359.

Turning now to FIGS. 30(e) and 30(f), a silicon oxide film 430 (destined to become a mirror support for the half-mirror portion 358) is formed on the exposed surface by plasma CVD. The silicon oxide film 430 is patterned by photolithography and etching to define the intended locations and dimensions of the half-mirror portions 358. A very thin metal film 431 (e.g., titanium, destined to become the half-mirror portions 358) is sputtered on the silicon oxide film 430 to achieve a desired reflectance. The thin metal film 431 then is patterned to define the intended locations and dimensions of the half-mirror portions 358.

Referring to FIGS. 30(g) and 3()(h), another silicon oxide film 432 (destined to become the connectors 369) is formed by plasma CVD on the exposed surface. The silicon oxide film 432 is patterned by photolithography and etching to define the intended locations and dimensions of the connectors 360.

Finally, referring to FIGS. 30(i) and 30(j), the remaining polyimide film 423 is removed by, e.g., elution using an organic solvent or plasma etching to complete fabrication of the conversion device.

Example Embodiment 19

Figure 31A:
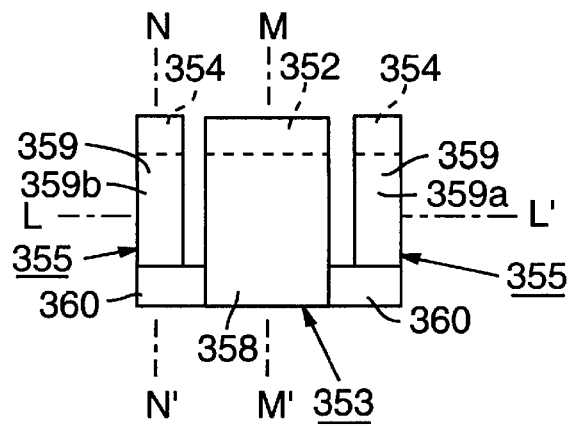
Figure 31B:
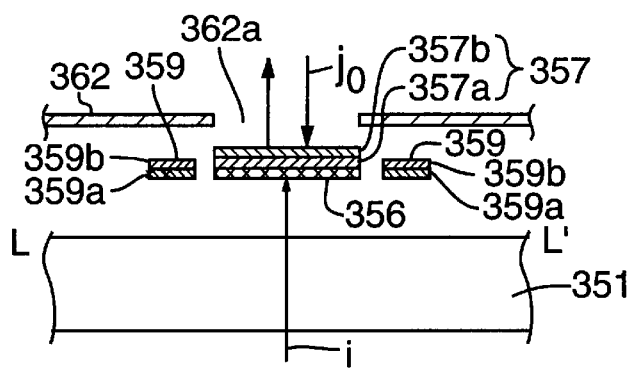
Figure 31C:
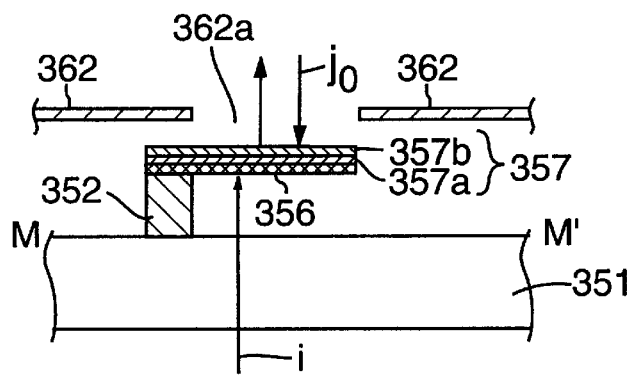
Figure 31D:
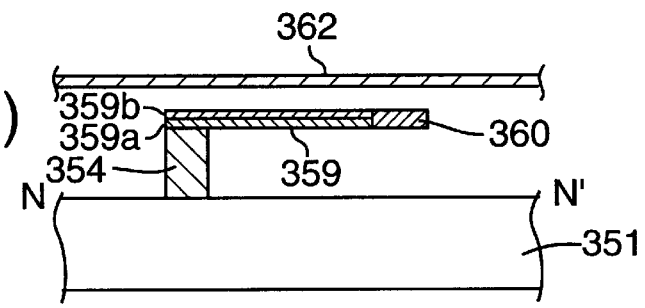

A conversion device according to this example embodiment is shown in FIGS. 31(a)–31(d). FIG. 31(a) depicts a plan view of a single pixel; FIG. 31(b) is a sectional view along the L-L' line in FIG. 31(a); FIG. 31(c) is a sectional view along the M-M' line in FIG. 31(a); and FIG. 31(d) is a sectional view along the N-N' line in FIG. 31(a). In FIGS. 31(a)–31(d), components that are the same as in Example Embodiment 18 have the same reference designators and are not described further below.

In contrast to the conversion device of Example Embodiment 18, in the conversion device of this example embodiment, the half mirror 358 and the total-reflecting mirror 361 are omitted, and the upper layer 357b of the first displaceable member 357 serves as a reflector for the readout light $j_O$. In addition, the lower layer 357a and the IR-absorbing film 356 can be formed as a single layer.

Thus, the upper layer 357a of the first displaceable member 357 receives the readout light $j_O$, provides a phase contrast to the readout Light according to the displacement of the first displaceable member 357 (comprising the lower and upper layers 357a and 357b, respectively), and outputs a reflected readout light flux having a characteristic that is representative of the displacement. In particular, the direction of reflection and the position of the reflected readout light $j_O$ change according to the amount of displacement of the first displaceable member 357.

Incident radiation (e.g., infrared light) i strikes the underside of the substrate 351 and passes through the substrate 351 as shown in FIGS. 31(b)–31(d). The infrared light flux i is absorbed by the IR-absorbing film 356 and converted into thermal energy. The thermal energy causes the first displaceable member 357 to become deflected (i.e., bend upward or downward). Thus, the amount of incident infrared radiation at each pixel of the conversion device is converted into a corresponding deflection of the first displaceable member 357.

Meanwhile, readout light (e.g., visible light) is directed to the upper layer 357b of the first displaceable member 357 from above, as shown in FIGS. 31(b)–31(d). The upper layer 357b reflects the readout light. The direction and position of the reflected readout light vary according to the amount of deflection of the first displaceable member 357. Thus, the incident infrared light flux is detected as a change in a characteristic of the reflected readout light.

Other structures of the conversion device of this example embodiment are similar to corresponding structures in the conversion device of Example Embodiment 18.

Figure 32A:
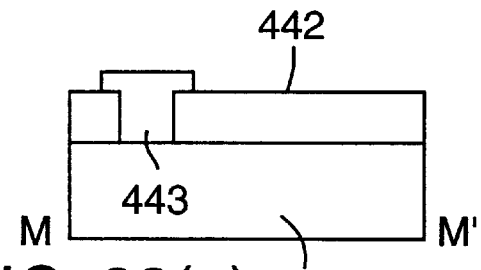
Figure 32B:
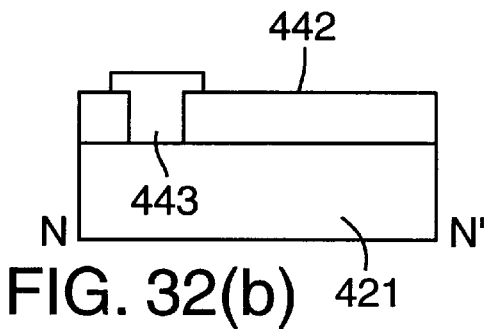
Figure 32C:
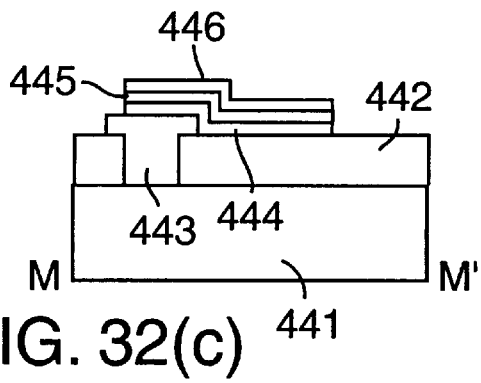
Figure 32D:
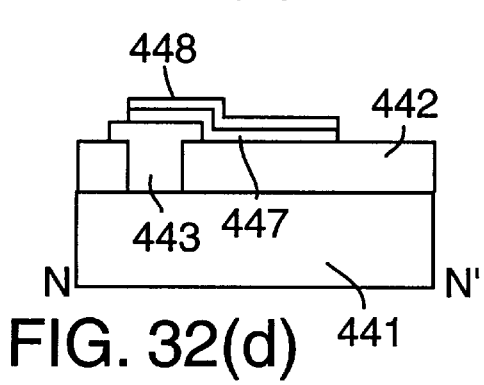
Figure 32E:
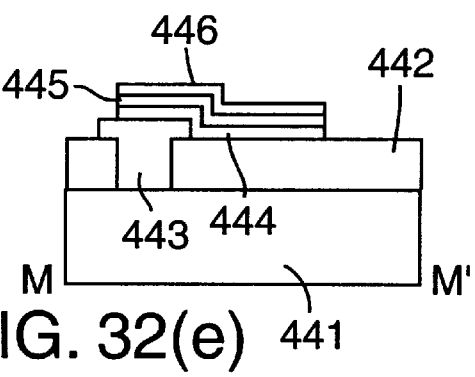
Figure 32F:
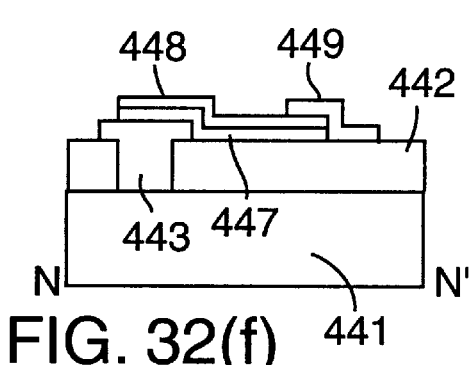
Figure 32G:
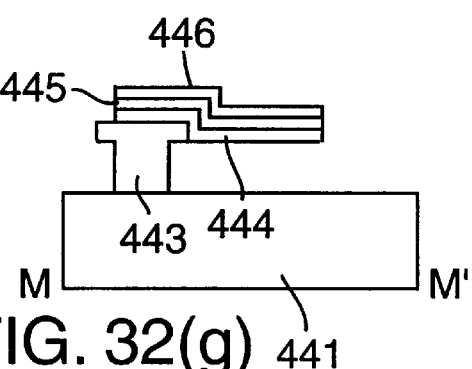
Figure 32H:
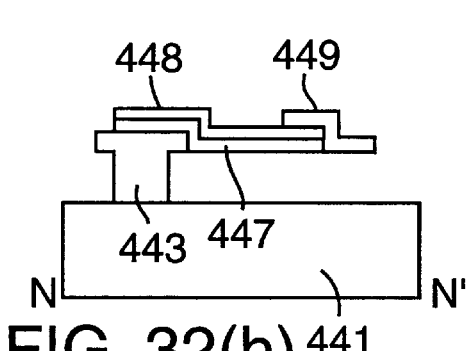

A representative process for manufacturing the conversion device of this example embodiment is shown in FIGS. 32(a)–32(h). The steps are shown as sections, wherein FIGS. 32(a) and 32(b) depict the same step, FIGS. 32(c) and 32(d) depict the same step, FIGS. 32(e) and 32(f) depict the same step, and FIGS. 32(g) and 32(h) depict the same step. FIGS. 32(a), 32(c), 32(e), and 32(g) correspond to FIG. 31(c), which are sections along the M-M' line of FIG. 31(a); and FIGS. 32(b), 32(d), 32(f), and 32(h) correspond to FIG. 31(d), which are sections along the N-N' line of FIG. 31(a).

In a first step, as shown in FIGS. 32(a) and 32(b), a polyimide film 442 is formed, by spin-coating or the like, on the surface of a silicon substrate 441 (destined to become the substrate 351). Portions of the polyimide film 442 are removed by photolithography and etching to form voids in the polyimide film to define the intended dimensions and locations of the leg portions 352 and 354. A silicon oxide film 443 (destined to become the first and second leg portions 352, 354, respectively) is formed (by a low-temperature process such as plasma CVD) to fill the voids and cover the exposed surface of the polyimide film 443. The silicon oxide film 443 is patterned by photolithography and etching to define the intended locations and dimensions of the leg portions 352, 354.

Turning next to FIGS. 32(c) and 32(d), separate layers of gold oxide 444 and metals 445 and 446 are sputtered successively onto the exposed surface. The gold oxide layer 444 is destined to become the IR-absorbing film 356, and the metal layers 445 and 446 are destined to become the layers 357a and 357b, respectively, of the first displaceable member 357. The gold oxide layer 444 and the metal layers 445 and 446 are patterned by photolithography and etching to define the intended locations and dimensions of the first displaceable member 357. Then, metal layers 447 and 448 are applied successively to the exposed surfaces by sputtering. The metal layers 447, 448 are patterned by photolithography and etching to define the intended locations and dimensions of the lower layer 359a and upper layer 359b, respectively, of the second displaceable member 359.

Referring to FIGS. 32(e) and 32(f), a silicon oxide film 449 is formed on the exposed surface by plasma CVD. The silicon oxide film 449 is patterned by photolithography and etching to define the intended locations and dimensions of the connectors 360.

Finally, referring to FIGS. 32(g) and 32(h), the remaining polyimide film 442 is removed by, for example, elution using an organic solvent or by plasma etching, thereby completing fabrication of the conversion device of this example embodiment.

The conversion device of this example embodiment can be used with any of various image-rendering apparatus according to the invention, e.g., as disclosed in Example Embodiment 2 (FIG. 5), wherein the conversion device of this example embodiment is used as the conversion device denoted with the numeral 100 in FIG. 5. The infrared irradiation i is incident on the underside of the substrate 351, as converged by the imaging lens 20. The readout optical system directs a readout light flux $j_O$ toward the upper layer 357b of the first displaceable member 357 of the each pixel of the conversion device. The readout optical system also forms an optical image from the collective displacements of the first displaceable members 357 which reflect the readout light from the respective upper layers 357b. Images formed by the reflected readout light are detected by the CCDs 21, 22, 23.

The readout optical system of FIG. 5 is as described above in Example Embodiment 2.

The imaging lens 20 focuses the infrared irradiation i on the IR-absorbing films 356 of the pixels. The IR-absorbing films generate heat according to the quantity of the incident infrared light that is absorbed by the respective pixel. The heat causes the respective first displaceable members 357 to deflect.

Readout light directed to the conversion device 100 is reflected by the upper layer 357b of the first displaceable member 357 in each pixel back to the beamsplitter 30. This readout light and the reference light reflected from the total-reflecting mirror 31 are recombined by the beamsplitter 230. These two light components interfere with each other and produce a coherent light flux having an intensity that is defined by the phase difference between the two light components. The spectral distribution of the coherent light shifts from the spectral distribution of the readout light source 24 according to the displacement of the upper layer 357b of the conversion device 100.

The coherent light passes through the lens 25 and the beamsplitter 29, and is color-separated by the dichroic mirrors 32 and 33. The resulting color components are converted to electric signals by the respective CCDs 21–23.

Although the CCDs 21–23 are used to pick up the optical image formed by the readout light as electric signals, the optical image alternatively can be observed directly by a person's eyes. In such an instance, the dichroic mirrors 32–33, the lenses 27–28, and the CCDs 21–23 are not used.

The readout light source 24 car be a monochromatic light source, such as a laser, rather than a source of white light. In such an instance, the coherent image has an intensity distribution at the wavelength of the monochromatic beam according to the displacement of the reflective layer 357b of the first displaceable member 357, and a monochromatic (e.g., "black and white") CCD can be used instead of the three CCDs 21–23. Also, the dichroic mirrors 32–33 and the lenses 27–28 are omitted. Thus, a monochromatic visible image is formed at the position of the CCD 21, which can be observed with the unaided eye.

Alternatively, a readout light source can be used that emits two monochromatic light fluxes having different wavelengths. In such an instance, a phase shift of $2\pi$ (one period) or greater, which cannot be recognized when only a single monochromatic light is used, can be detected. Thus, an optical image representing incident infrared light can be detected over a broader dynamic range.

A commercially available interference objective lens may be used in place of the lens 25 and the total-reflecting mirror 31.

The readout optical system used in this image-rendering apparatus is not limited to the structure shown in FIG. 5. For example, optical systems as used in confocal microscopes, polarizing microscopes, differential interference microscopes, or phase-contrast microscopes can be used.

The conversion device shown in FIGS. 31(a)–31(d) can be modified so that a total-reflecting mirror is substituted for the half-mirror portion 358, thereby allowing the total-reflecting mirror 361 to be removed.

If the conversion device of this example embodiment is to be used simply for detecting the intensity of the incident infrared light, without forming an infrared image, the conversion device can comprise a single pixel, and the readout optical system need have only the elements that are associated with as single pixel.

Whereas the invention has been described in connection with multiple embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. An optically readable radiation-displacement-conversion device, comprising:
   (a) a substrate made of an infrared-transmitting material;
   (b) a suspended portion attached to the substrate so as to extend over a region of the substrate, the suspended portion comprising (i) a radiation-absorbing region situated so as to receive an incident infrared radiation passing through the substrate, the radiation-absorbing region comprising an infrared-radiation-absorbing material that absorbs the incident infrared radiation and converts absorbed radiation into heat, and (ii) a displaceable member that exhibits a displacement relative to the substrate whenever the infrared-radiation-absorbing material absorbs an amount of the incident infrared radiation, the displacement having a magnitude that is a function of the amount of heating experienced by the radiation-absorbing region;
   (c) a leg portion supporting the suspended portion relative to the substrate, the leg portion being made of a single insulating material; and
   (d) an optically effecting portion that receives a readout light flux and that imparts a change to a characteristic of the readout light flux in accordance with the magnitude of the displacement of the displaceable member.

2. The conversion device of claim 1, wherein the suspended portion is electrically insulated from the substrate.

3. The conversion device of claim 1, wherein the displaceable member is a cantilever relative to the substrate.

4. The conversion device of claim 1, wherein the displaceable member is a diaphragm.

5. The conversion device of claim 1, wherein the displaceable member comprises at least two superposed layers formed of different materials having different coefficients of thermal expansion.

6. The conversion device of claim 1, wherein at least a portion of the displaceable member comprises the radiation-absorbing region.

7. The conversion device of claim 1, further comprising a mask for blocking portions of the readout light flux other than a portion to which the optically effecting portion imparts the change to the characteristic.

8. The conversion device of claim 1, further comprising a reflector for reflecting the incident infrared radiation, the reflector being separated from the radiation-absorbing region by a gap of $n\lambda_o/4$, wherein n is an odd number and $\lambda_o$ is a center wavelength of the incident infrared radiation.

9. The conversion device of claim 1, wherein the optically effecting portion comprises a reflector for reflecting the received readout light flux, the reflector forming a portion of the suspended portion and exhibiting a displacement along with any displacement of the displaceable member.

10. The conversion device of claim 9, wherein the reflector forms a portion of the displaceable member.

11. The conversion device of claim 9, comprising multiple pixels each comprising a suspended portion and an optically effecting portion.

12. An image-rendering apparatus, comprising:
   (a) the conversion device of claim 11, and
   (b) a readout optical system, comprising (i) means for receiving the readout light flux and for irradiating the reflector of each of the pixels with the readout light flux; and (ii) a lens for receiving readout light reflected from the reflectors and for forming an optical image from the reflected readout light, the reflected readout light reflected from each reflector having an intensity that varies with the inclination of the respective reflector.

13. An image-rendering apparatus, comprising:
   (a) the conversion device of claim 11;
   (b) a readout optical system, comprising (i) means for irradiating the reflector of each of the pixels with the readout light, (ii) means for directing the readout light reflected from the reflector of each of the pixels to a predetermined plane, and (iii) means for forming an optical image from the aggregate reflected readout light from the pixels at a location at which the readout light reflected from each pixel reaches the predetermined plane while exhibiting a characteristic that varies in accordance with the inclination of the respective reflector.

14. The image-rendering apparatus of claim 13, further comprising image-pickup means for picking up the optical image.

15. The conversion device of claim 1, wherein the optically effecting portion comprises interference means for receiving the readout light flux and for changing the readout light flux to an interference light flux exhibiting an interference state that varies in accordance with the displacement of the displaceable member.

16. The conversion device of claim 15, wherein said interference means comprises:
   a half-mirror portion comprising a portion of the suspended portion and that exhibits a displacement in accordance with the displacement of the displaceable member, the half-mirror portion reflecting a portion of the received readout light flux; and a reflector fixed with respect to the substrate and situated so as to be opposed to the half-mirror portion.

17. The conversion device of claim 15, wherein the displaceable member has a limited range of displacement, the range being such that a change in the interference state caused by displacement of the displaceable member is monotonic.

18. The conversion device of claim 15, comprising multiple pixels each comprising a suspended portion and an optically effecting portion.

19. An image-rendering apparatus, comprising:

(a) the conversion device of claim 18; and (b) a readout optical system, comprising (i) means for irradiating the optically effecting portion of each of the pixels with the readout light flux; (ii) means for receiving readout light flux having the changed characteristic from the pixels; and (iii) means for forming an optical image, from the received readout light flux having the changed characteristic, in accordance with the collective displacements of the displaceable members of the pixels.

20. The image-rendering apparatus of claim 19, further comprising means for picking up the optical image.

21. The image-rendering apparatus of claim 20, wherein:

said image-pickup means comprises multiple pixels in one-to-one correspondence with the optically effecting portions of the pixels of the conversion device; and the readout optical system forms the optical image such that each of the pixels of said image-pickup means receives only the changed readout light flux exiting from the corresponding optically effecting portion of the pixels.

22. The conversion device of claim 1, comprising multiple pixels each comprising a suspended portion and an optically effecting portion.

23. An image-rendering apparatus, comprising:

(a) the conversion device of claim 22; and (b) a readout optical system, comprising (i) means for irradiating the optically effecting portion of each of the pixels with the readout light flux; (ii) means for receiving readout light flux having the changed characteristic from the pixels; and (iii) means for forming an optical image, from the received readout light flux having the changed characteristic, in accordance with the collective displacements of the displaceable members of the pixels.

24. The image-rendering apparatus of claim 23, further comprising means for picking up the optical image.

25. A radiation-detection apparatus, comprising:

(a) the conversion device of claim 1; and (b) a displacement detector that irradiates the optically effecting portion with the readout light flux and detects the displacement of the displaceable member based on the respective changed characteristic of the readout light flux.

26. An optically readable radiation-displacement-conversion device, comprising:

(a) a substrate;

(b) a suspended portion attached to the substrate so as to extend over a region of the substrate, the suspended portion comprising (i) a radiation-absorbing region situated so as to receive an incident radiation and comprising a radiation-absorbing material that absorbs the incident radiation and converts absorbed radiation into heat, and (ii) a displaceable member that exhibits a displacement relative to the substrate whenever the radiation-absorbing material absorbs an amount of the incident radiation, the displacement having a magnitude that is a function of the amount of heating experienced by the radiation-absorbing region, wherein the radiation-absorbing region is fixed relative to the substrate independently of any displacement of the displaceable member, wherein the displaceable member and the radiation-absorbing region are thermally connected to each other; and (c) an optically effecting portion that receives a readout light flux and that imparts a change to a characteristic of the readout light flux in accordance with the magnitude of the displacement of the displaceable member.

27. An optically readable radiation-displacement-conversion device, comprising:

(a) a substrate;

(b) a suspended portion attached to the substrate so as to extend over a region of the substrate, the suspended portion comprising (i) a radiation-absorbing region situated so as to receive an incident radiation and comprising a radiation-absorbing material that absorbs the incident radiation and converts absorbed radiation into heat, and (ii) a displaceable member that exhibits a displacement relative to the substrate whenever the radiation-absorbing material absorbs an amount of the incident radiation, the displacement having a magnitude that is a function of the amount of heating experienced by the radiation-absorbing region;

(c) an optically effecting portion that receives a readout light flux and that imparts a change to a characteristic of the readout light flux in accordance with the magnitude of the displacement of the displaceable member; and (d) an antireflection film for preventing reflection of portions of the readout light flux other than a portion to which the optically effecting portion imparts the change to the characteristic.

28. A method for detecting an incident infrared radiation, comprising the steps:

(a) providing a substrate that is transmissive to infrared radiation;

(b) providing a member comprising a first material that is absorptive for the incident infrared radiation and that converts absorbed infrared radiation to heat sufficient to cause the member to exhibit a displacement, wherein the member is thermally insulated from the substrate by a leg portion;

(c) directing the infrared radiation to pass through the substrate and be incident on the first material so as to cause the first material to convert the incident infrared radiation to heat and thus cause the member to exhibit a corresponding displacement; and (d) directing a readout light flux to the member such that the readout light flux exhibits a change in a characteristic in accordance with the displacement, so as to detect the displacement.

29. An image-rendering method, comprising the steps:

(a) providing on a substrate, transmissive to infrared radiation, multiple separate members each comprising a first material that is absorptive for an incident infrared radiation and that converts absorbed infrared radiation to heat sufficient to cause the respective member to exhibit a displacement relative to the substrate, each member being thermally insulated from the substrate by a respective leg portion;

(b) directing the infrared radiation to pass through the substrate and be incident on the members so as to cause, in each member, the first material to convert the infrared radiation incident on the respective member to heat and thus cause the respective member to exhibit a corresponding displacement relative to the substrate; and (c) directing a readout light flux to the members such that, at each member, the readout light flux exhibits a change in a characteristic in accordance with the displacement of the respective member, so as to form an optical image from the collective displacements of the members.

30. The method of claim 29, further comprising the step of picking up the optical image using an image-pickup device.

31. A method for fabricating an optically readable radiation-displacement-conversion device having at least one pixel, the method comprising the steps:

(a) for each pixel, forming a sacrificial layer on a substrate and forming on the substrate a leg portion for supporting a displaceable member such that the sacrificial layer is disposed at least around the leg portion and an upper part of the leg portion is left exposed;

(b) for each pixel, forming on the leg portion and extending onto the sacrificial layer to define a desired profile of the displaceable member, a first film and a second film superposed on the first film, the first and second films having different coefficients of thermal expansion relative to each other; and (c) removing the sacrificial layer.

32. The method of claim 31, further comprising the step, before or after step (b), of forming, for each pixel, an infrared-absorbing film that underlaps or overlaps, respectively, the first and second films.

33. The method of claim 31, further comprising the step, before or after step (b), of forming, for each pixel, a readout-light-reflecting film that underlaps or overlaps, respectively, the first and second films.

34. The method of claim 31, further comprising the step of forming a film, antireflective for the incident radiation, on a surface of the substrate facing a predetermined direction of incidence of the radiation.

35. The method of claim 31, further comprising the steps of forming, for each pixel:

a readout-light total-reflection mirror patterned into a desired shape between the substrate and the sacrificial layer; and a readout-light half-mirror portion on the sacrificial layer and connected to the first and second films, opposite the readout-light total-reflection mirror.

36. The method of claim 31, wherein multiple conversion devices are formed on a single substrate, the method further comprising the step, before step (c), of dividing the substrate into individual chips each comprising a conversion device.

37. An image-rendering apparatus, comprising:

(a) an optically readable radiation-displacement-conversion device comprising multiple pixels, each of the pixels comprising (i) a radiation-absorbing material for receiving and absorbing an incident invisible radiation and for generating an amount of heat in the radiation-absorbing material that is a function of the amount of absorbed radiation, (ii) a displaceable member exhibiting a displacement responsive to the heat generated in the radiation-absorbing material, the displacement being of a magnitude that is a function of the amount of generated heat; and (iii) an optically effecting portion that receives a readout light flux, imparts a change in a characteristic of the received readout light flux, the change being of a magnitude corresponding to the magnitude of the displacement, and emits the changed readout light;

(b) a readout optical system comprising (i) a first lens for receiving and directing a readout light flux to illuminate the pixels with the readout light, and (ii) a second lens for receiving the changed readout light from the pixels and for forming an optical image corresponding to the collective displacements of the optically effecting portions of the pixels;

(c) a sealable container for housing the optically readable radiation-displacement-conversion device in an environment suitably isolated from the external environment, the container comprising a window for transmitting the radiation;

(d) a temperature stabilizer for maintaining the optically readable radiation-displacement-conversion device at a desired temperature;

(e) a temperature sensor for detecting the temperature of the optically readable radiation-displacement-conversion device; and (f) a temperature controller connected to the temperature sensor and the temperature stabilizer for controlling the temperature stabilizer to maintain constancy of the temperature of the optically readable radiation-displacement-conversion device based on a temperature-detection signal from the temperature sensor.

38. The image-rendering apparatus of claim 37, wherein the space inside the container comprises a subatmospheric pressure.

39. The image-rendering apparatus of claim 38, wherein the container encloses a gas scavenger.

40. The image-rendering apparatus of claim 37, wherein the temperature stabilizer is situated inside the container.

41. The image-rendering apparatus of claim 37, further comprising a thermal shield for reducing transfer of unwanted thermal energy to the optically readable radiation-displacement-conversion device, the thermal shield being thermally coupled to the temperature stabilizer and situated inside the container.

42. An optically readable radiation-displacement-conversion device, comprising:

(a) a substrate;

(b) a first suspended portion mounted via a first leg portion to the substrate such that the first suspended portion extends over a region of the substrate, the first suspended portion comprising a radiation absorber that absorbs an invisible radiation and converts the absorbed radiation into heat, and a first displaceable member that exhibits a deflection relative to the substrate in response to the heat generated by the radiation absorber;

(c) a second suspended portion mounted via a second leg portion to the substrate such that the second suspended portion extends over a region of the substrate, the second suspended portion comprising a second displaceable member that exhibits a deflection relative to the substrate, the deflection having a magnitude that is a function of the temperature of the substrate; and (d) an optically effecting portion for receiving a readout light flux, modifying the readout light flux, and producing a modified output light, the output light modification having a magnitude relative to the readout light flux, the magnitude corresponding to a displacement of the first and second displaceable members relative to each other, the first displaceable member exhibiting a direction of deflection due to generated heat that is similar to a direction of any displacement of the second displaceable member.

43. The conversion device of claim 42, wherein each of the first and second displaceable members comprises at least two layers each made of a material having a different coefficient of thermal expansion.

44. The conversion device of claim 42, wherein the optically effecting portion comprises interference means that receives the readout light flux, provides a path difference to the readout light flux, and outputs the readout light flux as a coherent output light, the coherency of the output light corresponding to the displacement of the first and second displaceable members relative to each other.

45. The conversion device of claim 44, wherein said interference means comprises a half-mirror portion and a total-reflection mirror positioned so as to face each other, the half-mirror portion and the total-reflection mirror being respectively mounted on opposite displaceable members, the half-mirror portion changing its position according to the displacement of the respective displaceable member on which the half-mirror portion is mounted, the total-reflection mirror changing its position according to the displacement of the respective displaceable member on which the total-reflection mirror is mounted.

46. The conversion device of claim 42, wherein the first displaceable member exhibits a deflection in response to the temperature of the substrate, the magnitude of displacement of the first displaceable member and the magnitude of displacement of the second displaceable member, resulting from a particular substrate temperature, being substantially equal.

47. The conversion device of claim 42, wherein the first displaceable member and the second displaceable members have equal thermal-related time constants.

48. The conversion device of claim 42, wherein the invisible radiation is infrared light.

49. The conversion device of claim 42 comprising multiple pixels each comprising individual first and second suspended portions.

50. A radiation-detecting apparatus, comprising:
(a) the conversion device of claim 42, and
(b) a displacement sensor, comprising a lens for directing the readout light flux toward the optically effecting portion of the conversion device, and a detector for detecting the displacement at least of the first displaceable member by detecting the modification in the output light relative to the readout light.

51. An image-rendering apparatus, comprising:
(a) the radiation-detector of claim 50; and
(b) an optical system, comprising a readout light source, a first lens for directing the readout light flux from the source to the optically effecting portion of the conversion device, and a second lens for receiving the output light and forming an optical image from the output light, the optical image corresponding to the amount of displacement at least of the first displaceable members.

52. An optically readable radiation-displacement-conversion device, comprising:
(a) a substrate;
(b) a first suspended portion mounted to the substrate so as to extend over a region of the substrate, the first suspended portion comprising (i) a radiation absorber that receives and absorbs an invisible radiation and generates heat from the absorbed radiation, and (ii) a first displaceable member that exhibits a deformation in response to the heat thermal energy generated by the radiation absorber, the deformation causing a deflection of the first displaceable member in a direction relative to the substrate;
(c) a second suspended portion mounted to the substrate so as to extend over a region of the substrate, the second suspended portion comprising a second displaceable member that exhibits a deflection relative to the substrate in response to substrate temperature, the displacement of the second displaceable member having a direction that is opposite to the direction of displacement of the first displaceable member so as to effectively cancel any influence by substrate temperature on net deflection; and
(d) an optically effecting portion for receiving a readout light flux, modifying the readout light flux, and outputting the modified readout light, the modification being of an amount corresponding to the displacements of the first and second displaceable members relative to each other.

53. The conversion device of claim 52, wherein the second displaceable member is mechanically coupled to the first displaceable member by a connector having a large thermal resistivity.

54. The conversion device of claim 52, wherein each of the first and second displaceable members comprises at least two layers each made of a material having a different coefficient of thermal expansion.

55. The conversion device of claim 52, wherein the optically effecting portion comprises a reflector for reflecting the readout light flux, the reflector being a portion of the first suspended portion and changing its position relative to the substrate according to the displacement of the first displaceable member.

56. The conversion device of claim 52, wherein the optically effecting portion comprises interference means for receiving the readout light flux, providing a path difference to the readout light, and producing an output light exhibiting a coherency corresponding to the displacement of the first displaceable member.

57. The conversion device of claim 56, wherein said interference means comprises a half-mirror portion for reflecting a portion of the readout light flux, and a total-reflection mirror mounted to the substrate and facing the half-mirror portion, the half-mirror portion being a portion of the first: suspended portion and exhibiting a change in position according to the displacement of the first displaceable member.

58. The conversion device of claim 52, wherein the first displaceable member exhibits a deflection in response to substrate temperature, the deflection having a magnitude that is substantially equal to the magnitude of displacement of the second displaceable member due to substrate temperature.

59. The conversion device of claim 52, wherein the first displaceable member and the second displaceable member exhibit substantially equal thermal-related time constants.

60. The conversion device of claim 52, wherein the invisible radiation is infrared light.

61. The conversion device of claim 52, comprising multiple pixels each comprising individual first and second suspended portions.

62. A radiation-detecting apparatus, comprising:
(a) the conversion device of claim 52; and
(b) a displacement sensor, comprising a lens for directing the readout light flux toward the optically effecting portion of the conversion device, and a detector for detecting the displacement at least of the first displaceable by detecting the modification in the output light relative to the readout light.

63. An image-rendering apparatus, comprising:
(a) the radiation-detector of claim 62, and
(b) an optical system, comprising a readout light source, a first lens for directing the readout light flux from the source to the optically effecting portion of the conversion device, and a second lens for receiving the output light and forming an optical image from the output light, the optical image corresponding to the amount of displacement at least of the first displaceable members.

64. An image-rendering apparatus, comprising:
(a) an optically readable infrared-radiation-displacement conversion device, comprising
a substrate made of an infrared-radiation-transmitting material;
multiple pixels each comprising a suspended portion and an optically effecting portion;
each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and
each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and
(b) a readout optical system, comprising (i) a beamsplitter for receiving a readout light flux and splitting the readout light flux into first and second readout beams, irradiating the reflector of the optically effecting portion of each of the pixels with the first readout beam, and causing readout light reflected from the reflectors to interfere with readout light from the second beam so as to generate interference light from each of the pixels; and (ii) a lens for forming an optical image from the interference light.

65. The image-rendering apparatus of claim 64, wherein the displaceable member of each of the pixels has a restricted displacement range so that displacement of the displaceable member causes a monotonic change in an interference state of the interference light.

66. The image-forming apparatus of claim 64, further comprising an image-pickup means for picking up the optical image.

67. An image-rendering apparatus, comprising:
(a) an optically readable infrared-radiation-displacement conversion device, comprising
a substrate made of an infrared-radiation-transmitting material;
multiple pixels each comprising a suspended portion and an optically effecting portion;
each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and
each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and
(b) a readout optical system, comprising (i) means for receiving the readout light flux and for irradiating the reflector of each of the pixels with the readout light flux; (ii) a lens for receiving readout light reflected from the reflectors and for forming an optical image from the reflected readout light, the reflected readout light reflected from each reflector having an intensity that varies with the inclination of the respective reflector; and a pupil for blocking the readout light reflected from the reflector of each pixel by an amount corresponding to the inclination of the reflector.

68. The image-rendering apparatus of claim 67, further comprising image-pickup means for picking up the optical image.

69. An image-rendering apparatus, comprising:
(a) an optically readable infrared-radiation-displacement conversion device, comprising
a substrate made of an infrared-radiation-transmitting material;
multiple pixels each comprising a suspended portion and an optically effecting portion;
each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and (b) a readout optical system, comprising (i) means for receiving a readout light flux and for irradiating the reflectors of the pixels with a readout light flux such that, with respect to each pixel, the readout light flux is focused at a predetermined focus location relative to the respective reflector; (ii) means for passing the readout light reflected from each pixel through a corresponding aperture defined by a diaphragm plate situated conjugate with the focus locations, each aperture being located at a position corresponding to the respective focus position; and (iii) means for forming an optical image from the readout light collectively reflected from the reflectors of the pixels and passed through the apertures, respectively.

70. The image-rendering apparatus of claim 69, further comprising image-pickup means for picking up the optical image.

71. An image-rendering apparatus, comprising:
(a) an optically readable infrared-radiation-displacement conversion device, comprising
 a substrate made of an infrared-radiation-transmitting material;
 multiple pixels each comprising a suspended portion and an optically effecting portion;
 each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and
 each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and (b) a readout optical system, comprising (i) means for irradiating the reflector of each of the pixels with a flux of polarized readout light; (ii) means for receiving readout light from each of the reflectors and for focusing the reflected readout light in an image-forming way; (iii) means for collectively receiving the focused images from the reflectors; and (iv) means for analyzing the received collected images so as to form an aggregate optical image from the readout light reflected from the reflectors.

72. The image-rendering apparatus of claim 71, further comprising image-pickup means for picking up the optical image.

73. An image-rendering apparatus, comprising:
(a) an optically readable infrared-radiation-displacement conversion device, comprising
 a substrate made of an infrared-radiation-transmitting material;
 multiple pixels each comprising a suspended portion and an optically effecting portion;
 each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and
 each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and (b) a readout optical system, comprising (i) means for irradiating the reflector of each of the pixels with the readout light flux; (ii) means for receiving readout light reflected from the reflectors of the pixels; and (iii) means for forming, by phase difference, an optical image from the received readout light, the optical image being formed in accordance with the collective displacements of the displaceable members of the pixels.

74. The image-rendering apparatus of claim 73, further comprising image-pickup means for picking up the optical image.

75. An image-rendering apparatus, comprising:
(a) an optically readable infrared-radiation-displacement conversion device, comprising
a substrate made of an infrared-radiation-transmitting material;
multiple pixels each comprising a suspended portion and an optically effecting portion;
each suspended portion being attached to the substrate so as to extend over a respective region of the substrate, each suspended portion comprising (i) a respective radiation-absorbing region situated so as to receive an incident infrared radiation passing through the substrate, the radiation-absorbing region comprising an infrared-radiation-absorbing material that absorbs the incident infrared radiation and converts absorbed infrared radiation into heat, and (ii) a respective displaceable member that exhibits a respective displacement relative to the substrate whenever the respective infrared-radiation-absorbing material absorbs an amount of the incident infrared radiation, the displacement having a magnitude that is a function of the amount of heating experienced by the respective radiation-absorbing region; and
each optically effecting portion receiving a readout light flux and imparting a respective change to a characteristic of the readout light flux in accordance with the respective magnitude of the displacement of the displaceable member, each optically effecting portion comprising a reflector for reflecting the received readout light flux, the reflector forming a portion of the respective suspended portion and exhibiting a respective displacement along with any displacement of the respective displaceable member; and
(b) a readout optical system, comprising (i) means for irradiating the reflector of each of the pixels with the readout light; (ii) means for receiving readout light reflected from the reflectors of the pixels; and (iii) means for forming, by differential interference, an optical image from the received readout light, the optical image being formed in accordance with the collective displacements of the displaceable members of the pixels.

76. The image-rendering apparatus of claim 75, further comprising image-pickup means for picking up the optical image.

77. The image-rendering apparatus of claim 76, wherein:
said image-pickup means comprises multiple pixels in one-to-one correspondence with the optically effecting portions of the pixels of the conversion device, and
the readout optical system forms the optical image such that each of the pixels of said image-pickup means receives only the changed readout light flux exiting from the corresponding optically effecting portion of the pixels.

* * * * *

UNITED STATES PATENT AND TRADEMARK OFFICE
CERTIFICATE OF CORRECTION

PATENT NO. : 6,080,988
DATED : June 27, 2000
INVENTOR(S) : Nohru Ishizuya, Noboru Amemiya, Keiichi Akagawa and It is certified that error appears in the above-identified patent and that said Letters Patent is hereby corrected as shown below:

Title page:
Abstract,
Line 11, change "and incident" to -- an incident --

Column 2,
Line 8, change "cause (corresponding" to -- cause corresponding --
Line 47, change "abort" to -- about --
Line 56, change "he" to -- be --

Column 3,
Line 20, delete "provide"

Column 6,
Line 41, change "signal" to -- signal. --

Column 10,
Line 34, change "receiving a directing" to -- receiving and directing --

Column 11,
Line 59, change "mounted respectively mounted on" to -- mounted respectively on --

Column 13,
Line 59, change "having different" to -- having a different --

Column 16,
Line 19, change "and 22(i)" to -- and 22(j) --
Line 63, change "18. wherein" to -- 18, wherein --

Column 18,
Line 21, change "of he second" to -- of the second --

Column 19,
Line 2, change "can selected from" to -- can be selected from --
Line 3, change "listed Table 1." to -- listed in Table 1 --

Column 20,
Line 3, change "(VD" to -- CVD --
Line 58 change "apertures" to -- aperture --

UNITED STATES PATENT AND TRADEMARK OFFICE
CERTIFICATE OF CORRECTION

PATENT NO.  : 6,080,988
DATED       : June 27, 2000
INVENTOR(S) : Nohru Ishizuya, Noboru Amemiya, Keiichi Akagawa and It is certified that error appears in the above-identified patent and that said Letters Patent is hereby corrected as shown below:

Column 22,
Line 12, change "414 having" to -- 414

Column 25,

Line 20, change "a increase" to -- an increase --
Line 67, change "wits" to -- with --

Column 26,
Line 60, change "of he second" to -- of the second --

Column 30,
Lines 36-37, change "conversion device 10" to -- conversion device 100 --

Column 31,
Line 41, change "comprises; a" to -- comprises a --

Column 32,
Line 19, change "that ha, passed" to -- that has passed --
Line 64, change "container 113" to -- container 110 --

Column 36,
Line 19, change "1(*a*)-1(*c*)" to -- 1(*a*)-1(*d*) --

Column 37,
Line 44, change "FIG. 6(*b*)" to -- FIG. 16(*b*) --
Line 59, change "rot" to -- not --

UNITED STATES PATENT AND TRADEMARK OFFICE
CERTIFICATE OF CORRECTION

PATENT NO. : 6,080,988
DATED : June 27, 2000
INVENTOR(S) : Nohru Ishizuya, Noboru Amemiya, Keiichi Akagawa and It is certified that error appears in the above-identified patent and that said Letters Patent is hereby corrected as shown below:

Column 38,
Line 13, change "c)r" to -- or --
Line 55, change "FIGS. 16(*a*)-36(*b*)" to -- FIGS. 16(*a*)-16(*b*) --

Column 39,
Line 12, change "process" to -- process. --

Column 40,
Line 57, change "$3 \times 10^{-4}$" to -- $3 \times 10^{-4} \mu m$ --

Column 41,
Line 31, change "conversion(device" to -- conversion device --

Column 44,
Line 8, change "film 23" to -- film 213 --
Line 19, change "i radiation to" -- irradiation --
Line 34, change "mask 11" to -- mask 211 --
Line 59, change "taken the line" to -- taken along the line --

Column 47,
Line 28, change "stabilizer 14" to -- stabilizer 145 --

Column 49,
Line 22, change "over the over the substrate" to -- over the substrate --
Line 30, change "is preferably" to -- preferably is --
Line 42, change "lee" to -- leg --
Line 59, change "$SiC_2$" to -- $SiO_2$ --

UNITED STATES PATENT AND TRADEMARK OFFICE
CERTIFICATE OF CORRECTION

PATENT NO. : 6,080,988
DATED : June 27, 2000
INVENTOR(S) : Nohru Ishizuya, Noboru Amemiya, Keiichi Akagawa and It is certified that error appears in the above-identified patent and that said Letters Patent is hereby corrected as shown below:

Column 51,
Line 19, change "383" to -- 308 --

Column 52,
Line 39, change "member: 309" to -- member 309 --

Column 53,
Line 15, change "capacitor" to -- capacity --
Line 44, change "26(a)-26(f)')" to -- 26(a)-26(f) --

Column 54,
Line 11, change "voids; and" to -- voids and --

Column 55,
Line 10, change "an(i" to -- and --

Column 56,
Line 22, change "is incident:" to -- is incident --
Line 64, change "total-reelection" to -- total reflection --

Column 57,
Line 6, change "films 57a" to -- films 357a --

Column 58,
Line 38, change "upward the figure" to -- upward in the figure --

UNITED STATES PATENT AND TRADEMARK OFFICE
CERTIFICATE OF CORRECTION

PATENT NO.   : 6,080,988
DATED        : June 27, 2000
INVENTOR(S)  : Nohru Ishizuya, Noboru Amemiya, Keiichi Akagawa and It is certified that error appears in the above-identified patent and that said Letters Patent is hereby corrected as shown below:

Column 60,
Line 6, change "incident." to -- incident). --
Line 35, change "substrate 372" to -- substrate 371 --
Line 46, change "otherwise (cover" to -- otherwise cover --

Column 61,
Line 14, change "portions 58." to -- portions 358. --
Line 21, change "e.g., Elution" to -- e.g., elution --

Column 62,
Line 43, change "3( )(h)" to -- 30(h) --

Column 63,
Line 6, change "readout Light" to -- readout light --

Column 64,
Line 27, change "of the each pixel" to -- of each pixel --

Column 65,
Line 33, change "with as single" to -- with a single --

Claims:

Column 66,
Line 31, change "claim 11," to -- claim 11; --
Line 42, change "claim 11;" to -- claim 11; and --

UNITED STATES PATENT AND TRADEMARK OFFICE
CERTIFICATE OF CORRECTION

PATENT NO. : 6,080,988
DATED : June 27, 2000
INVENTOR(S) : Nohru Ishizuya, Noboru Amemiya, Keiichi Akagawa and It is certified that error appears in the above-identified patent and that said Letters Patent is hereby corrected as shown below:

Column 71,
Line 43, change "second displaceable members" to -- second displaceable member --
Line 51, change "42, and" to -- 42; and --

Column 72,
Line 54, change "first: suspended" to -- first suspended --

Column 73,
Line 13, change "62, and" to -- 62; and --
Line 24, change "comprising" to -- comprising: --

Column 74,
Line 9, change "comprising" to -- comprising: --
Line 58, change "comprising" to -- comprising: --

Column 75,
Lnie 43, change "comprising" to -- comprising: --

Column 76,
Line 23, change "comprising" to -- comprising: --

Column 77,
Line 3, change "comprising" to -- comprising: --

Signed and Sealed this

Twenty-seventh Day of November, 2001

*Attest:*

NICHOLAS P. GODICI
*Attesting Officer*    *Acting Director of the United States Patent and Trademark Office*